US010896101B2

(12) United States Patent
Yeung

(10) Patent No.: US 10,896,101 B2
(45) Date of Patent: Jan. 19, 2021

(54) MULTICLIENT BACKUP REPLICATION APPARATUSES, METHODS AND SYSTEMS

(71) Applicant: Datto, Inc., Norwalk, CT (US)

(72) Inventor: Desmond Wayne Yeung, Dorchester, MA (US)

(73) Assignee: Datto, Inc., Norwalk, CT (US)

( * ) Notice: Subject to any disclaimer, the term of this patent is extended or adjusted under 35 U.S.C. 154(b) by 0 days.

(21) Appl. No.: 16/424,469

(22) Filed: May 28, 2019

(65) Prior Publication Data

US 2020/0057697 A1 Feb. 20, 2020

Related U.S. Application Data

(63) Continuation-in-part of application No. 16/391,243, filed on Apr. 22, 2019, which is a continuation-in-part of application No. 16/391,205, filed on Apr. 22, 2019, and a continuation-in-part of application No. 16/055,347, filed on Aug. 6, 2018.

(60) Provisional application No. 62/541,952, filed on Aug. 7, 2017.

(51) Int. Cl.

*G06F 9/54* (2006.01)
*G06F 11/14* (2006.01)

(52) U.S. Cl.

CPC .......... *G06F 11/1469* (2013.01); *G06F 9/542* (2013.01); *G06F 11/1464* (2013.01); *G06F 11/1466* (2013.01); *G06F 2201/84* (2013.01)

(58) Field of Classification Search

None

See application file for complete search history.

(56) References Cited

U.S. PATENT DOCUMENTS 6,785,786 B1 8/2004 Gold
6,847,984 B1 1/2005 Midgley
9,235,582 B1 1/2016 Madiraju Varadaraju
9,690,666 B1 6/2017 Shembavnekar
10,204,016 B1 2/2019 Patwardhan
2005/0086443 A1 4/2005 Mizuno
2010/0100696 A1 4/2010 Suzuki
2010/0122053 A1 * 5/2010 Prahlad .................. G06F 3/065
711/162

(Continued)

*Primary Examiner* — Elias Mamo

(74) *Attorney, Agent, or Firm* — Hanchuk Kheit LLP; Walter G. Hanchuk

(57) ABSTRACT

The Multiclient Backup Replication Apparatuses, Methods and Systems ("MBR") transforms pairing request, replication data stream inputs via MBR components into pairing response, replication confirmation outputs. A replication notification for a snapshot of a backup volume at a source node is obtained. A source node named pipe for the snapshot is created. A priority for the snapshot is determined. When appropriate to send the snapshot to a replication target node, snapshot data is read from the source node named pipe and serialized into chunks Chunks associated with the snapshot and other snapshots are multiplexed into a replication data stream and sent to the replication target node via a persistent network connection. The replication data stream is received by the replication target node and chunks associated with the snapshot are deserialized. A replication target node named pipe for the snapshot is created and used to write snapshot data to a replication volume.

18 Claims, 24 Drawing Sheets

(56) References Cited

U.S. PATENT DOCUMENTS

| | | | | |
|---|---|---|---|---|
| 2010/0179941 | A1* | 7/2010 | Agrawal | G06F 11/1451 707/624 |
| 2011/0282841 | A1 | 11/2011 | Saika | |
| 2012/0317074 | A1* | 12/2012 | Ngo | G06F 11/1471 707/611 |
| 2013/0226870 | A1 | 8/2013 | Dash | |
| 2013/0325803 | A1* | 12/2013 | Akirav | G06F 16/275 707/634 |
| 2016/0011790 | A1 | 1/2016 | Rostoker | |
| 2016/0124814 | A1* | 5/2016 | Joseph | G06F 3/061 714/19 |
| 2017/0091047 | A1 | 3/2017 | Bangalore | |
| 2017/0220658 | A1* | 8/2017 | Goldmann | G06F 16/27 |
| 2017/0235506 | A1* | 8/2017 | Thiam | G06F 11/1448 711/162 |
| 2017/0293628 | A1 | 10/2017 | Adler | |
| 2018/0173596 | A1 | 6/2018 | Petracca | |
| 2018/0239555 | A1 | 8/2018 | Cao | |

* cited by examiner

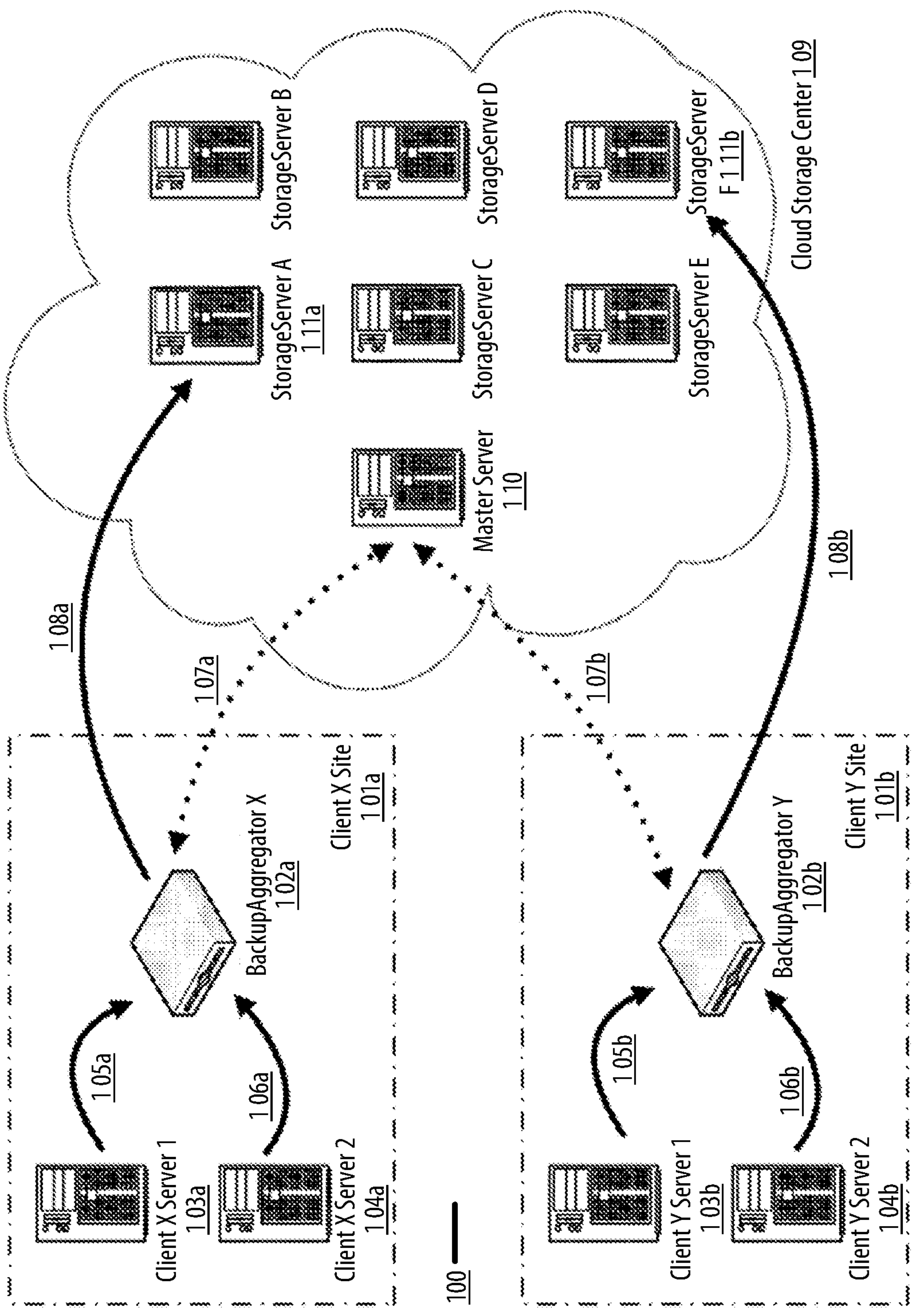
FIGURE 1A: MBR DATA FLOW

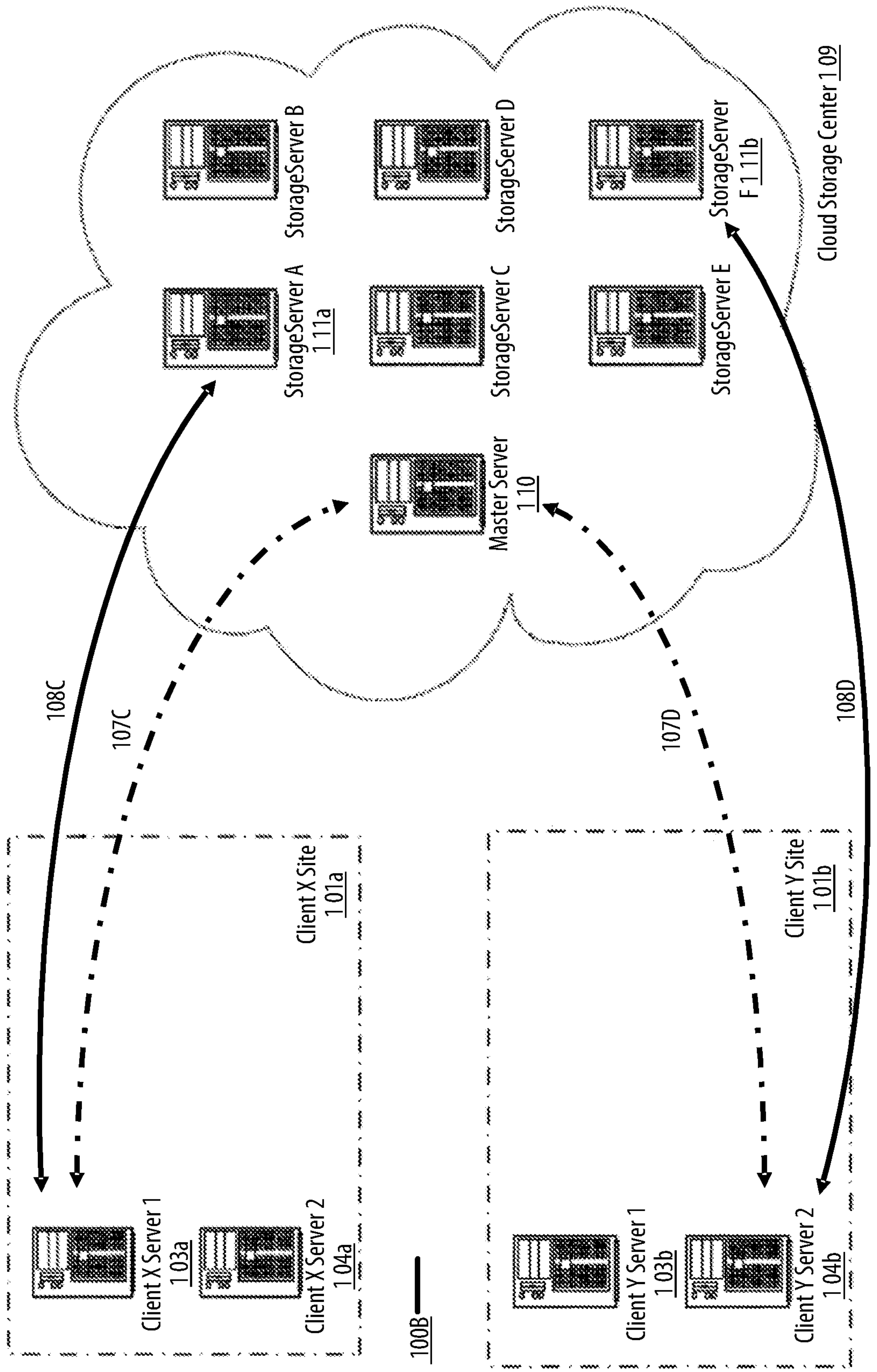
FIGURE 1B: MBR DATA FLOW

200
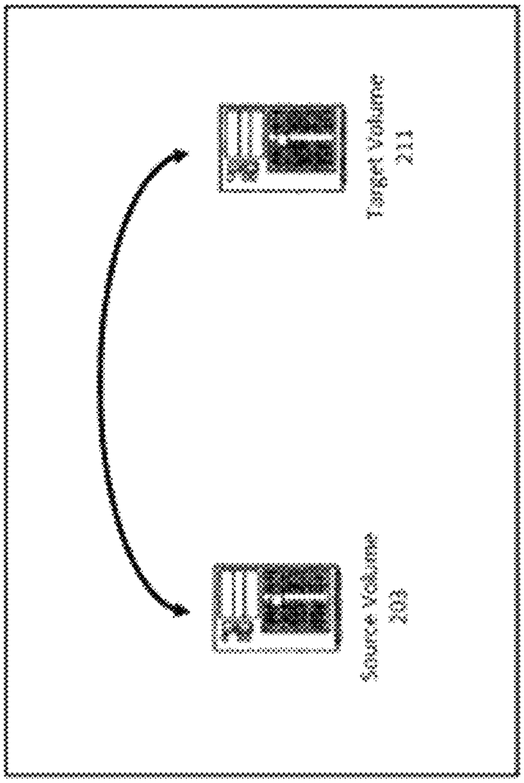
FIGURE 2: MBR BLOCK DIAGRAM

FIGURE 3: MBR BP COMPONENT
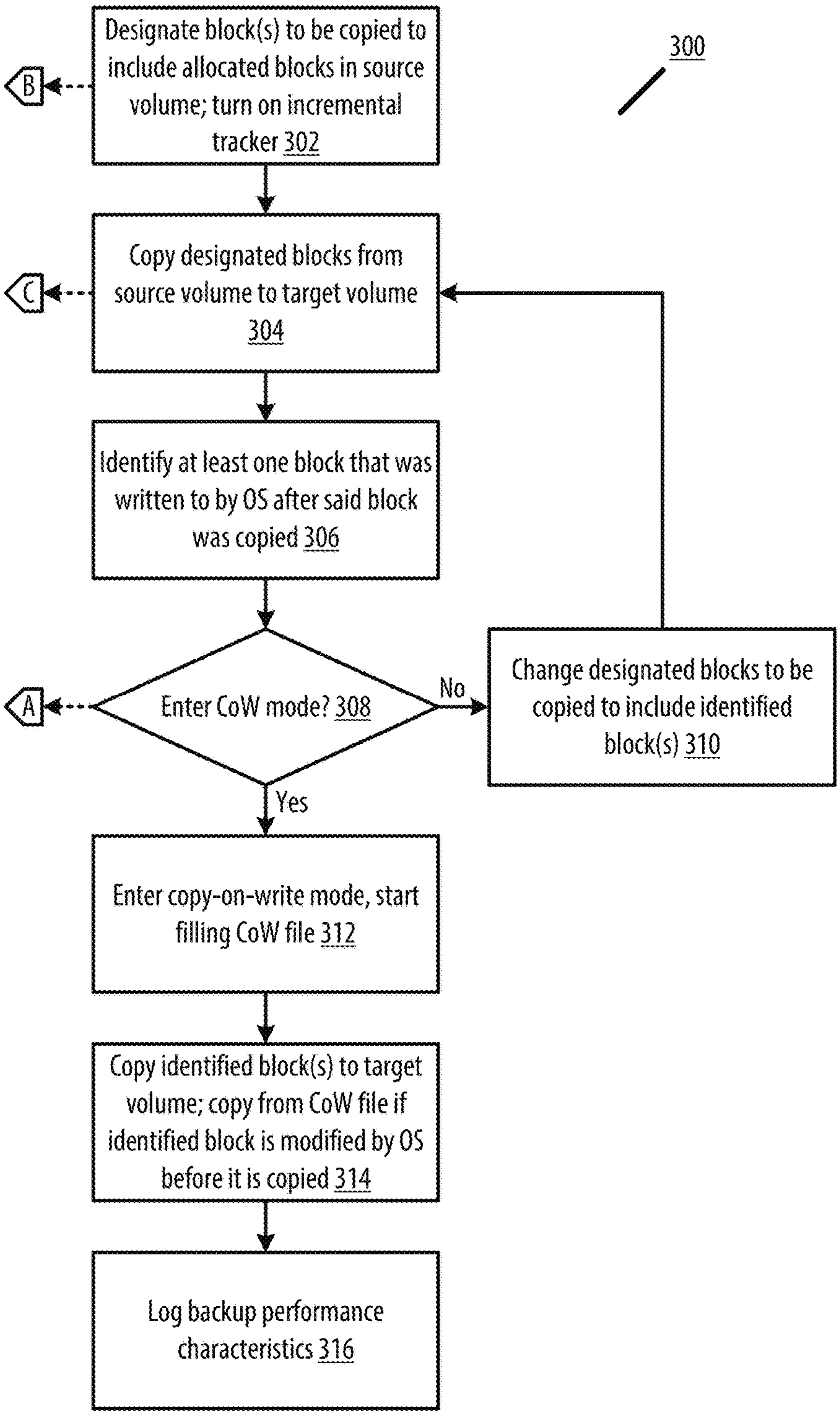

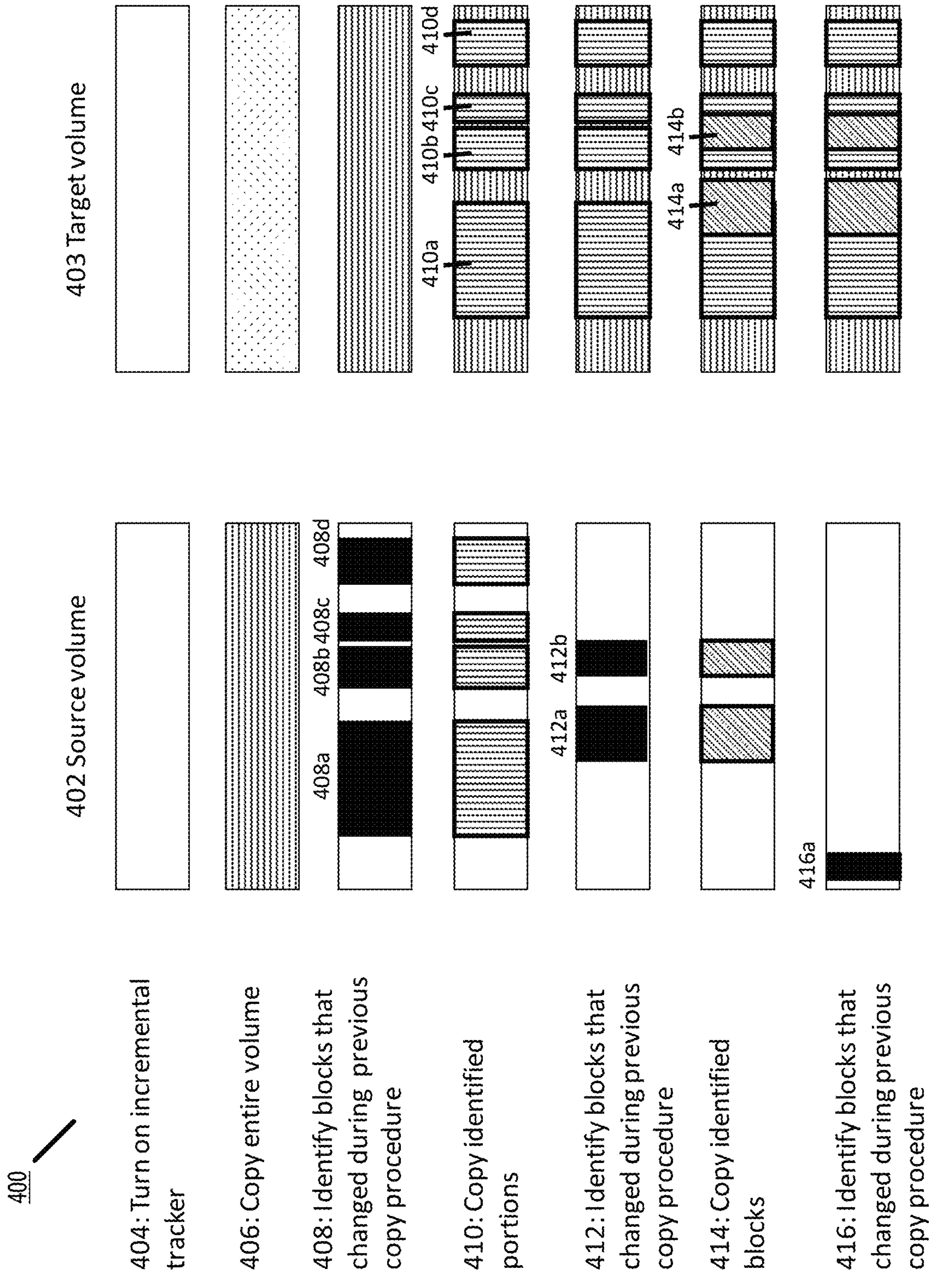
FIGURE 4A: MBR IMPLEMENTATION CASE

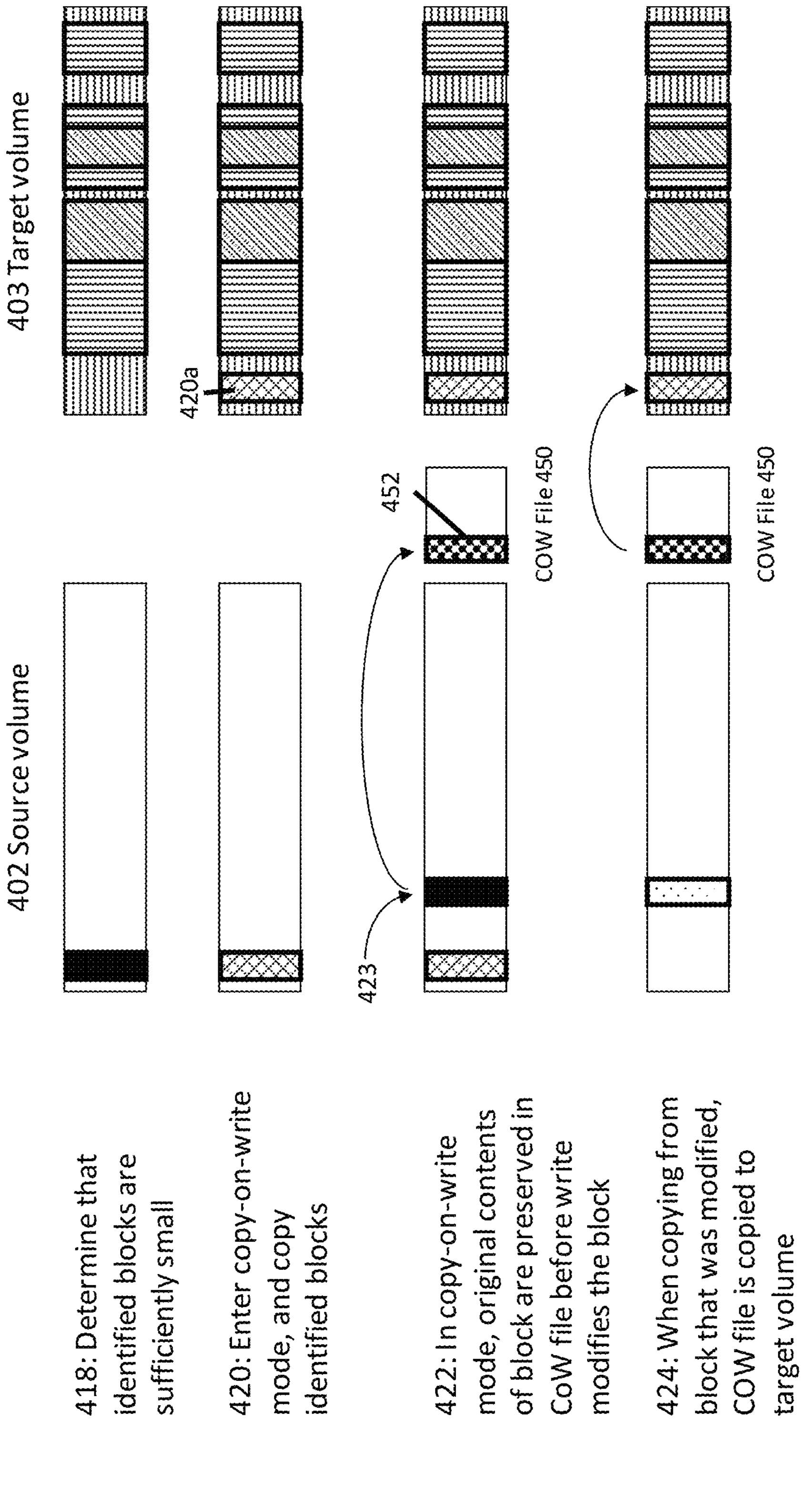
FIGURE 4B: MBR IMPLEMENTATION CASE

FIGURE 5: MBR DATA FLOW
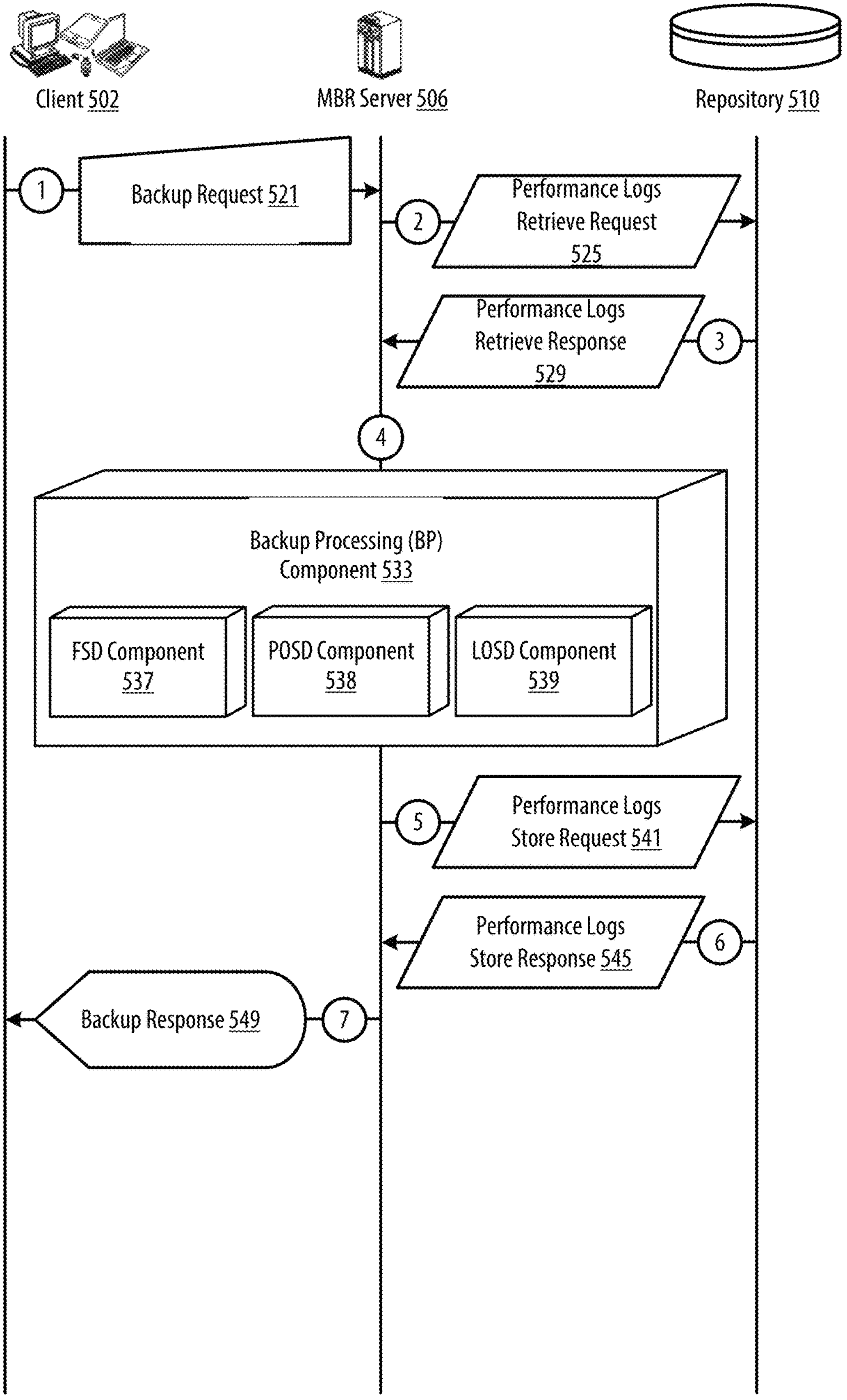

FIGURE 6: MBR FSD COMPONENT
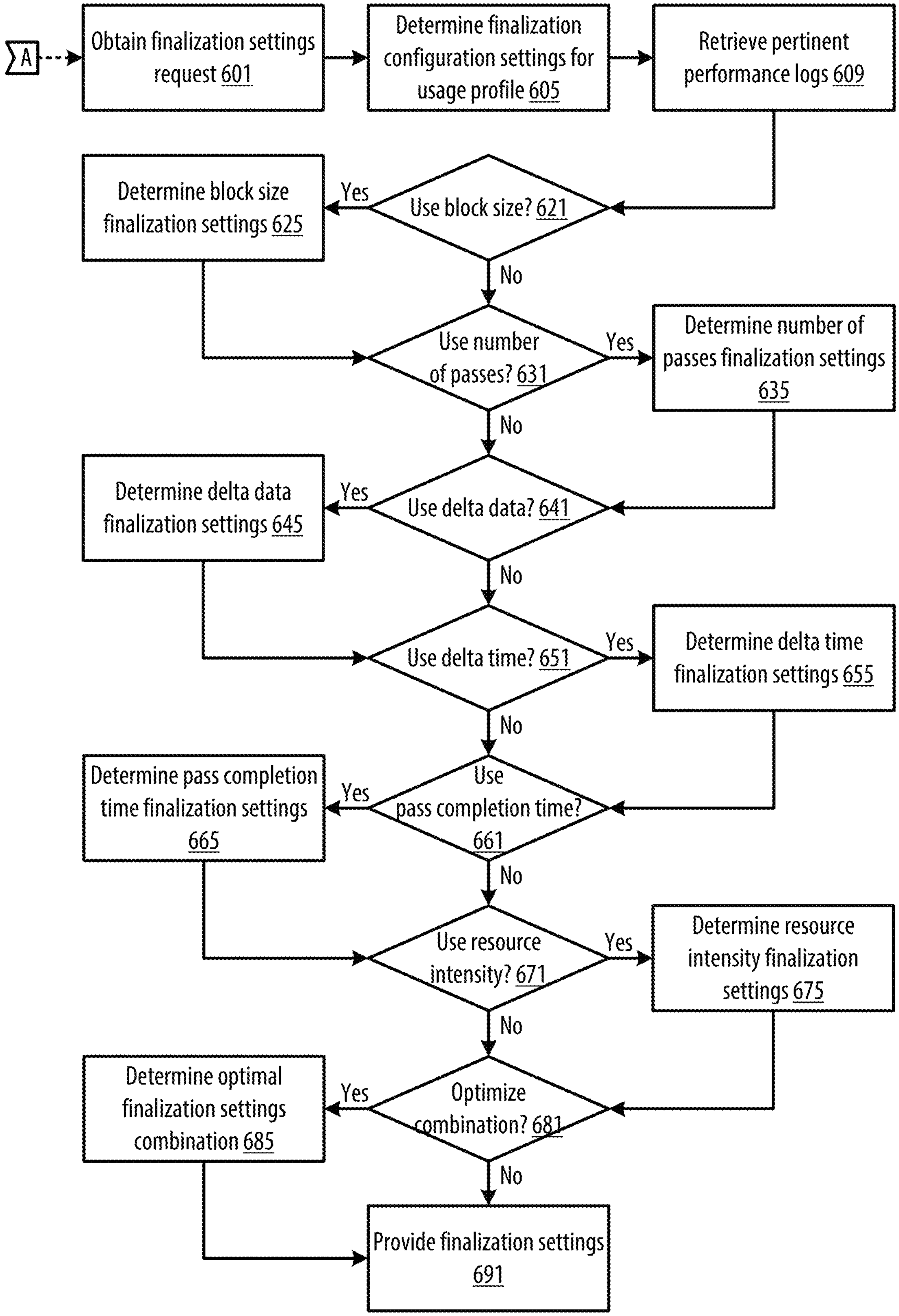

FIGURE 7: MBR POSD COMPONENT
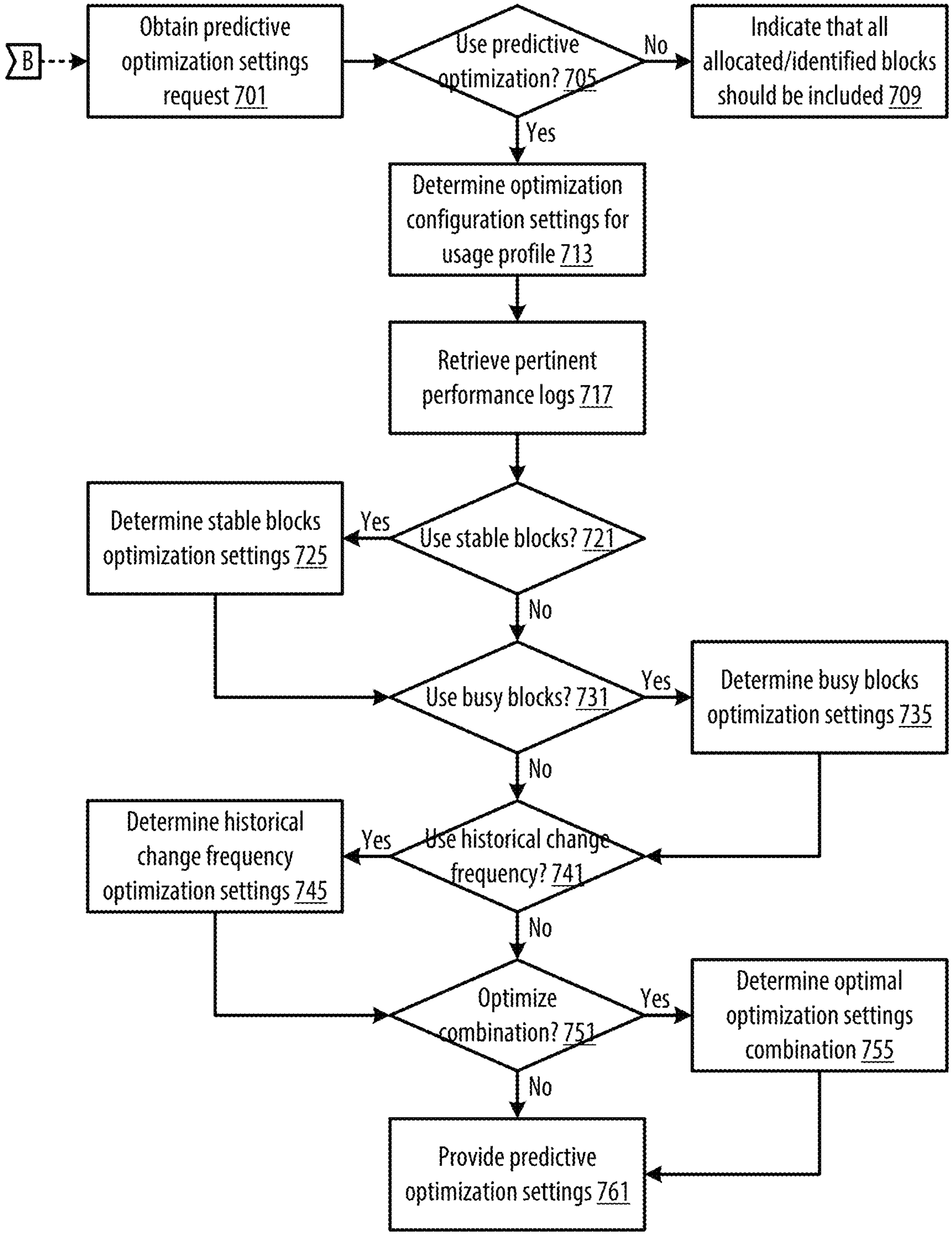

FIGURE 8A: MBR IMPLEMENTATION CASE
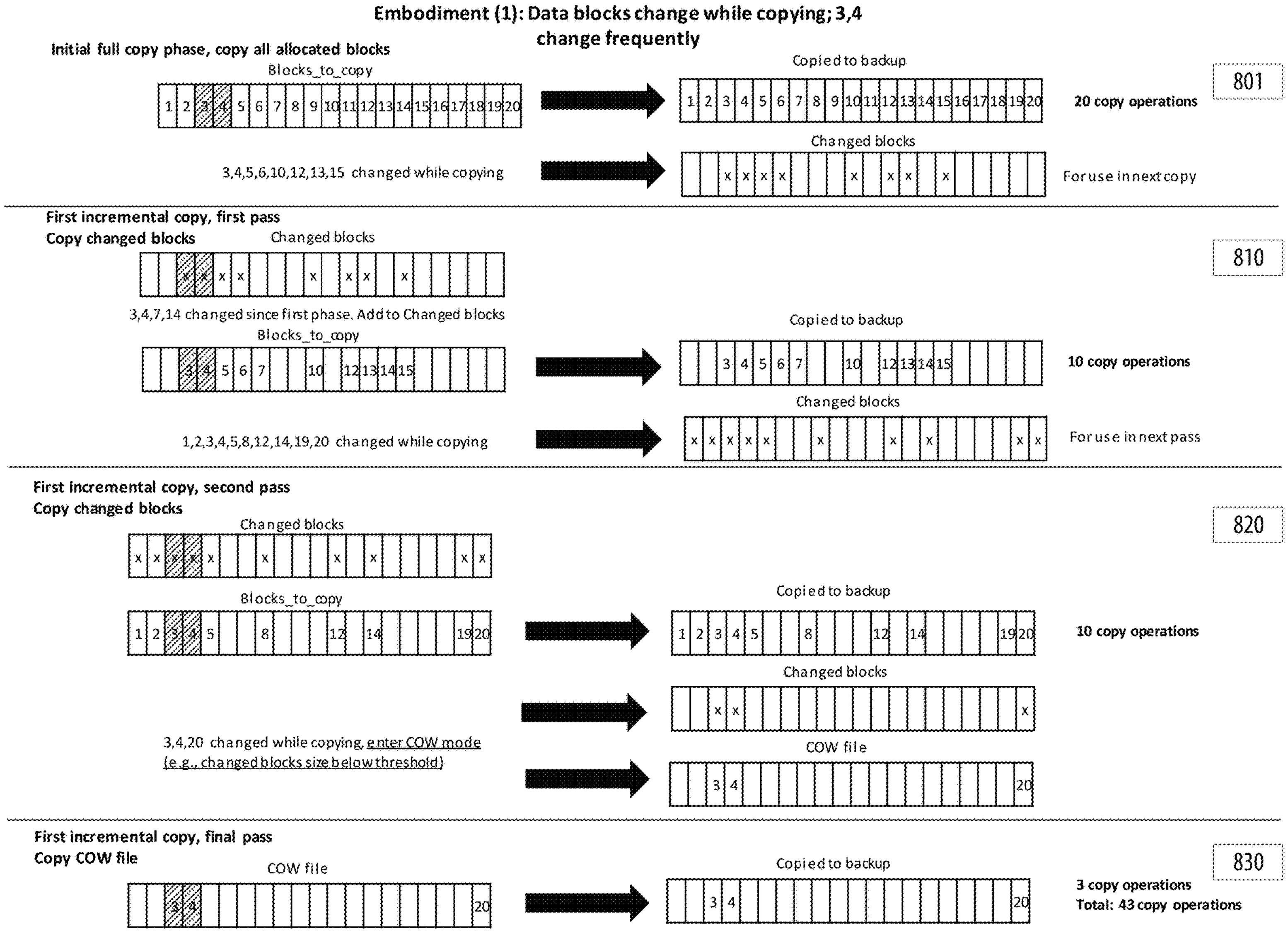

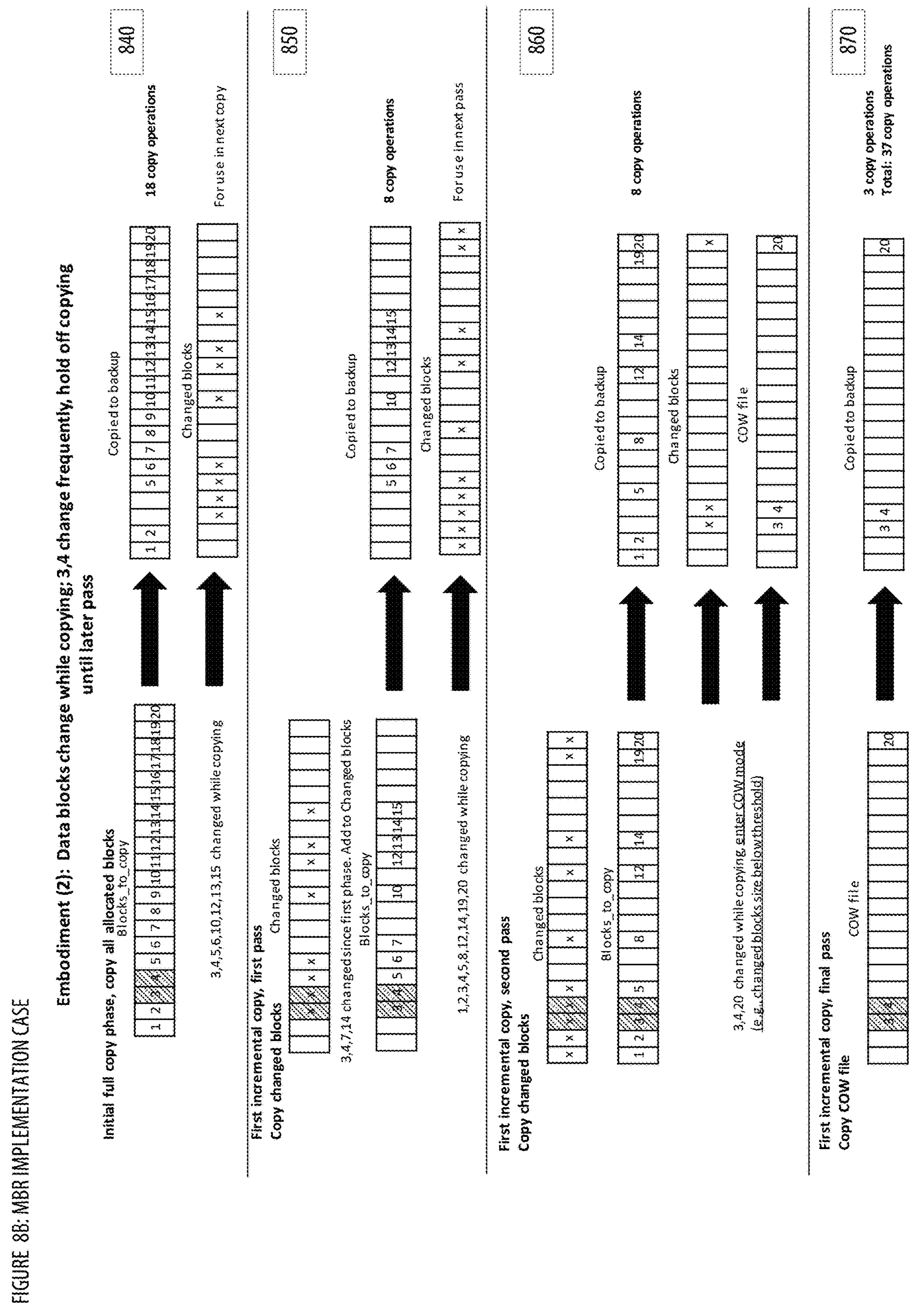

FIGURE 8B: MBR IMPLEMENTATION CASE
Embodiment (2): Data blocks change while copying; 3,4 change frequently, hold off copying until later pass
Initial full copy phase, copy all allocated blocks
Blocks_to_copy
3,4,5,6,10,12,13,15 changed while copying
Copied to backup
18 copy operations
Changed blocks
For use in next copy
840
First incremental copy, first pass
Copy changed blocks
Changed blocks
3,4,7,14 changed since first phase. Add to Changed blocks
Blocks_to_copy
1,2,3,4,5,8,12,14,19,20 changed while copying
Copied to backup
8 copy operations
Changed blocks
For use in next pass
850
First incremental copy, second pass
Copy changed blocks
Changed blocks
Blocks_to_copy
3,4,20 changed while copying, enter COW mode
(e.g., changed blocks size below threshold)
Copied to backup
8 copy operations
Changed blocks
COW file
860
First incremental copy, final pass
Copy COW file
COW file
Copied to backup
3 copy operations
Total: 37 copy operations
870

FIGURE 9: MBR LOSD COMPONENT
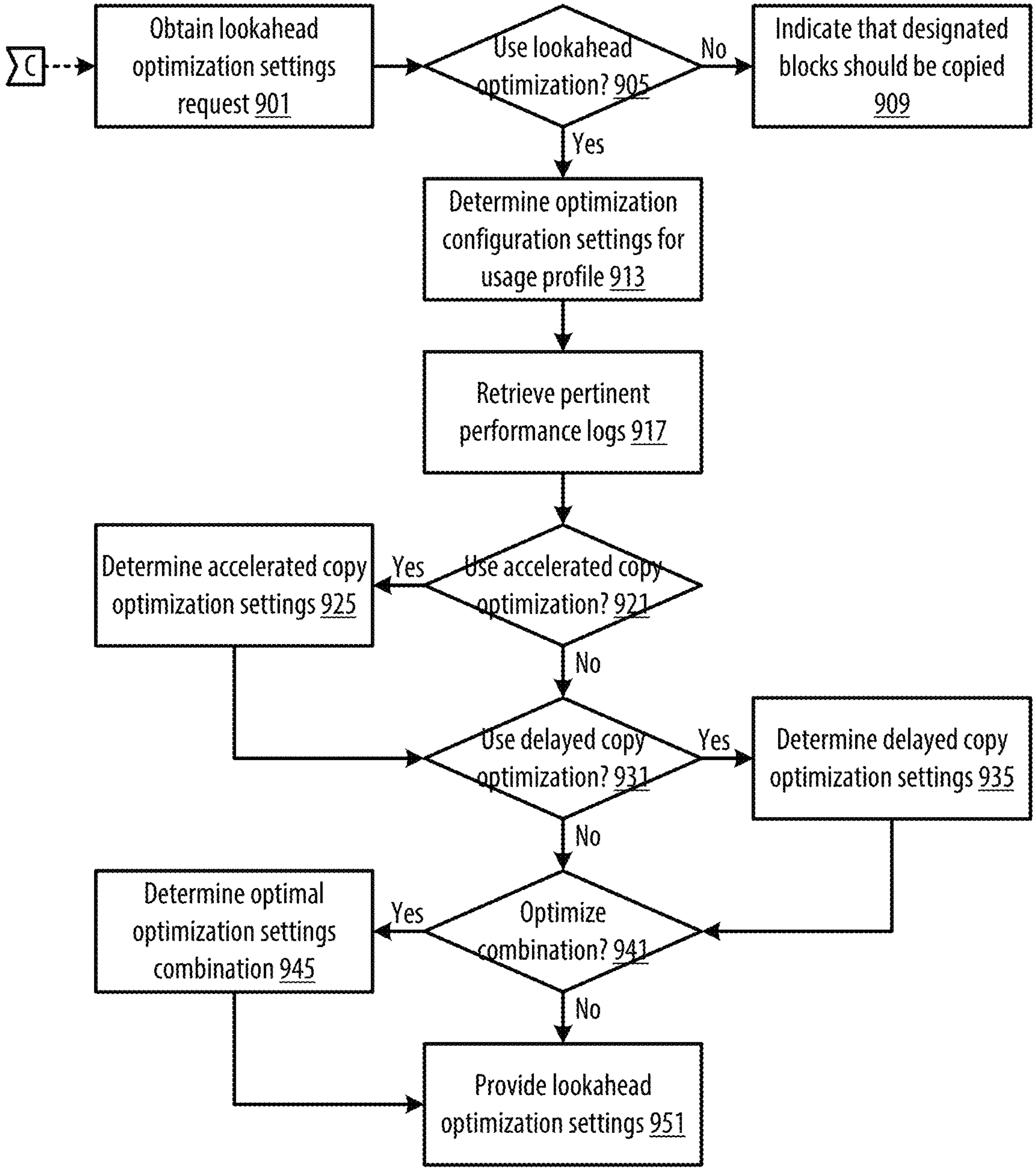

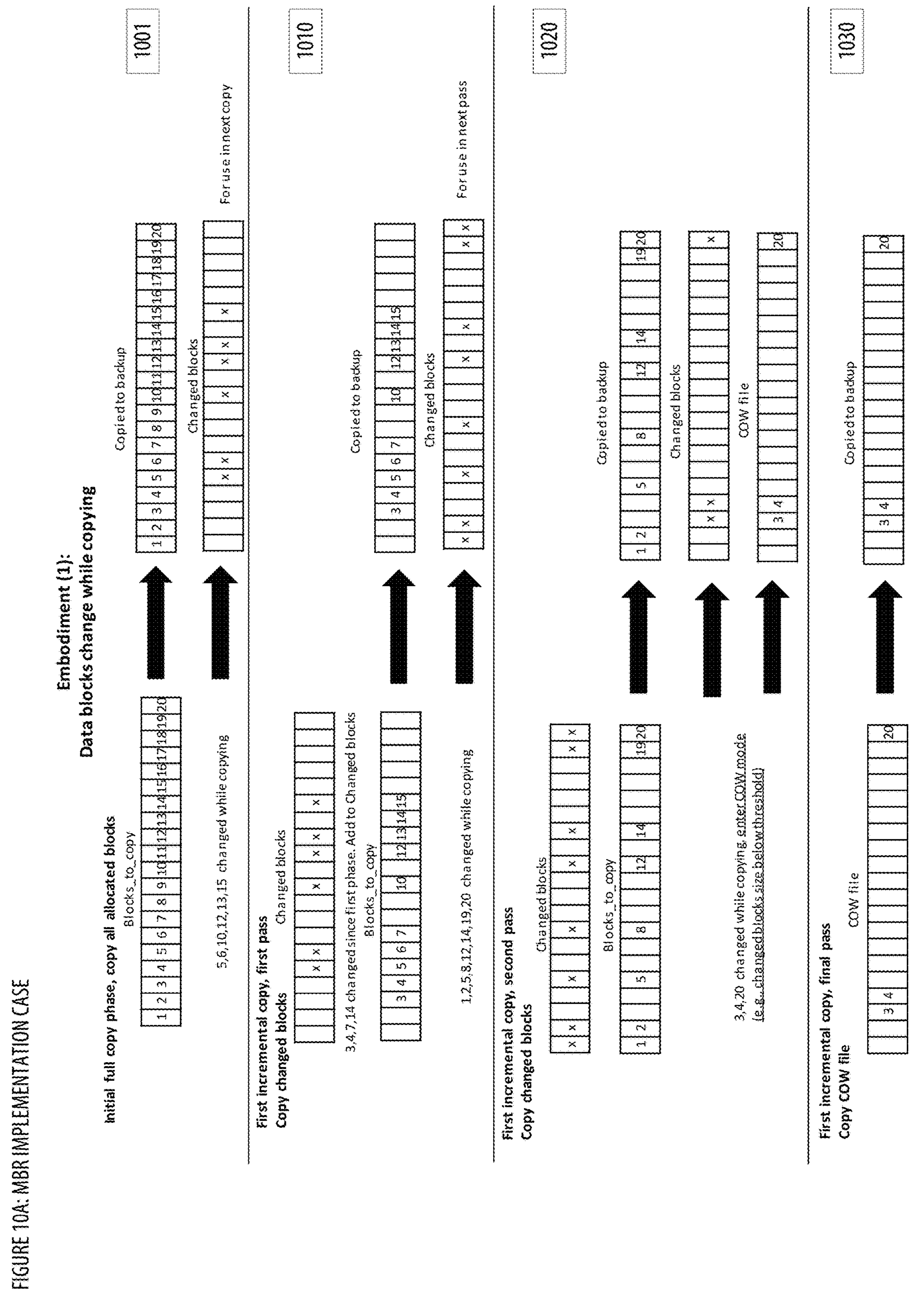
FIGURE 10A: MBR IMPLEMENTATION CASE
Embodiment (1):
Data blocks change while copying
Initial full copy phase, copy all allocated blocks
Blocks_to_copy
5,6,10,12,13,15 changed while copying
Copied to backup
Changed blocks
For use in next copy
1001
First incremental copy, first pass
Copy changed blocks
Changed blocks
3,4,7,14 changed since first phase. Add to Changed blocks
Blocks_to_copy
1,2,5,8,12,14,19,20 changed while copying
Copied to backup
Changed blocks
For use in next pass
1010
First incremental copy, second pass
Copy changed blocks
Changed blocks
Blocks_to_copy
3,4,20 changed while copying, enter COW mode
(e.g., changed blocks size below threshold)
Copied to backup
Changed blocks
COW file
1020
First incremental copy, final pass
Copy COW file
COW file
Copied to backup
1030

FIGURE 10B: MBR IMPLEMENTATION CASE
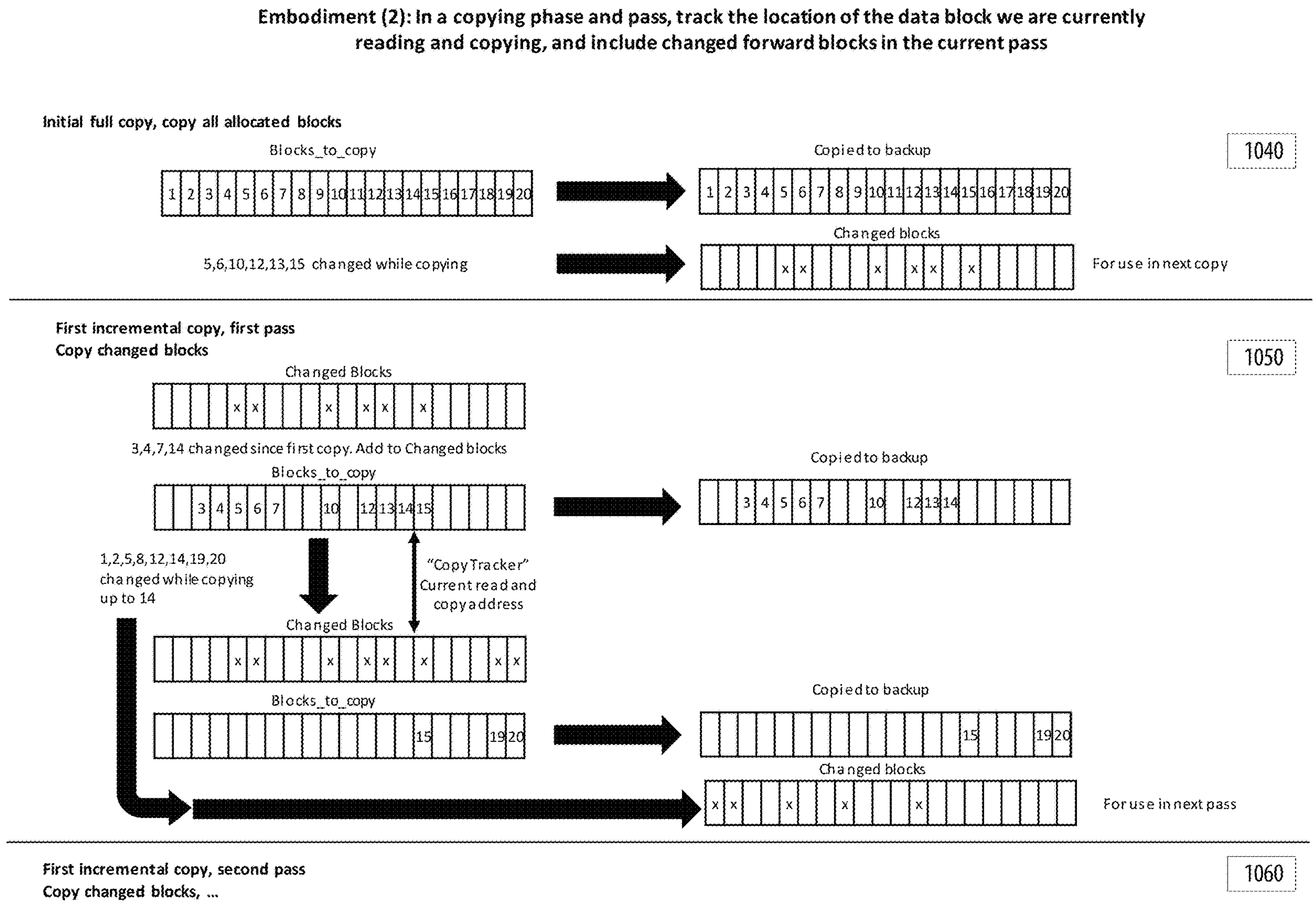

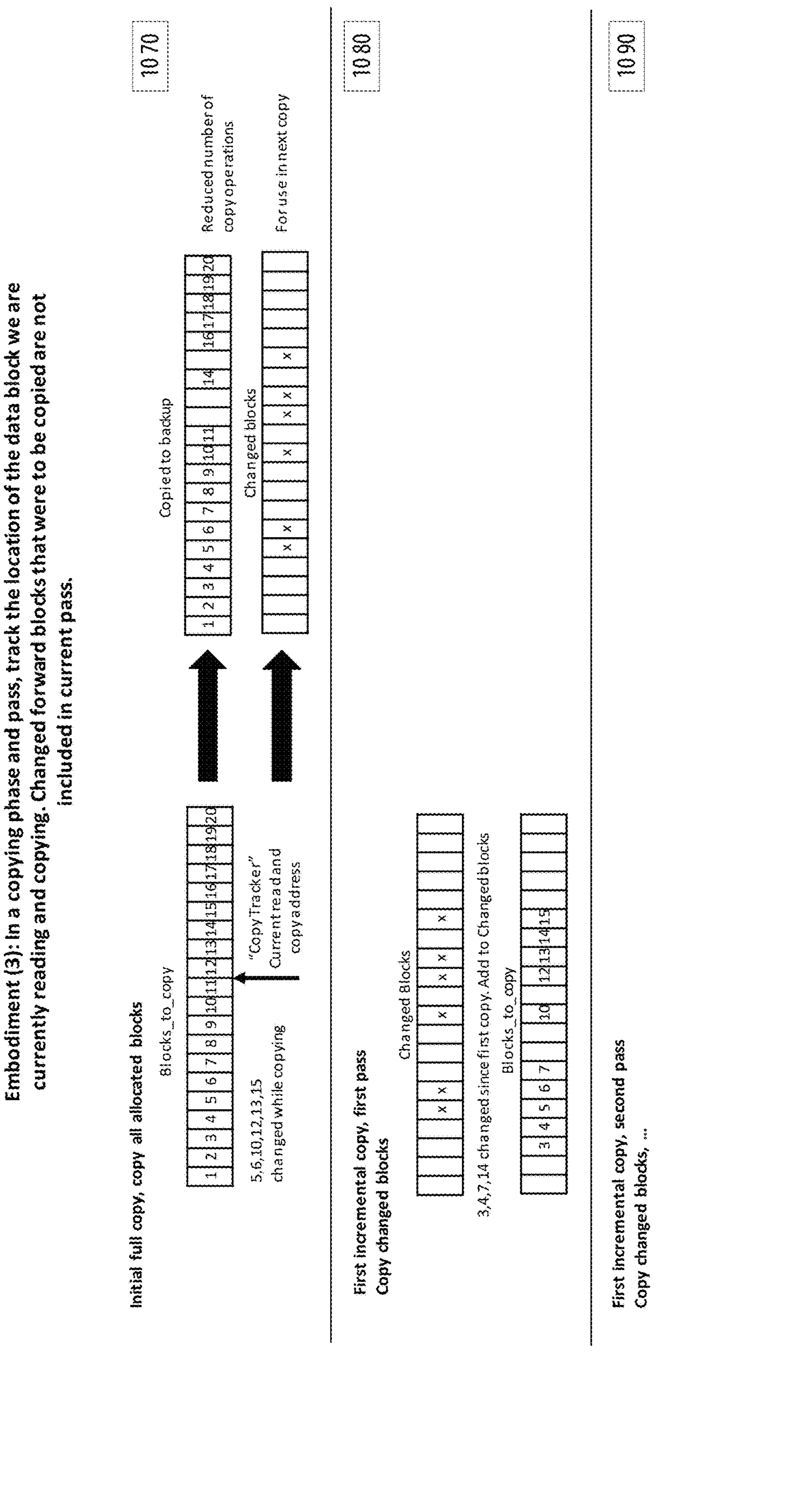
FIGURE 10 C: MBR IMPLEMENTATION CASE

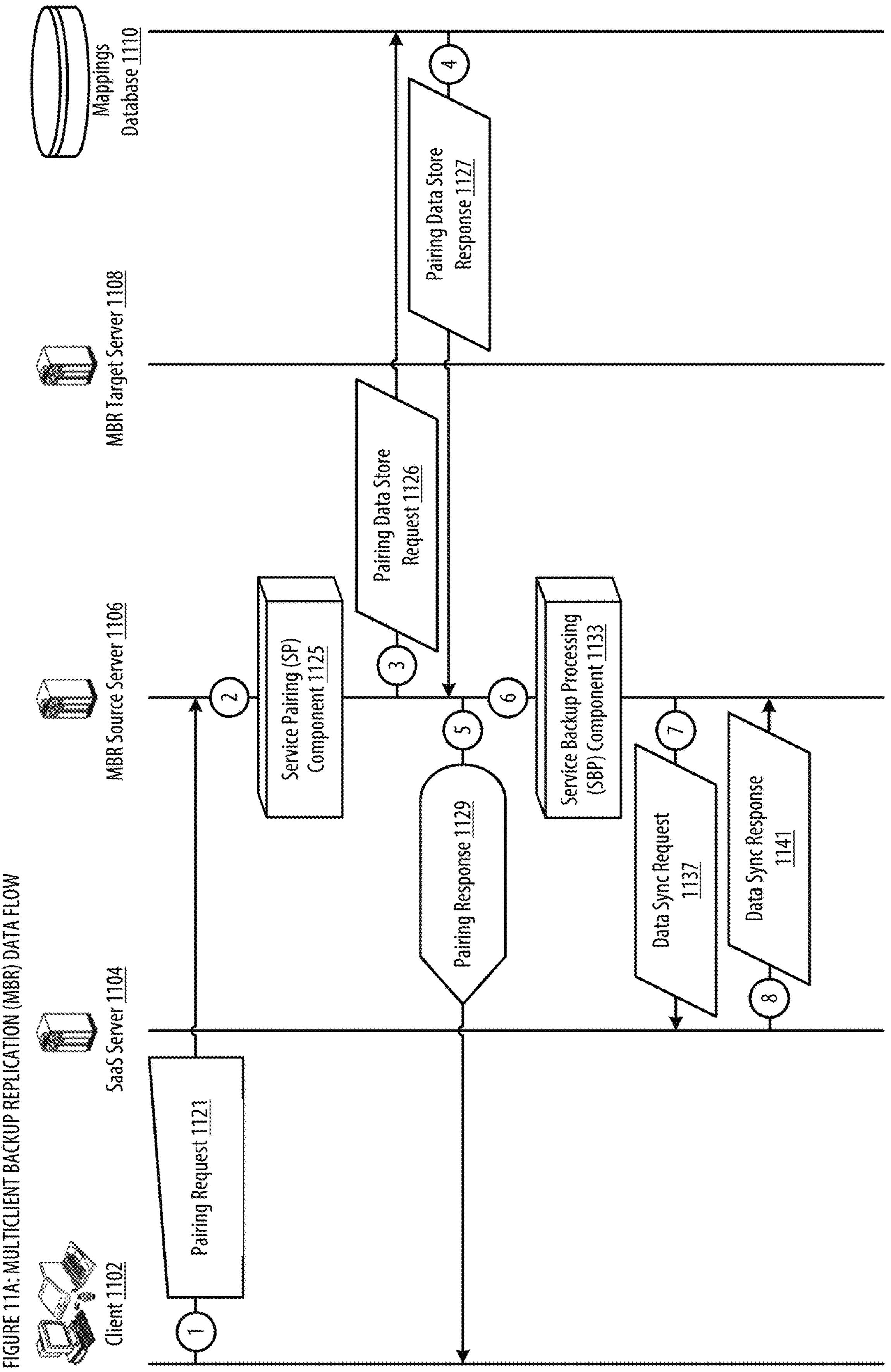
FIGURE 11A: MULTICLIENT BACKUP REPLICATION (MBR) DATA FLOW

FIGURE 11B: MBR DATA FLOW
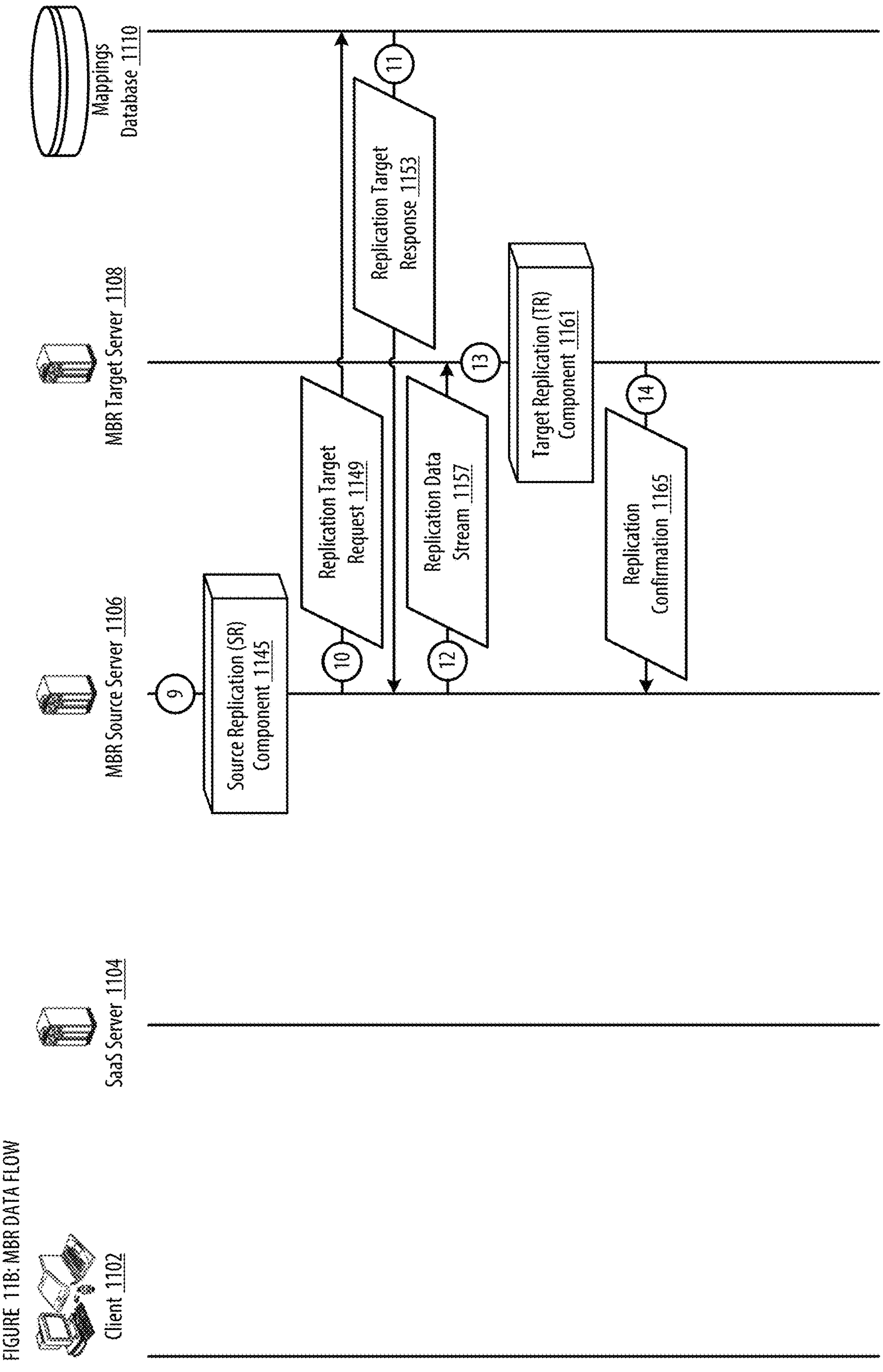

FIGURE 12: MBR SP COMPONENT
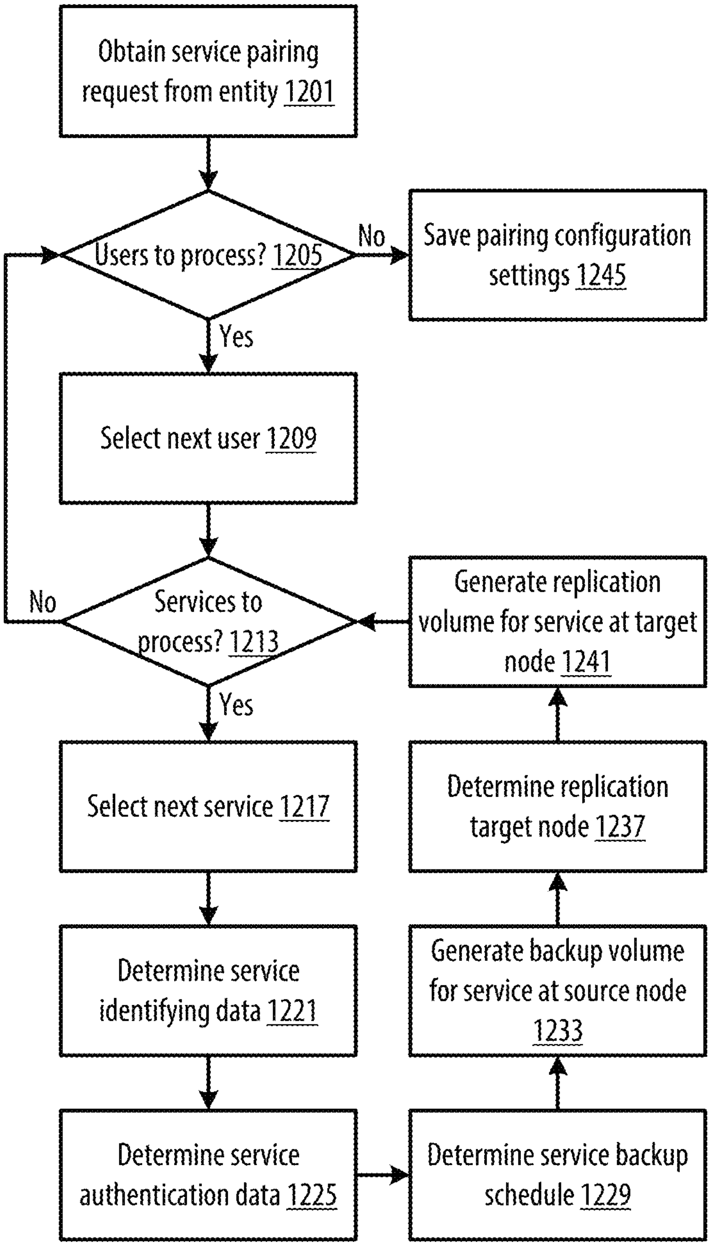

FIGURE 13: MBR SBP COMPONENT
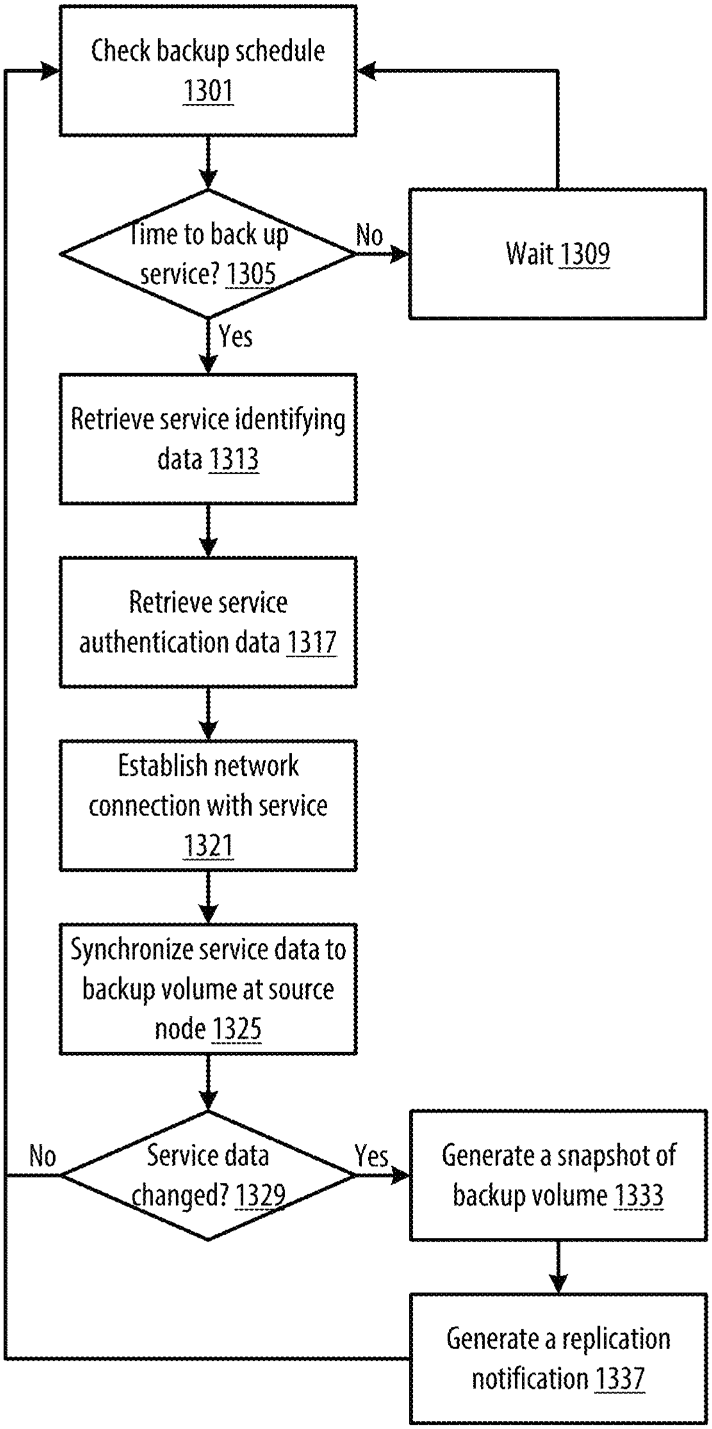

FIGURE 14: MBR SR COMPONENT
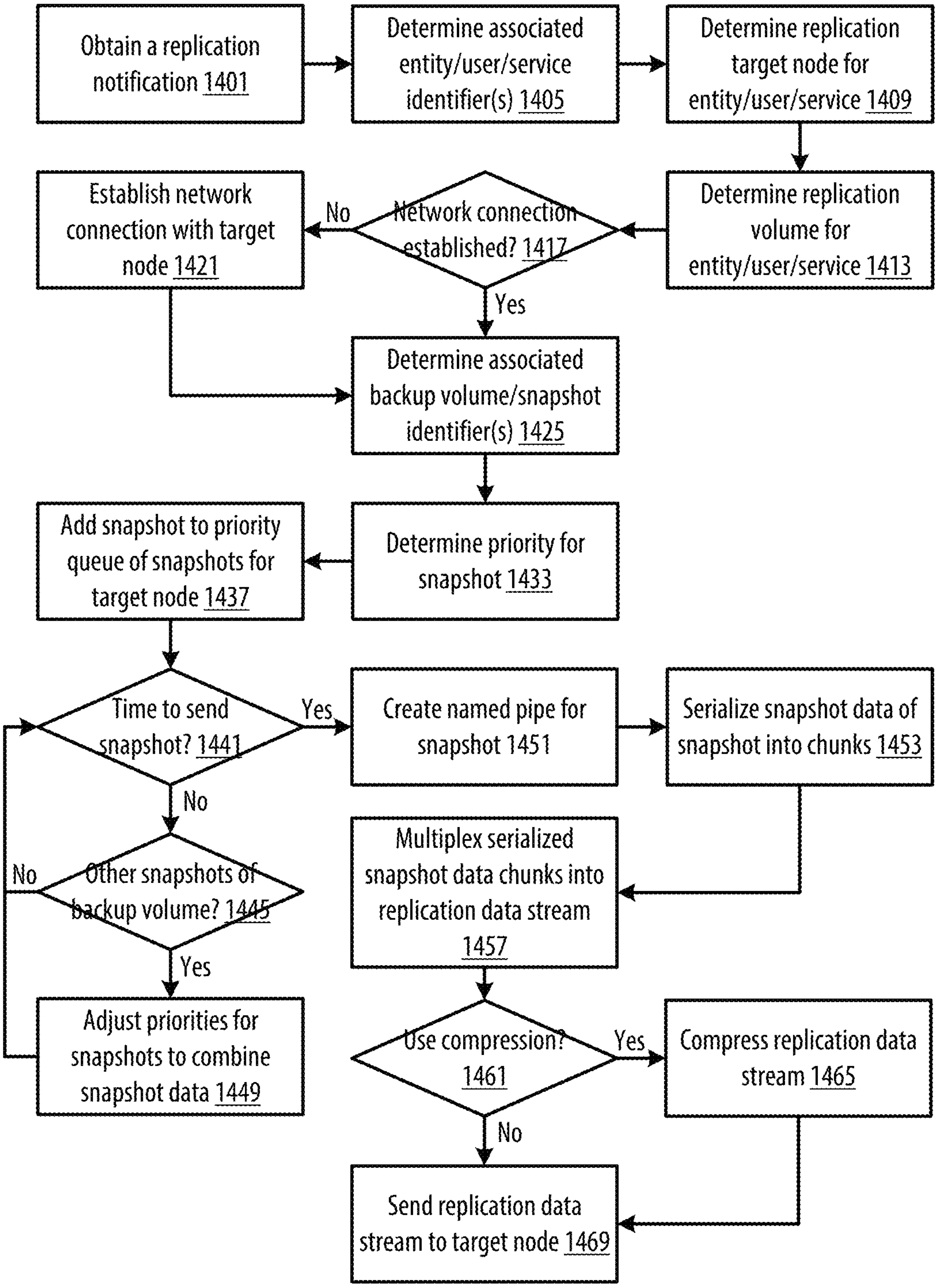

FIGURE 15: MBR TR COMPONENT
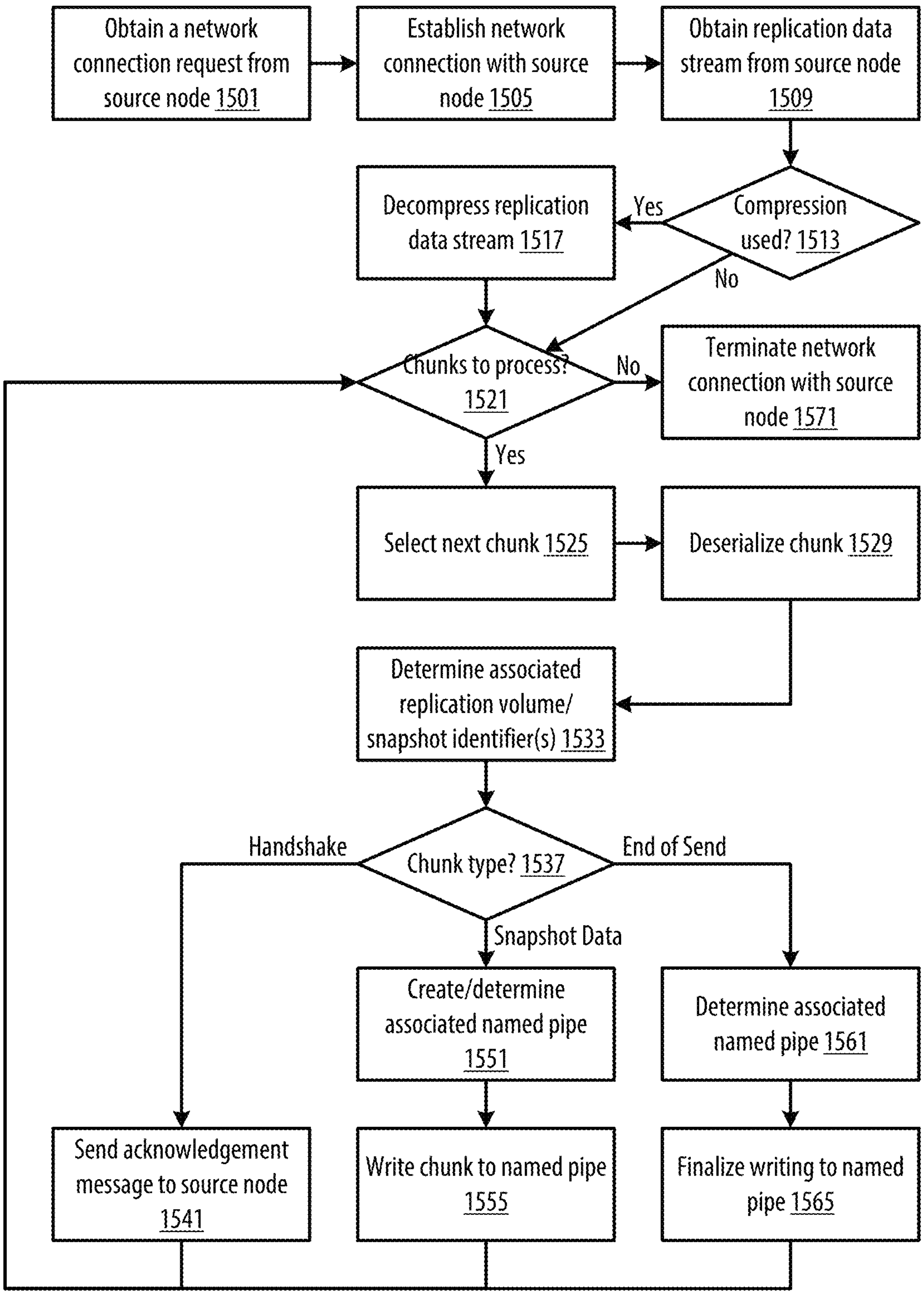

FIGURE 16: MBR IMPLEMENTATION CASE
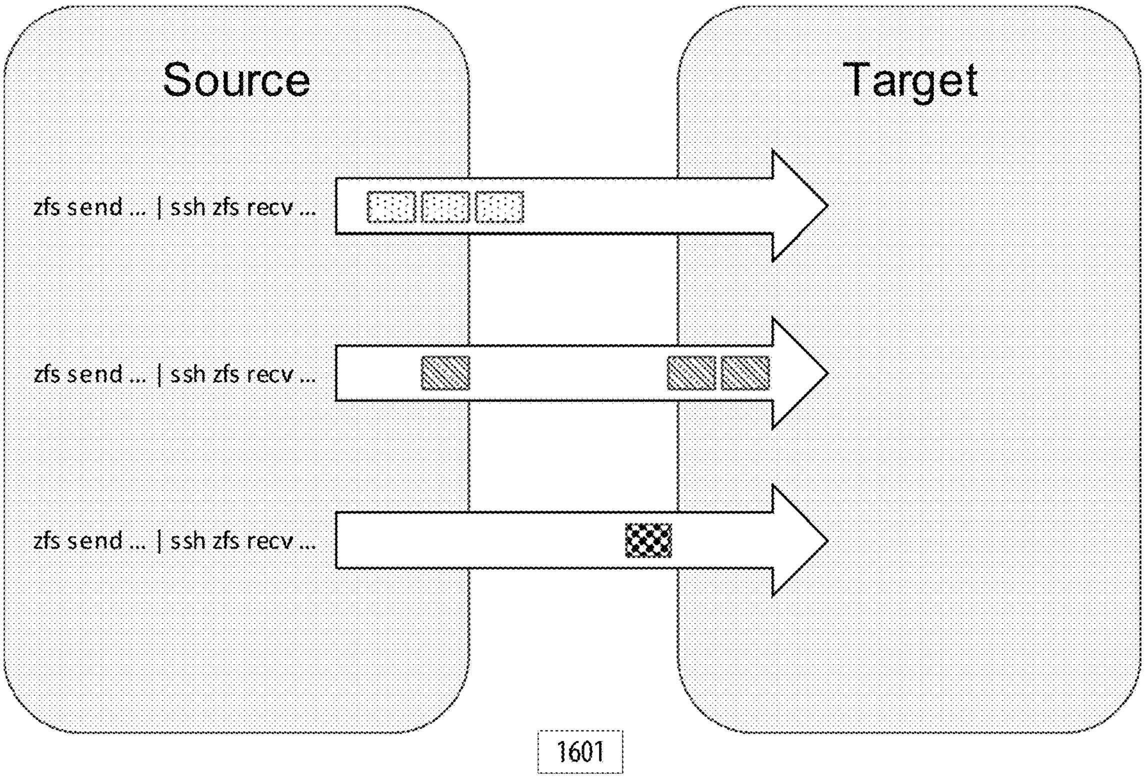
1601
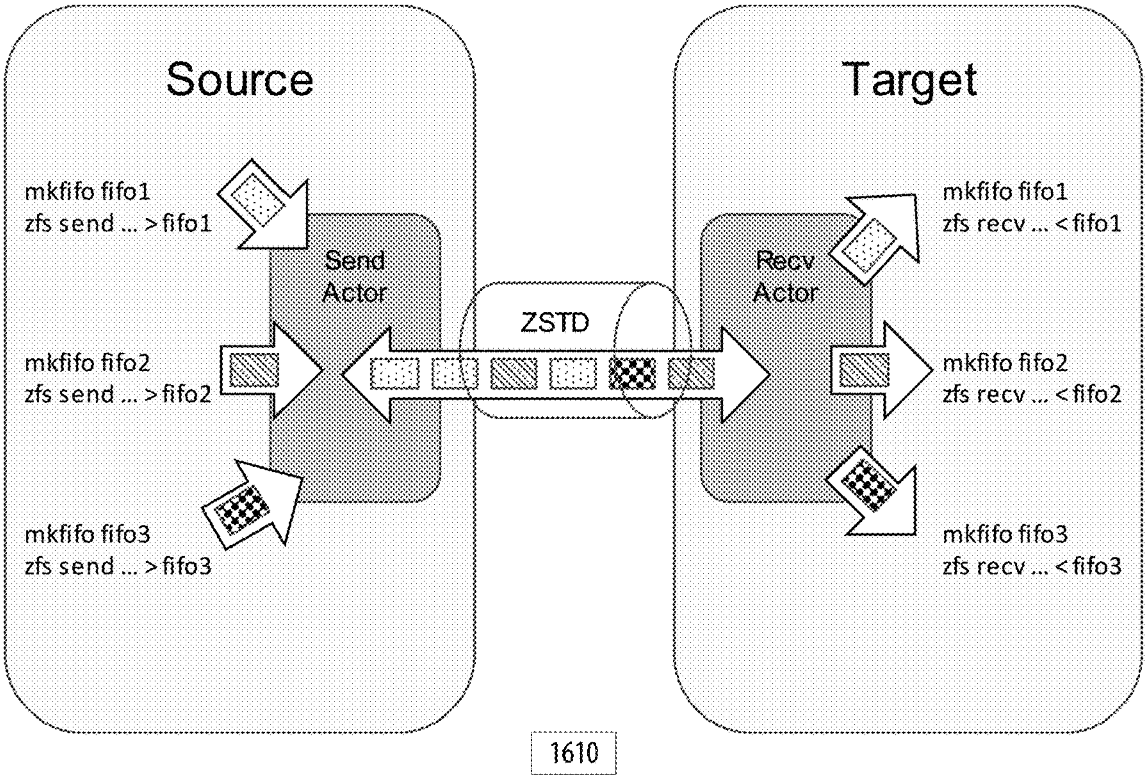
1610

FIGURE 17: MBR IMPLEMENTATION CASE
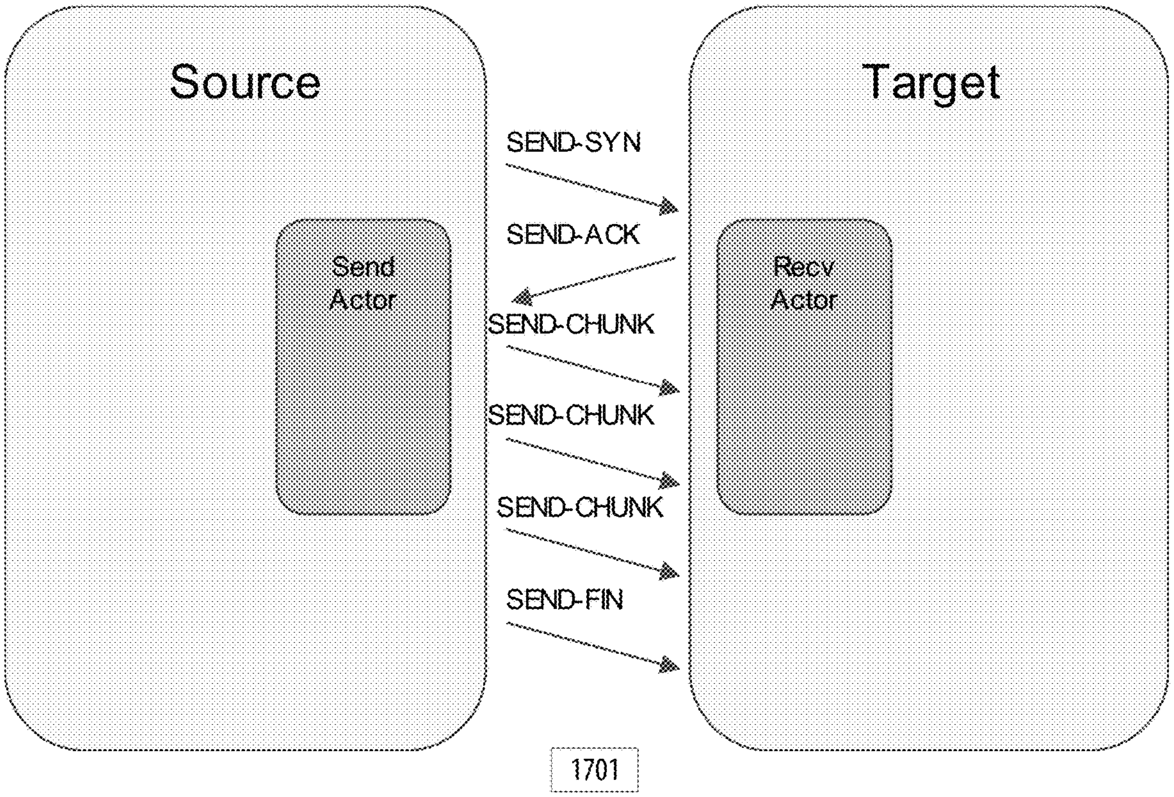

FIGURE 18: MBR Controller
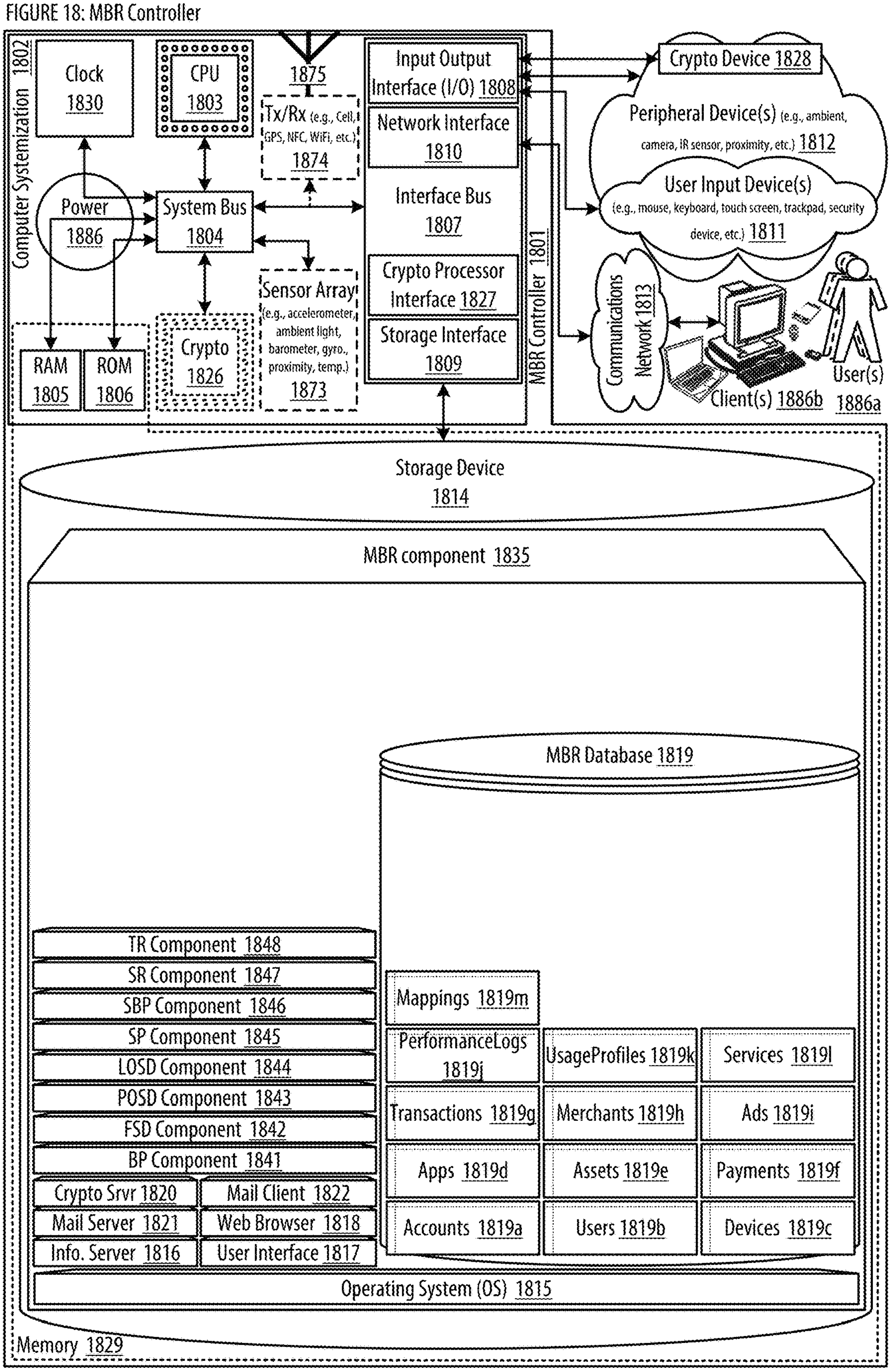

MULTICLIENT BACKUP REPLICATION APPARATUSES, METHODS AND SYSTEMS

PRIORITY CLAIM

Applicant hereby claims benefit to priority under 35 USC § 120 as a continuation-in-part of: U.S. patent application Ser. No. 16/391,243, filed Apr. 22, 2019, entitled "Source Volume Backup with Predictive and Lookahead Optimizations Apparatuses, Methods and Systems", and which in turn: claims benefit to priority under 35 USC § 120 as a continuation-in-part of: U.S. patent application Ser. No. 16/391,205, filed Apr. 22, 2019, entitled "Source Volume Backup with Adaptive Finalization Apparatuses, Methods and Systems", U.S. patent application Ser. No. 16/055,347, filed Aug. 6, 2018, entitled "SYSTEMS AND METHODS FOR COPYING AN OPERATING SOURCE VOLUME", and which in turn claims benefit to priority under 35 USC § 119 as a non-provisional conversion of U.S. provisional patent application Ser. No. 62/541,952, filed Aug. 7, 2017, entitled "SYSTEMS AND METHODS FOR COPYING AN OPERATING SOURCE VOLUME".

Applications of interest include: U.S. patent application Ser. No. 16/285,189, filed Feb. 25, 2019, entitled "Object-Level Metadata-Preserving Cross Heterogeneous Operating Systems Backup And Restore Apparatuses, Methods And Systems".

The entire contents of the aforementioned applications are herein expressly incorporated by reference.

This application for letters patent disclosure document describes inventive aspects that include various novel innovations (hereinafter "disclosure") and contains material that is subject to copyright, mask work, and/or other intellectual property protection. The respective owners of such intellectual property have no objection to the facsimile reproduction of the disclosure by anyone as it appears in published Patent Office file/records, but otherwise reserve all rights.

FIELD

The present innovations generally address backup systems, and more particularly, include Multiclient Backup Replication Apparatuses, Methods and Systems.

However, in order to develop a reader's understanding of the innovations, disclosures have been compiled into a single description to illustrate and clarify how aspects of these innovations operate independently, interoperate as between individual innovations, and/or cooperate collectively. The application goes on to further describe the interrelations and synergies as between the various innovations; all of which is to further compliance with 35 U.S.C. § 112.

BACKGROUND

Computer system backups are utilized to protect data from being lost due to equipment failures, malware and accidental deletions. A backup may involve copying files to be backed up from one location to another location. For example, files may be copied from a solid-state drive in a user's desktop to an external hard drive that may be connected to the user's desktop via USB.

BRIEF DESCRIPTION OF THE DRAWINGS

Appendices and/or drawings illustrating various, non-limiting, example, innovative aspects of the Multiclient Backup Replication Apparatuses, Methods and Systems (hereinafter "MBR") disclosure, include:

FIGS. 1A-B show block diagrams illustrating example aspects of backup networks, according to some embodiments for the MBR;

FIG. 2 shows a block diagram illustrating an exemplary embodiment of a backup system, according to some embodiments for the MBR;

FIG. 3 shows a logic flow illustrating embodiments of a backup processing (BP) component for the MBR;

FIGS. 4A-B show an exemplary process for copying a particular source volume to a target volume, according to some embodiments for the MBR;

FIG. 5 shows a datagraph illustrating data flow(s) for the MBR;

FIG. 6 shows a logic flow illustrating embodiments of a finalization settings determining (FSD) component for the MBR;

FIG. 7 shows a logic flow illustrating embodiments of a predictive optimization settings determining (POSD) component for the MBR;

FIGS. 8A-B show implementation cases for the MBR;

FIG. 9 shows a logic flow illustrating embodiments of a lookahead optimization settings determining (LOSD) component for the MBR;

FIGS. 10A-C show implementation cases for the MBR;

FIGS. 11A-B show a datagraph illustrating data flow(s) for the MBR;

FIG. 12 shows a logic flow illustrating embodiments of a service pairing (SP) component for the MBR;

FIG. 13 shows a logic flow illustrating embodiments of a service backup processing (SBP) component for the MBR;

FIG. 14 shows a logic flow illustrating embodiments of a source replication (SR) component for the MBR;

FIG. 15 shows a logic flow illustrating embodiments of a target replication (TR) component for the MBR;

FIG. 16 shows implementation case(s) for the MBR;

FIG. 17 shows implementation case(s) for the MBR;

FIG. 18 shows a block diagram illustrating embodiments of a MBR controller.

Generally, the leading number of each citation number within the drawings indicates the figure in which that citation number is introduced and/or detailed. As such, a detailed discussion of citation number 101 would be found and/or introduced in FIG. 1. Citation number 201 is introduced in FIG. 2, etc. Any citations and/or reference numbers are not necessarily sequences but rather just example orders that may be rearranged and other orders are contemplated. Citation number suffixes may indicate that an earlier introduced item has been re-referenced in the context of a later figure and may indicate the same item, evolved/modified version of the earlier introduced item, etc., e.g., server 199 of FIG. 1 may be a similar server 299 of FIG. 2 in the same and/or new context.

DETAILED DESCRIPTION

The Multiclient Backup Replication Apparatuses, Methods and Systems (hereinafter "MBR") transforms pairing request, replication data stream inputs, via MBR components (e.g., SP, SBP, SR, TR, etc. components), into pairing response, replication confirmation outputs. The MBR components, in various embodiments, implement advantageous features as set forth below.

Introduction

The MBR implements a way to backup data in an iterative way that reduces the size of the Copy-On-Write (CoW) file.

A finalization method may be utilized to determine when to stop the iteration and enter CoW mode. Optimization methods (e.g., predictive optimization, lookahead optimization) may be utilized to improve efficiency by providing iteration and redundancy reduction. The MBR provides unconventional features (e.g., a finalization method that has advantages in terms of reduced COW file size, establishing a snapshot closer to the target point in time, reduction in resources (cpu, transmission), avoiding an extended or perpetual process when data is changing rapidly) that were never before available in backup systems.

Logical volumes can be written to by one or more operating systems. These logical volumes can also be copied for multiple purposes, such as for backup of critical data or applications, or to make the contents of the source logical volume available at another time or location.

One way to create a copy of a source logical volume that is crash-consistent is to suspend all writes to the source volume while the copying process is ongoing. This can be achieved by instructing an operating system managing the source logical volume to stop writing to the source volume while the source volume is being copied to a target volume. However, for large logical volumes, this can impose an undesirable burden on performance since the time required to copy the source volume may be lengthy. For instance, the copying procedure may take hours, during which the source volume may be unable to accept new write requests.

Another way to create a copy of a source logical volume that is crash consistent is to cause the operating system managing the source volume to enter a copy-on-write mode before the copying process starts, and to remain in the copy-on-write mode until the source volume is completely copied to the target volume. A source volume can be considered to comprise multiple "blocks" of storage, wherein each block stores a certain amount of data. When in copy-on-write mode, the operating system intercepts every write instruction to the source volume before the write occurs. The operating system then determines, for every write, whether the write would (if allowed to proceed) modify a block of the source volume that has not yet been copied to the target volume. If the to-be-modified block has already been copied to the target volume, the operating system can allow the write to proceed. If the to-be-modified block has not yet been copied, the operating system can copy the original, un-modified contents of the to-be-modified block to a "copy-on-write file" or "CoW file", thereby preserving the original state of the to-be-modified block. After the original contents of the to-be-modified block have been safely copied to the CoW file, the operating system can allow the write instruction to modify the block.

At a later time, when the process copying the source volume to the target volume attempts to copy the modified block, the copying process can be re-directed to copy from the portion of the CoW file that stores the original contents of the modified block. In this way, the copy of the source volume that is copied to the target volume remains crash consistent because it reflects the state of the source volume at the instant the operating system entered copy-on-write mode (i.e., at the beginning of the copy process). A copy of a source logical volume that is crash consistent is typically associated with a time designation, where the time designation refers to a time that the copy process commenced, at which time the copy is crash consistent.

However, causing the operating system to enter a copy-on-write mode can also impact the performance and responsiveness of the operating system and the source volume. Requiring the operating system to examine every write instruction to the source volume, and potentially copy blocks of the source volume to the CoW file, can tie up scarce computational resources needed for other operating system processes. Furthermore, copy-on-write mode can decrease the perceived speed with which the source volume responds to write instructions. If the copying process takes a long time, and if the operating system makes many writes to the source volume during the copying process, a large amount of storage may need to be reserved for the CoW file to store the large number of blocks that are modified. In some systems, this storage for the CoW file must be reserved in advance, even though the operating system cannot predict exactly how long the copying process will take, or how many writes will need to be made to the source volume during the copying process. If the storage reserved for the CoW file is too small to hold all the blocks that were modified during the copying process, the entire copying process may fail. In these cases, the copying process may need to be re-started from the beginning. If the storage reserved for the CoW file is too large, less memory storage space is available for other data and/or applications.

These problems are exacerbated when copying large amounts of data to remote sites via network connections, such as Internet communication to the cloud. Communication over the Internet can be a relatively slow process compared to processes such as computation, file edits, and local copying. Such communication lengthens the copying process leading to more time for growth of the CoW file and presents problems with data transmission interruptions. Accordingly, systems and methods for copying data and data volumes are needed to address the shortcomings of current approaches.

According to one aspect, the present disclosure is directed at systems and methods for copying an operating source volume. For example, these systems and methods may be used to take a "snapshot" of an operating source volume, wherein the snapshot preserves a crash-consistent state of the source volume. According to some embodiments, a crash-consistent state of the source volume can reflect a state of the source volume as it existed at a single point in time. A crash-consistent state can also refer to a state of data on a volume such that if a computer managing the volume were to lose power or crash and be rebooted, the data on the volume can be operated on by the computer's operating system without error or data corruption. In some embodiments, if data in a crash-consistent state is restored to a computer, the operating system should be able to operate on the data as if the operating system had been powered off and on again.

According to one aspect, the present disclosure is directed at a method for copying a source volume comprising multiple blocks to a target volume while an operating system is configured to write to the source volume. The method can comprise (a) designating a set of one or more blocks to be copied from the source volume to the target volume; (b) copying the designated set of one or more blocks from the source volume to the target volume while the operating system is configured to write to the source volume; (c) identifying blocks of the source volume that were written to by the operating system while the operating system was configured to write to the source volume during step (b); (d) if one or more blocks were identified in step (c), comparing an aggregate size of the identified one or more blocks to a threshold, wherein: (d)(i) if the aggregate size is greater than or equal to the threshold: changing the designated set of one or more blocks to be copied from the source volume to the target volume to include the identified one or more blocks, and repeating steps (b), (c), and (d); (d)(ii) if the aggregate size is below the threshold: causing the operating system to enter a copy-on-write mode, in which contents of a block of the source volume that is targeted by a write instruction from the operating system are preserved in a copy-on-write file before the write instruction modifies the contents of the targeted block, and bringing the target volume into a state consistent with a state of the source volume at the time the copy-on-write mode was entered.

In some embodiments, the method includes changing the designated set of one or more blocks to be copied from the source volume to the target volume in (d)(i) to include only the identified one or more blocks.

In some embodiments, the method can conclude if no blocks were identified in step (c).

In some embodiments, designating the set of one or more blocks to be copied from the source volume to the target volume in step (a) comprises designating at least one of (i) all allocated blocks in the source volume, and (ii) all blocks in the source volume.

In some embodiments, the operating system can refrain from entering the copy-on-write mode during steps (a), (b), (c), and (d)(i).

In some embodiments, the method can further comprise receiving, during step (b), an indication that the operating system has written to a block of the source volume; determining, during step (b), whether the written-to block has already been copied to the target volume; if the written-to block has already been copied to the target volume, adding an identifier corresponding to the written-to block to a list of modified blocks; and if the written-to block has not already been copied to the target volume, refraining from adding the identifier corresponding to the written-to block to the list of modified blocks, wherein step (c) comprises evaluating said list of modified blocks. In some embodiments, the evaluating said list of modified blocks includes identifying blocks that are to be copied. According to some embodiments, the blocks that are to be copied are from important files. These files may be identified based on a desired configuration. Important files may include but are not limited to files such as documents or system settings. Files that are not to be copied may include less important files, such as temp files, blocks that have been deleted, browser histories, or other files that a system operator may deem unimportant based on a desired configuration.

In some embodiments, the method can further comprise receiving, during step (b), an instruction from the operating system to write to a block of the source volume; and adding an identifier corresponding to the written-to block to a list of modified blocks, wherein step (c) comprises evaluating said list of modified blocks.

In some embodiments, the threshold can be determined based on a maximum number of blocks that may be transferred from the source volume to the target volume within a target maximum time.

In some embodiments, the threshold can be determined based on a pre-defined proportion of a total size of at least one of the source volume and the target volume.

In some embodiments, the aggregate size of the identified one or more blocks can be a numerical count of the identified one or more blocks, and the threshold comprises a number of blocks.

In some embodiments, step (d)(ii) can comprise copying the identified one or more blocks from the source volume to the target volume while the operating system is in the copy-on-write mode.

In some embodiments, the source volume can be a client device and the target volume can be a backup aggregator at a site local to the client device.

In some embodiments, the source volume can be a client device and the target volume can be a storage server at a cloud storage center remote from the client device.

In some embodiments the source volume can be an aggregator and the target volume can be a cloud storage center remote from the client device.

In some embodiments the source volume and target device are volumes contained within the same device, such as a client computer or other computing device.

In another aspect, the present disclosure is directed at a computer system for copying a source volume comprising multiple blocks to a target volume while an operating system is configured to write to the source volume. The system can comprise: the source volume; a communication interface communicably coupled to the target volume; and at least one processor configured to execute computer-readable instructions which, when executed, cause the at least one processor to: (a) designate a set of one or more blocks to be copied from the source volume to the target volume; (b) copy the designated set of one or more blocks from the source volume to the target volume while the operating system is configured to write to the source volume; (c) identify blocks of the source volume that were written to by the operating system while the operating system was configured to write to the source volume during step (b); (d) if one or more blocks were identified in step (c), comparing an aggregate size of the identified one or more blocks to a threshold, wherein: (d)(i) if the aggregate size is greater than or equal to the threshold: change the designated set of one or more blocks to be copied from the source volume to the target volume to include the identified one or more blocks, and repeating steps (b), (c), and (d); (d)(ii) if the aggregate size is below the threshold: cause the operating system to enter a copy-on-write mode, in which contents of a block of the source volume that is targeted by a write instruction from the operating system are preserved in a copy-on-write file before the write instruction modifies the contents of the targeted block, and bring the target volume into a state consistent with a state of the source volume at the time the copy-on-write mode was entered.

In some embodiments, the changed designated set of one or more blocks to be copied from the source volume to the target volume in (d)(i) includes only the identified one or more blocks.

In some embodiments, the at least one processor can be configured to designate the set of one or more blocks to be copied from the source volume to the target volume in step (a) by being configured to designate at least one of (i) all allocated blocks in the source volume, and (ii) all blocks in the source volume.

In some embodiments, the at least one processor can be configured to refrain from entering copy-on-write mode during steps (a), (b), (c), and (d)(i).

In some embodiments, the at least one processor can be further configured to: receive, when executing step (b), an indication that the operating system has written to a block of the source volume; determine, when executing step (b), whether the written-to block has already been copied to the target volume; if the written-to block has already been copied to the target volume, add an identifier corresponding to the written-to block to a list of modified blocks; and if the written-to block has not already been copied to the target volume, refraining from adding the identifier corresponding to the written-to block to the list of modified blocks, wherein step (c) comprises evaluating said list of modified blocks.

In some embodiments, the at least one processor can be further configured to: receive, when executing step (b), an instruction from the operating system to write to a block of the source volume; and add an identifier corresponding to the written-to block to a list of modified blocks, wherein step (c) comprises evaluating said list of modified blocks.

In some embodiments, the threshold used by the at least one processor can be determined based on a maximum number of blocks that may be transferred from the source volume to the target volume within a target maximum time.

In some embodiments, the threshold used by the at least one processor can be determined based on a pre-defined proportion of a total size of at least one of the source volume and the target volume.

In some embodiments, the aggregate size of the identified one or more blocks used by the at least one processor can be a numerical count of the identified one or more blocks, and the threshold can comprise a number of blocks.

In some embodiments, the at least one processor can be configured to execute step (d)(ii) by being configured to copy the identified one or more blocks from the source volume to the target volume while the operating system is in the copy-on-write mode.

In some embodiments, the source volume of the computer system can be a client device and the target volume can be a backup aggregator at a site local to the client device.

In some embodiments, the source volume of the computer system can be a client device and the target volume can be a storage server at a cloud storage center remote from the client device.

In another aspect, the present disclosure is directed at a method for copying a source volume comprising multiple blocks to a target volume, the method comprising: (a) designating a set of one or more blocks to be copied from the source volume to the target volume; (b) copying the designated set of one or more blocks from the source volume to the target volume while an operating system is configured to write to the source volume; (c) identifying blocks of the source volume that were written to by the operating system while the operating system was configured to write to the source volume during step (b); and (d) comparing an aggregate size of the identified one or more blocks to a threshold, wherein: (d)(i) if the aggregate size is greater than or equal to the threshold: changing the designated set of one or more blocks to be copied from the source volume to the target volume to include the identified one or more blocks, and repeating steps (b), (c), and (d).

In some embodiments, the method includes changing the designated set of one or more blocks to be copied from the source volume to the target volume in step (d)(i) to include only the identified one or more blocks.

In some embodiments, step (d) can further comprise: (d)(ii) if the aggregate size is below the threshold: causing the operating system to enter a copy-on-write mode, in which contents of a block of the source volume that is targeted by a write instruction from the operating system are preserved in a copy-on-write file before the write instruction modifies the contents of the targeted block, and bringing the target volume into a state consistent with a state of the source volume at the time the copy-on-write mode was entered.

In another aspect, the present disclosure is directed at a computer system for copying a source volume comprising multiple blocks to a target volume, the system comprising: the source volume; a communication interface communicably coupled to the target volume; and at least one processor configured to execute computer-readable instructions which, when executed, cause the at least one processor to: (a) designate a set of one or more blocks to be copied from the source volume to the target volume; (b) copy the designated set of one or more blocks from the source volume to the target volume while an operating system is configured to write to the source volume; (c) identify blocks of the source volume that were written to by the operating system while the operating system was configured to write to the source volume during step (b); and (d) comparing an aggregate size of the identified one or more blocks to a threshold, wherein: (d)(i) if the aggregate size is greater than or equal to the threshold: change the designated set of one or more blocks to be copied from the source volume to the target volume to include the identified one or more blocks, and repeating steps (b), (c), and (d).

In some embodiments, the at least one processor can be configured to execute step (d) by further being further configured to: (d)(ii) if the aggregate size is below the threshold: cause the operating system to enter a copy-on-write mode, in which contents of a block of the source volume that is targeted by a write instruction from the operating system are preserved in a copy-on-write file before the write instruction modifies the contents of the targeted block, and bring the target volume into a state consistent with a state of the source volume at the time the copy-on-write mode was entered.

In some embodiments, the MBR provides unconventional features (e.g., using a multiplexed data stream for efficient and timely replication of backed up Software as a Service (SaaS) data and/or other data from multiple clients on a cloud node to another cloud node) that were never before available in backup systems.

Clients may have data in the cloud (e.g., Google Drive) and/or other data (e.g., on a local client device) that they wish to back up in the MBR backup cloud. Once such data is backed up, the MBR may snapshot the data to create a restore point (e.g., creating a ZFS snapshot) to be used in a data recovery scenario. Subsequent incremental backups may take additional snapshots, creating more restore points. In one embodiment, the MBR facilitates backing up the snapshot data that is on a source node in the MBR backup cloud by replicating the snapshots to replication targets at a target node to create a secure second copy. In one implementation, the MBR removes the need to perform filesystem operations to calculate differences in client snapshot data between the source node and the target node by tracking and maintaining a queue of client snapshot data that should be replicated, as it is created on the source node. In another implementation, the MBR maintains a single TCP/IP connection and simultaneously transfers multiple clients' snapshot data over the single connection by multiplexing the data into a single stream, better utilizing system resources.

MBR

According to one aspect, the disclosed systems and methods address the performance problems discussed above. In particular, in some embodiments, the disclosed systems and methods may allow a crash-consistent state of a source volume to be copied to a target volume even as an operating system is actively writing to the source volume. The disclosed systems and methods may also accomplish this while decreasing the amount of time the operating system spends in copy-on-write mode. Decreasing the amount of time spent in copy-on-write mode can, in turn, improve the performance of the operating system by making it more responsive to user commands. Furthermore, decreasing the amount of time spent in copy-on-write mode can reduce the amount of storage that must be reserved for a CoW file, thus freeing up additional storage resources for other data or applications. Decreasing the amount of storage required for a CoW file can also reduce the likelihood that a copy procedure fails because an insufficient amount of storage space was reserved for the CoW file at the beginning of the copy procedure. In some embodiments, the CoW file can be part of the source volume being copied. However, the CoW file does not have to be part of the source volume being copied, but can be a file stored outside of the source volume. The CoW file can also be stored on a separate part of a physical storage device (e.g., hard-drive) that holds all or part of the logical volume, or on an entirely separate physical storage device.

In some embodiments the CoW mode is not entered at the commencement of the copying process and is instead entered at a time later than the time that the copy process has commenced. Accordingly, crash consistent copy may be created with an associated time designation at a time the CoW mode is entered rather than at the commencement of the copying.

FIGS. 1A-B show block diagrams illustrating example aspects of backup networks, according to some embodiments for the MBR. FIG. 1A shows a block diagram illustrating example aspects of a backup network 100 that utilizes the disclosed systems and methods. In one embodiment, the backup network 100 may provide an image-based backup solution wherein a local device, e.g., a backup aggregator 102*a*, is responsible for and facilitates the aggregation of image-based backups from a plurality of client devices local to and/or in communication with the backup aggregator. For example, in one embodiment, a given client site, e.g., 101*a*, may have one or more backup aggregators in communication on a local area network, e.g., backup aggregator 102*a*. According to some embodiments, the devices may be in the same geographic site, campus. According to some embodiments, the client devices and backup aggregator are remote, for example, outside the local area network, geographic site, or campus. Client devices, which may be servers, workstations, laptops, and/or the like, e.g., 103*a*, 104*a*, may be in communication with backup aggregator 102*a* and periodically transfer (depicted as 105*a*, 106*a*) a representation of a block-level storage device to backup aggregator 102*a*. The backup aggregator may thereafter generate a snapshot of the received image backup file(s) according to a local backup schedule. The snapshot operation may be client device specific, such as for example a local backup snapshot policy that generates hourly backups for a mission-critical mail server while only generating daily snapshots of image backup files from a user's laptop. The backup network may also be configured such that the transfer of image-based backup files from client devices (such as servers, workstations, laptops, etc., described above) may differ from the local snapshot policy itself.

In one embodiment, backup aggregator 102*a* may maintain such a local backup policy while additionally maintaining a remote backup policy. The remote backup policy may be a backup policy maintained at the backup aggregator that determines how frequently the backup aggregator will synchronize certain image-based backup file snapshot data with remote cloud storage center 109. In one embodiment, backup aggregator 102*a* may coordinate the execution of its remote backup schedule (depicted as 107*a*) with a master server 110. The master server may receive from the backup aggregator an indicator of the backup aggregator's last known storage server pairing within the cloud storage center 109. A storage server, for example StorageServer A 111*a*, may be a server that is directly paired with the backup aggregator such that it is capable of receiving and applying to its own snapshot capable file system a received send file representing the file system differences between image-based file backups snap shotted at two different points in time.

In one embodiment, after coordinating with master server 110, a backup aggregator 102*a* may thereafter initiate a send file transfer operation (depicted as 108*a*), with its paired storage server 111*a* within the cloud storage center. In some embodiments, storage server 111*a* may itself have a paired or file system mirroring relationship with a second storage server. Such a backup network configuration may be useful in cases where the image-based backup snapshot history maintained on the backup aggregator would be advantageously stored on both the backup aggregator's paired server, e.g., 111*a*, and a secondary storage server located in a different geographical location. Such a configuration may enable recovery of cloud storage center stored image snapshot data even in scenarios where cloud storage center 109 is partially destroyed.

Furthermore, in one embodiment, the master server may direct the activity of multiple backup aggregators as well as manage or direct the pairing of backup aggregators with different storage server nodes within cloud storage center 109, e.g., StorageServer B, C, D, E, or F (StorageServer F 111*b*). It should be understood that the maintenance of the local or remote backup policy need not necessarily be performed by a backup aggregator device. For example, the master server or a storage server could instead maintain a backup policy associated with the backup aggregator. In such a configuration, the coordination of the backup aggregator with the master server may, for example, additionally comprise sending or receiving information about the currently active local or remote backup policy associated with the backup aggregator.

In some embodiments, each client device (e.g., 103*a*, 104*a*, 103*b*, 104*b*) can comprise a backup agent installed thereon to perform a backup or copying procedure. When the client device runs its backup agent, the backup agent may generate and send periodic backup files to a Backup Aggregator (e.g., Backup Aggregator X 102*a*). A periodic backup file may comprise an image-based backup. An image-based backup is a block-by-block copy of a portion of a hard-drive or logical volume. According to some embodiments, the image-based backup is of the allocated portion of a partially allocated hard-drive or logical volume or a portion thereof. According to some embodiments, the image-based backup is of portions of a hard-drive or logical volume that are selected by a user or system operator. According to other embodiments, the image-based backup may be of a full hard-drive or logical volume. A block refers to a specific physical area on a hard-drive, or a specific subset of a logical volume, which may contain data. In some embodiments, a block (sometimes called a physical record) can comprise a sequence of bytes or bits, having a specific length called the block size. Therefore, an image-based backup represents the contents of a source hard-drive or logical volume, exactly as this content was stored on the source hard-drive or logical volume at a single point in time. This data can include data associated with an operating system, and data stored in the system along with structural information and application configurations. The source used to create the image backup file need not actually be a physical hard drive and may, for example, be a virtual hard disk or even another image backup file. The embodiments described herein may be utilized on backup files that are based on a different formatting scheme but otherwise lend themselves to processing by the described embodiments of the backup network. Once generated, block-level image backup files may serve as the basis for restoring a hard drive or logical volume to a substantially similar state as present at the time of the backup, in particular, at the time of entering the CoW mode. Image backup files may contain additional data elements such as file system metadata that was present on the source hard drive or logical volume, master boot records, partition information and/or the like. This manner of backup may be distinguished from what may be thought of as a "file/directory level" backup which merely duplicates the contents and location of files and/or directories contained on a hard drive without necessarily including additional metadata, file system data, etc.

FIG. 1B shows a block diagram illustrating another exemplary embodiment of a backup network 100B that utilizes the disclosed systems and methods. In FIG. 1B, the backup network 100B may not include backup aggregators for some or all client sites (e.g., 101*a*, 101*b*). Instead, client devices (e.g., 103*a*, 104*a*, 103*b*, 104*b*) communicate directly with remote cloud storage center 109. In these embodiments, a backup agent installed on a client device (e.g., 103*a*) may communicate (e.g., 107C) with master server 110 in the cloud storage center 109 to coordinate the execution of its remote backup schedule. The master server may receive from the agent on the client device (e.g., 103*a*) an indicator of the client device's last known storage server pairing within the cloud storage center 109. For instance, the client device 103*a* may have been previously paired with Storage-Server A 111*a*. After coordinating with master server 110, the backup agent on the client device 103*a* may thereafter initiate a send file transfer operation, e.g., 108C, with its paired storage server 111*a* within the cloud storage center. Similarly, the backup agent on client device 104*b* may coordinate (e.g., 107D) the execution of its remote backup schedule with master server 110. If the client device 104*b* is paired with storage server 111*b*, the client device 104*b* may initiate a send file transfer operation, e.g., 108D, with its paired storage server 111*b*. The backup network 100B of FIG. 1B differs mainly from the backup network 100 of FIG. 1A in that client devices may communicate and transfer image-based backup files directly with cloud storage center 109, without the aid of a backup aggregator local to the client site 101*a*, 101*b*.

FIG. 2 shows a block diagram illustrating an exemplary embodiment of a backup system, according to some embodiments for the MBR. In FIG. 2, the backup system 200 includes a source volume 203 and a target volume 211. The source volume 203 and the target volume 211 may be on the same device (for example, on the same client computer or computer device, such as two partitions of a single hard drive or on two different hard drives on the same device) or may be on different devices (for example two different server blades or two different servers in the same location or at different locations connected via a communications network).

The disclosed systems and methods for copying a crash-consistent state of a source volume to a target volume may be used in several places in the backup network 100 or 100B. For instance, the disclosed systems and methods may be used to copy data stored at a client device (e.g., 103*a*, 104*a*, 103*b*, 104*b*) to a backup aggregator (e.g., 102*a*, 102*b*) in backup network 100. Alternatively, or in addition, the disclosed systems and methods may be used to copy data stored at a client device (e.g., 103*a*, 104*a*, 103*b*, 104*b*) directly to a storage server (e.g., 111*a*, 111*b*) in the cloud storage center 109 in backup network 100B. The disclosed systems and methods may be particularly useful in the latter context because the time required to copy a source volume from a client device to a storage server in cloud storage center 109 may be longer than the time required to copy the same source volume to a backup aggregator local to the client device. If the time required to copy the source volume is longer, the disclosed systems and methods' ability to decrease the amount of time the client device's operating system stays in copy-on-write mode becomes particularly important. As discussed above, decreasing the amount of time the client device's operating system stays in copy-on-write mode can be desirable because this lessens the performance burden on the client device, and decreases the amount of storage that must be reserved in advance for a CoW file.

FIG. 3 shows a logic flow illustrating embodiments of a backup processing (BP) component for the MBR. FIG. 3 is a flowchart depicting an exemplary process 300 for copying a source volume to a target volume, according to some embodiments. As discussed above, the source volume may be managed by an operating system that continues to write to the source volume 302 during the copying process 300. There is no need to take the source volume offline while the copying process is ongoing. Process 300 may be used to copy a source volume at a client device (e.g., 103*a*, 104*a*, 103*b*, 104*b*) to a backup aggregator (e.g., 102*a*, 102*b*) in backup network 100. Alternatively, or in addition, process 300 may be used to copy a source volume at a client device (e.g., 103*a*, 104*a*, 103*b*, 104*b*) to a storage server (e.g., 111*a*, 111*b*) in cloud storage center 109.

In some embodiments, process 300 may maintain at least three separate data structures: (i) a list of blocks to be copied from the source volume to the target volume (designated Blocks_to_Copy in the discussion below), (ii) a list of blocks that were modified by an operating system (OS) (designated Changed_Blocks in the discussion below), and (iii) a copy-on-write file (designated CoW_File in the discussion below). If used, the purpose and operation of each data structure is explained in greater detail below. When process 300 first begins, each data structure Blocks_to_Copy, Changed_Blocks, and CoW_File can be initialized to a null value.

At step 302, process 300 designates blocks to be copied. In some embodiments, the designated blocks to copy can include all allocated blocks in the source volume. In embodiments that use the data structure Blocks_to_Copy, this can be done by updating Blocks_to_Copy to include a list that identifies all allocated blocks in the source volume. Allocated blocks in the source volume can include blocks that have been identified by a file system on the source volume as containing useful data—unallocated blocks can include blocks in the source volume that do not store useful data. In other embodiments, step 302 can also simply designate all blocks in source volume (whether allocated or not) to be copied—this can be done by updating Blocks_to_Copy to include all blocks in the source volume (again, whether allocated or not). In other embodiments, the designated blocks to be copied may not include all allocated blocks. A set of excluded blocks from particular files may not be copied. For instance, certain files may not be advantageous to a back-up and restore application. Examples of such files include, but are not limited to or required to include, page files, swap files, hibernation files, files within a temp directory, old versions of operating systems, files that have been deleted but are still recoverable. Other files may be excluded as well, depending on the back-up and restore application. Excluding blocks from these files in the copying process can reduce the time to copy and reduce the data storage requirement. In some embodiments, the designated blocks to copy may be adjusted based on predictive optimization settings. The designated blocks to copy may be adjusted so that initial passes copy primarily the data blocks that tend to be more stable, while later passes copy the data blocks that tend to change more rapidly. In one implementation, predictive optimization settings associated with a backup may be determined via a predictive optimization settings determining (POSD) component. See FIG. 7 for additional details regarding the POSD component. For example, the predictive optimization settings may specify that busy blocks that tend to change more rapidly (e.g., determined based on historical change frequency) should not be copied during the first two passes (e.g., by adding the busy blocks to a Blocks_to_Copy_Later data structure). In another example, the predictive optimization settings may specify that blocks that changed most recently (e.g., such blocks may be more likely to change again soon compared to blocks that haven't changed in a while) should not be copied during the first five passes.

At step 302, process 300 can cause the operating system to enter an incremental tracking mode. While in incremental tracking mode, the operating system can keep track of every write instruction that modifies a block of the source volume. In some embodiments, the incremental tracking mode can also keep track of the time at which each write instruction occurred, and/or the sequence in which the write instructions occurred. Unlike when the operating system is in copy-on-write mode, the incremental tracking mode does not attempt to copy to a CoW file the contents of blocks that are being written to. Instead, the incremental tracking mode keeps a running list of all blocks in the source volume that have been modified by write instructions since the tracker was turned on. Since the incremental tracking mode does not attempt to copy contents of blocks to a CoW file, the incremental tracking mode imposes a relatively small performance burden on the operating system managing the source volume.

At step 304, process 300 copies the designated blocks from the source volume to the target volume. In embodiments that use the data structure Blocks_to_Copy, this step can comprise copying each block in the source volume identified in Blocks_to_Copy to the target volume according to a predetermined sequence, until there are no more blocks left to copy in Blocks_to_Copy. In embodiments that use the data structure Blocks_to_Copy_Later, this may comprise skipping copying blocks in Blocks_to_Copy_Later. In some embodiments, blocks are identified by a block number, and one example of a predetermined sequence is a numerically ascending order by block number. The predetermined sequence can also be based on physical locations of blocks on a memory device. For example, in some embodiments, each block may correspond to a physical location on a spinning optical or magnetic disk, wherein blocks are numbered according to the order of their physical locations on the disk. Physical storage devices that use spinning disks generally perform best when blocks are read sequentially in increasing numerical block order. Therefore, in some embodiments, the predetermined sequence may be arranged such that sequential or adjacent ranges of blocks are read in order from the block with the smallest block number to the block with the largest block number. Other types of physical storage devices may use solid state memory (e.g., SSDs) that uses different channels to read/write data in parallel. For these types of physical storage devices, the predetermined sequence may be arranged such that blocks are read in an order that pulls data from separate channels so they can be read in parallel (e.g., for improved efficiency) or such that blocks are read according to a randomly determined sequence. Other types of sequences for reading blocks are also possible. In some embodiments, the designated blocks to copy may be adjusted based on lookahead optimization settings. The designated blocks to copy may be adjusted (e.g., periodically, after a predetermined period of time) so that copying of changed blocks forward of the current copy position is accelerated and/or delayed to reduce the number of passes and/or to avoid redundant copying. In one implementation, lookahead optimization settings associated with a backup may be determined via a lookahead optimization settings determining (LOSD) component. See FIG. 9 for additional details regarding the LOSD component. For example, the lookahead optimization settings may specify that accelerated copy optimization should be utilized to add data blocks that changed forward of the current copy position and that had not been marked as changed blocks at the start of a current pass to the designated blocks to copy. In another example, the lookahead optimization settings may specify that delayed copy optimization should be utilized to skip copying data blocks that changed forward of the current copy position and that had been marked as changed blocks at the start of a current pass. Depending on the size of the source volume 302 and the available bandwidth between the source volume and the target volume, step 304 may take a considerable amount of time to complete (e.g., multiple minutes, hours, or even days). After all designated blocks have been copied from the source volume to the target volume, process 300 proceeds to step 306.

At step 306, process 300 identifies at least one block in the source volume that was written to by an operating system after said block was copied to the target volume. This can be done by evaluating records, logs, or data generated and/or modified by the operating system while in incremental tracking mode. For example, during execution of step 304, the incremental tracking mode could have determined whether each write by the operating system to the source volume is to a block of the source volume that has already been copied to the target volume, or has not been copied to the target volume. If the write is to a block of the source volume that has already been copied, the process 300 (while in incremental tracking mode) could add an identifier corresponding to the block of the source volume that was written to by the operating system to a running list of modified blocks. In some simpler embodiments, the incremental tracking mode could forego checking whether a written-to block has been copied to the target volume yet—instead, the mode could simply list all blocks that were written-to during execution of step 304. At step 306, the process of identifying blocks that were written to after said block was copied to the target volume may comprise evaluating the running list of modified blocks maintained by the process 300 while in incremental tracking mode. In embodiments that use the data structure Changed_Blocks, step 306 can comprise updating Changed_Blocks to include a list of each block that was changed after said each block was copied to the target volume. Said another way, Changed_Blocks can be updated to identify each block in the source volume whose corresponding copy in the target volume is now outdated.

In some cases, no blocks may be identified in step 306. This may be because no blocks were written to by the operating system during step 304. Or, alternatively, this may be because some blocks were written to by the operating system during step 304, but all such blocks were modified before they were copied to the target volume (e.g., the target volume already includes the most up-to-date version of the modified blocks). In these cases, process 300 may end at step 306 without proceeding to step 308.

At step 308, process 300 determines whether to enter the CoW mode. In one embodiment, the CoW mode should be entered if finalization settings have been satisfied. In one implementation, finalization settings associated with a backup may be determined via a finalization settings determining (FSD) component. See FIG. 6 for additional details regarding the FSD component. For example, the finalization settings may specify that the CoW mode should be entered if the block size metric has been satisfied (e.g., the aggregate size of all the blocks identified in step 306 is less than a threshold). The threshold may be a fixed aggregate size (e.g., expressed in units of storage such as megabytes, gigabytes, or terabytes), or may be a dynamic size calculated based on an available bandwidth between source volume and target volume, or the size of the source volume or target volume. For instance, the threshold may be calculated by determining the maximum amount of data that may be transferred from the source volume to the target volume within a pre-defined target maximum time, given the available bandwidth between the two computers hosting the two volumes, or it may be calculated based on a pre-defined proportion of the total size of at least one of the source volume or target volume. Alternatively, instead of comparing the aggregate size of the identified blocks against a size threshold, the number of identified blocks may be compared against a numerical threshold (e.g., 500 blocks). If the CoW mode should not be entered (e.g., the number and/or aggregate size of all the blocks identified in step 306 is greater than or equal to the threshold), process 300 branches to step 310. If the CoW mode should be entered (e.g., the aggregate size is less than the threshold), process 300 branches to step 312.

If process 300 branches to step 310, the aggregate size of all the changed blocks that were identified in step 306 may still be relatively large. Process 300 may then change the designated blocks to be copied to be the blocks identified in step 306. In embodiments that use the data structures Blocks_to_Copy and Changed_Blocks, this step can comprise updating Blocks_to_Copy so that it lists the same data blocks as the Changed_Blocks. In some embodiments, the designated blocks to copy may be adjusted based on the predictive optimization settings. For example, if the predictive optimization settings specify that the busy blocks should not be copied during the first two passes, the busy blocks may be removed from the Blocks_to_Copy_Later data structure and added to the Blocks_to_Copy data structure after the first two passes. Process 300 then branches back to step 304.

When process 300 loops back to step 304, process 300 once again copies the designated blocks from the source volume to the target volume, except this time the blocks that changed during the last copy procedure and/or the blocks that were designated to be copied later are copied. According to some embodiments, only the blocks that changed during the last copy procedure and/or the blocks that were designated to be copied later are copied. As discussed above, this can comprise copying each data block listed in Blocks_to_Copy to the target volume. In some embodiments, when process 300 loops back to step 304, process 300 once again copies the designated blocks from the source volume to the target volume, except this time only the blocks that changed during the last copy procedure and/or the blocks that were designated to be copied later are copied. In copying only the blocks that changed during the last copy procedure (e.g., only the blocks that are identified by Changed_Blocks and Blocks_to_Copy) and/or the blocks that were designated to be copied later, other blocks that were previously copied to the target volume are not disturbed. Instead, those blocks in the target volume that are known to be outdated are updated to reflect these blocks' new contents. In some embodiments, the designated blocks to copy may be adjusted based on lookahead optimization settings.

After completing step 304, process 300 again branches to step 306, where process 300 once again identifies blocks that were changed during the last copy procedure (e.g., the second time through step 304). In embodiments that use the data structure Changed_Blocks, this can comprise updating Changed_Blocks to include only those data blocks that changed during the last copy procedure (e.g., the second time through step 304). After completing step 306, process 300 once again branches to step 308.

If the rate at which data is being copied from the source volume to the target volume exceeds the rate at which data is being changed in the source volume by the operating system, the number and/or aggregate size of the blocks that are identified in step 306 should generally decrease each time process 300 loops through steps 304, 306, 308, and 310. With each loop, process 300 checks at step 308 whether the CoW mode should be entered (e.g., whether the aggregate size of the blocks identified in step 306 (e.g., the aggregate size of the blocks listed in Changed_Blocks) is less than the aforementioned threshold). If not, process 300 loops through steps 310, 304 and 306 again. If yes, process 300 exits the loop and branches to step 312.

During steps 302, 304, 306, 308 and 310, the operating system writing to the source volume does not operate in copy-on-write mode. However, at step 312, process 300 enters copy-on-write mode. As discussed above, in copy-on-write mode, the operating system intercepts every write instruction to the source volume before the write occurs. The operating system determines, for every write, whether the write will modify a block of the source volume that has not yet been copied to the target volume. If the to-be-modified block has already been copied to the target volume, the operating system can allow the write to proceed. If the to-be-modified block has not yet been copied, the operating system can copy the original contents of the to-be-modified block to a "copy-on-write file" or CoW_File, thereby preserving the original contents of the block before it is modified by the write. The CoW_File is generally not part of the source volume being copied, but is a file stored outside of the source volume. As discussed above, the CoW_File can be stored on a separate part of a physical storage device (e.g., hard-drive) that holds all or part of the source volume, or on an entirely separate physical storage device. After the original contents of the to-be-modified block have been safely copied to the CoW_File, the operating system can allow the write instruction to modify the block.

At step 314, process 300 copies the identified blocks (e.g., blocks identified the last time through step 306, or the blocks listed in Changed_Blocks and/or the blocks that were designated to be copied later) to the target volume. As process 300 copies each identified block in turn, process 300 determines whether each identified block was modified by the operating system since the operating system entered copy-on-write mode. If not, process 300 copies the identified block from the source volume to the target volume. If yes, process 300 copies the original version of the identified block, as preserved in the CoW_File, to the target volume.

A time associated with the time at which the operating system entered the copy-on-write mode can be used as a designation for the time at which the copy is crash consistent. For example, the time designation of the copy can be the hour, minute, second the CoW mode was entered, stated to a desired time resolution. According to some embodiments, some function of that entry time could be used for the designation. Such functions include but are not limited to the time of the last write event before the CoW process commenced, a fixed time before CoW commenced.

By the end of step 314, the target volume contains a crash-consistent copy of the source volume. The copy in the target volume reflects the state of the source volume at the time when process 300 entered copy-on-write mode in step 312, and not the state of the source volume at the time when process 300 began in step 302. By delaying the time at which the operating system enters copy-on-write mode, process 300 improves the performance of the computer systems in backup networks 100, 100B in several ways. First, process 300 decreases the amount of time that the operating system writing to the source volume (e.g., the operating system of client devices 103*a*, 104*a*, 103*b*, 104*b*) has to stay in copy-on-write mode. By decreasing the amount of time spent in copy-on-write mode, process 300 decreases the number of CoW-related writes to a CoW file that the operating system needs to perform, thereby decreasing the performance burden on the operating system. Second, by decreasing the amount of time spent in copy-on-write mode, process 300 decreases the amount of storage that must be reserved for a CoW file. This frees up processing and storage resources for other applications, thereby allowing client devices to perform faster and more efficiently.

At 316, backup performance characteristics associated with the backup may be logged. In various implementations, logged backup performance characteristics may include the number of passes until CoW mode is entered, the amount of data stored in each pass, completion time for each pass, resource usage intensity (e.g., CPU usage, I/O usage, network usage, power usage), a usage profile associated with the backup (e.g., client device identifier, site identifier, customer identifier, date, time, day of the week, number of users), data blocks change frequency, and/or the like. For example, the backup performance characteristics may be logged via a MySQL database command similar to the following:

INSERT INTO PerformanceLogs (deviceID, performanceCharacteristicsData)
VALUES (ID_client_device_1, "performance characteristics");

Example C code for implementing process 300 is provided below:

```
// main logic of the copy process:
    ret = start__tracking(source__device, mount__point, &cow);
    if (ret != 0) {
        return 1;
    }
    uint64__t how__much__copied = 0;
    while (1) {
        /* initial copy of all blocks (or all allocated blocks) */
        ret = copy__identified__blocks (url, source__device, last__cow,
        &how__much__copied);
// no tracking file to work with, copy everything
        if (ret != 0) {
            return 1;
        }
        if (how__much__copied > 500) // if the threshold has been
        surpassed, do it again
        { // atomically get the current tracking data, put it aside, and
clear the tracking data list for the next sweep
            ret = reset__tracking(mount__point, &cow);
            if (ret != 0) {
                return 1;
            }
            continue;
        }
        break;
    }
    /* so now we've done a number of sweeps of live data to the point
where our last sweep
     * did less than 500 blocks, now take a real snapshot and do one
     last copy. */
    ret = make__snapshot(mount__point, &cow); // transition to
    snapshot only
    if (ret != 0) {
        return 1;
    }
    // copy from source volume or from CoW file, as appropriate
    char snapname[1000];
    sprintf(snapname, "/dev/datto%d", MEGA__MINOR);
    ret = copy__identified__blocks(url, snapname, last__cow,
    &how__much__copied);
    if (ret != 0) {
        return 1;
    }
// end of main logic process.
```

Example C code for copying identified blocks based on incremental tracking data is provided below:

```
int copy__identified__blocks(char *url, char *device, char *tracking, uint64__t
*how__much__copied)
{
    fdlive = open__direct(device, O__RDONLY);
    snap__size = lseek(fdlive, 0, SEEK__END);
    total__blocks = (snap__size + COW__BLOCK__SIZE - 1) / COW__BLOCK__SIZE;
    total__chunks = (total__blocks + INDEX__BUFFER__SIZE - 1) / INDEX__BUFFER__SIZE;
    lseek(fdlive, 0, SEEK__SET);
    mappings = (uint64__t *)mymalloc(INDEX__BUFFER__SIZE * sizeof(uint64__t));
    for (i = 0; i < total__chunks; i++) {
        blocks__to__read = MIN(INDEX__BUFFER__SIZE, total__blocks - blocks__done);
        if (tracking != NULL) {
            //read a chunk of incremental tracking data
            bytes = pread(fdcow, mappings, blocks__to__read * sizeof(uint64__t),
            COW__HEADER__SIZE + (INDEX__BUFFER__SIZE * sizeof(uint64__t) * i));
            if (bytes != blocks__to__read * sizeof(uint64__t)) {
                goto error;
            }
        }
```

-continued

```
        //copy blocks where the incremental tracking says something was written
        for (j = 0; j < blocks__to__read; j++) {
            if (tracking != NULL) {
                if (!mappings[j])
                    continue;
            }
            ret = copy__block(url, fdlive, (INDEX__BUFFER__SIZE * i) + j);
            if (ret) {
                    goto error;
                }
            (*how__much__copied)++;
        }
        blocks__done += blocks__to__read;
    }
}
```

FIGS. 4A-B show an exemplary process for copying a particular source volume to a target volume, according to some embodiments for the MBR. FIG. 4A depicts an exemplary process 400 for copying a source volume 402 to a target volume 403 that illustrates principles of process 300. As discussed above, source volume 402 may be managed by an operating system (not shown) that continues to make writes to the source volume 402 during the entire copying process. Therefore, there is no need to take source volume offline while the copying process is ongoing.

At step 404, process 400 begins when the operating system managing the source volume 402 enters an incremental tracking mode. As discussed above, the incremental tracking mode keeps track of which blocks have been modified by the operating system, and potentially the time and/or sequence in which these modifications took place.

At step 406, process 400 begins copying every allocated block in the entire source volume 402 to the target volume 403. This process may comprise a software loop that copies each block in the source volume 402 to the target volume 403 according to a predetermined sequence until there are no more blocks in the source volume 402 to be copied. For simplicity of explication, FIG. 4A and the subsequent explanation below assumes that the entire source volume 402 is being copied to the target volume 403 in step 406. However, it should be understood that, in some embodiments, only the portion of the source volume that has been allocated by the operating system may be copied in this step; in other embodiments, the entire source volume (whether allocated or not) may be copied. Depending on the size of the source volume 402 and the available bandwidth between source volume 402 and target volume 403, the process of copying the entire source volume 402 to the target volume 403 may take a considerable amount of time (e.g., multiple minutes, hours, or even days).

At step 408, process 400 verifies that the process of copying the entire source volume 402 to the target volume 403 is complete. At this point, the copying process evaluates records, logs, or data generated and/or modified by the operating system while in incremental tracking mode and identifies the blocks that changed during the previous copy procedure, i.e., the copy procedure of step 406. In some embodiments, the identified blocks include each block that was modified by write instructions after said each block had been copied to target volume 403. As illustrated in FIG. 4A, these identified blocks include the blocks at regions 408*a*, 408*b*, 408*c*, and 408*d* in the source volume.

At step 410, process 400 determines that the CoW mode should not be entered (e.g., the aggregate size of the blocks at regions 408*a*, 408*b*, 408*c*, and 408*d* is greater than or equal to a threshold). Process 400 therefore does not enter copy-on-write mode, but instead proceeds to copy only the blocks identified in step 408 (i.e., 408*a*, 408*b*, 408*c*, and 408*d*) to the corresponding locations in target volume 403. As a result, the portions 410*a*, 410*b*, 410*c*, and 410*d* in target volume 403, which correspond to the identified regions 408*a*, 408*b*, 408*c* and 408*d* in the source volume 402, are updated to reflect the new state of these identified regions. If the rate at which data is being copied from source volume 402 to target volume 403 exceeds the rate at which data in source volume 402 is being changed by the operating system, the aggregate size of the identified regions 408*a*, 408*b*, 408*c*, and 408*d* should be smaller than the size of the entire source volume 402. Therefore, the copying process of step 410 will generally take less time than the copying process of step 406.

At step 412, process 400 verifies that the process of copying the blocks identified in step 408 is complete. At this point, the copying process again evaluates the records, logs, or data generated and/or modified by the operating system while in incremental tracking mode and identifies the blocks that changed during the previous copy procedure, i.e., the copy procedure of step 410. In some embodiments, the identified blocks can include each block that was modified by write instructions after said each block had been copied to target volume 403. As illustrated in FIG. 4A, these identified blocks include the blocks at regions 412*a* and 412*b* in the source volume.

At step 414, process 400 determines that the CoW mode should not be entered (e.g., the aggregate size of the blocks at regions 412*a* and 412*b* is greater than or equal to a threshold). Process 400 therefore does not enter copy-on-write mode, but instead proceeds to copy only the blocks identified in step 412 (i.e., 412*a* and 412*b*) to the corresponding locations in target volume 403. As a result, the portions 414*a* and 414*b* in target volume 403, which correspond to the identified regions 412*a* and 412*b*, are updated to reflect the new state of these identified regions. If the rate at which data is being copied from source volume 402 to target volume 403 exceeds the rate at which data in source volume 402 is being changed by the operating system, the aggregate size of the identified regions 412*a* and 412*b* should be smaller than the aggregate size of the regions 408*a*, 408*b*, 408*c*, and 408*d* identified in step 408.

At step 416, process 400 verifies that the process of copying the blocks at regions 412*a* and 412*b* is complete. At this point, the copying process again evaluates the records, logs, or data generated and/or modified by the operating system while in incremental tracking mode and identifies the blocks that changed during the previous copy procedure, i.e., the copy procedure of step 414. As illustrated in FIG. 4A, these identified blocks include the blocks at region 416*a*.

Turning to FIG. 4B, at step 418, process 400 determines that the CoW mode should be entered (e.g., the aggregate size of the blocks at region 416*a* is less than the threshold). As a result, process 400 enters copy-on-write mode in step 420, then begins the process of copying the identified blocks at 416*a* to the target volume.

The operation of copy-on-write mode is illustrated at step 422. While in copy-on-write mode, the operating system intercepts every write instruction (e.g., write 423) to the source volume before the write occurs. If the write would modify a block in source volume 402 that has not yet been copied to target volume 403, the original contents of the to-be-modified block can first be preserved in CoW file 450. For example, a copy of the original contents 452 can be stored in CoW file 450.

As illustrated in step 424, when process 400 attempts to copy a block that was modified by the operating system, process 400 can copy the original contents of that block (as preserved in CoW file 450) to the target volume. At the end of step 424, the target volume 403 contains a crash-consistent snapshot of source volume 402—this crash-consistent snapshot reflects the state of source volume 402 at the time that the operating system entered copy-on-write mode, in step 420. After the end of step 424, process 400 can optionally exit copy-on-write mode and turn off the incremental tracking mode.

As described above, the systems and methods taught herein can reduce the time spent in copy-on-write mode. This reduced time reduces the risk of unrecoverable problems that can occur during the copying process. For instance, in some embodiments, interruptions may occur in the copying process leading to a partial copy than cannot be accurately completed. Interruptions can be of a particular concern when data is being copied directly to the cloud. This is because copying data to the cloud requires network transmission, which may be compromised or complicated in the event of an interruption. Interruptions in the copying process occur due to a variety of factors or scenarios. During these scenarios, the copying process may or may not be running. For example, a breakdown in the network connection without causing a concurrent pause in the operation of the agent that is directing the copying. According to another exemplary scenario, the computer could be put to sleep or into a hibernation state, during which the network connection may break but during which the agent directing the copying is not running According to another exemplary scenario, the backup agent could be stopped by the user, during which the network is still functional but the agent directing the copying is not running According to another exemplary scenario, the computer on which the agent directing the copying resides may be shut down or rebooted (either cleanly or unexpectedly), during which the agent directing the copying may not be running but the network may still be functional. Other scenarios are contemplated.

The examples listed above can be broken up into two functional categories. In the first category, the agent directing the copying may be unaware that its operation was suspended. For example, when a computer hibernates, it may wake up in the same state it was in before hibernation. However, the network connection may have been broken during hibernation. In the second category, the agent directing the copying may be sufficiently aware of network failures (for example, that the software cannot connect to or communicate with the server anymore) or other interruption causing events (for example shutdowns and restarts). Thus, in the first category, to the agent directing the backup, it appears as if there is a temporary network failure. In response, the agent may attempt to reconnect to the server and continue the backup as if the interruption did not occur.

In the second category, during the interruption, the program continues to run and thus the agent can detect that the network connection was broken and attempts to reconnect to the server. In the case of the network disconnecting, the software may continue to try to connect to the server until a connection is re-established. In the case of shutdown or a restart of the computer running the software, the software may take note of the current state of the backup process and write the state of the backup to a disk. Accordingly, at the next restart, this state can be read from the disk and the system may reconnect to the server and continue sending data where it left off. This may also include recreating the snapshot the system was in the process of creating when in snapshot mode, as opposed to incremental tracking mode.

FIG. 5 shows a datagraph illustrating data flow(s) for the MBR. In FIG. 5, a client 502 (e.g., at a client site) may send a backup request 521 to a MBR server 506 to initiate a backup. For example, the client may be a desktop, a laptop, a tablet, a smartphone, a smartwatch, and/or the like that is executing a client application. In one implementation, the backup request may include data such as a request identifier, a device identifier, a client site identifier, a source volume identifier, blocks to be copied, a target volume identifier, finalization configuration settings, optimization configuration settings, and/or the like. In one embodiment, the client may provide the following example backup request, substantially in the form of a (Secure) Hypertext Transfer Protocol ("HTTP(S)") POST message including eXtensible Markup Language ("XML") formatted data, as provided below:

```
POST /authrequest.php HTTP/1.1
Host: www.server.com
Content-Type: Application/XML
Content-Length: 667
<?XML version = "1.0" encoding = "UTF-8"?>
<auth_request>
    <timestamp>2020-12-31 23:59:59</timestamp>
    <user_accounts_details>
            <user_account_credentials>
                    <user_name>JohnDaDoeDoeDoooe@gmail.com</user_name>
                    <password>abc123</password>
                    //OPTIONAL <cookie>cookieID</cookie>
                    //OPTIONAL <digital_cert_link>www.mydigitalcertificate.com/
```

-continued

JohnDoeDaDoeDoe@gmail.com/mycertifcate.dc</digital__cert__link>
//OPTIONAL <digital__certificate>__DATA__</digital__certificate>
</user__account__credentials>
</user__accounts__details>
<client__details> //i0S Client with App and Webkit
//it should be noted that although several client details
//sections are provided to show example variants of client
//sources, further messages will include only on to save
//space
<client__IP>10.0.0.123</client__IP>
<user__agent__string>Mozilla/5.0 (iPhone; CPU iPhone OS 7__1__1 like Mac OS X)
AppleWebKit/537.51.2 (KHTML, like Gecko) Version/7.0 Mobile/11D201
Safari/9537.53</user__agent__string>
<client__product__type>iPhone6,1</client__product__type>
<client__serial__number>DNXXX1X1XXXX</client__serial__number>
<client__UDID>3XXXXXXXXXXXXXXXXXXXXXXXXXD</client__UDID>
<client__OS>iOS</client__OS>
<client__OS__version>7.1.1</client__OS__version>
<client__app__type>app with webkit</client__app__type>
<app__installed__flag>true</app__installed__flag>
<app__name>MBR.app</app__name>
<app__version>1.0 </app__version>
<app__webkit__name>Mobile Safari</client__webkit__name>
<client__version>537.51.2</client__version>
</client__details>
<client__details> //iOS Client with Webbrowser
<client__IP>10.0.0.123</client__IP>
<user__agent__string>Mozilla/5.0 (iPhone; CPU iPhone OS 7__1__1 like Mac OS X)
AppleWebKit/537.51.2 (KHTML, like Gecko) Version/7.0 Mobile/11D201
Safari/9537.53</user__agent__string>
<client__product__type>iPhone6,1</client__product__type>
<client__serial__number>DNXXX1X1XXXX</client__serial__number>
<client__UDID>3XXXXXXXXXXXXXXXXXXXXXXXXXD</client__UDID>
<client__OS>iOS</client__OS>
<client__OS__version>7.1.1</client__OS__version>
<client__app__type>web browser</client__app__type>
<client__name>Mobile Safari</client__name>
<client__version>9537.53</client__version>
</client__details>
<client__details> //Android Client with Webbrowser
<client__IP>10.0.0.123</client__IP>
<user__agent__string>Mozilla/5.0 (Linux; U; Android 4.0.4; en-us; Nexus S
Build/IMM76D) AppleWebKit/534.30 (KHTML, like Gecko) Version/4.0 Mobile
Safari/534.30</user__agent__string>
<client__product__type>Nexus S</client__product__type>
<client__serial__number>YXXXXXXXXZ</client__serial__number>
<client__UDID>FXXXXXXXXX-XXXX-XXXX-XXXX-XXXXXXXXXXXX</client__UDID>
<client__OS>Android</client__OS>
<client__OS__version>4.0.4</client__OS__version>
<client__app__type>web browser</client__app__type>
<client__name>Mobile Safari</client__name>
<client__version>534.30</client__version>
</client__details>
<client__details> //Mac Desktop with Webbrowser
<client__IP>10.0.0.123</client__IP>
<user__agent__string>Mozilla/5.0 (Macintosh; Intel Mac OS X 10__9__3)
AppleWebKit/537.75.14 (KHTML, like Gecko) Version/7.0.3
Safari/537.75.14</user__agent__string>
<client__product__type>MacPro5,1</client__product__type>
<client__serial__number>YXXXXXXXXZ</client__serial__number>
<client__UDID>FXXXXXXXXX-XXXX-XXXX-XXXX-XXXXXXXXXXXX</client__UDID>
<client__OS>Mac OS X</client__OS>
<client__OS__version>10.9.3</client__OS__version>
<client__app__type>web browser</client__app__type>
<client__name>Mobile Safari</client__name>
<client__version>537.75.14</client__version>
</client__details>
<backup__request>
<request__identifier>ID__request__1</request__identifier>
<device__identifier>ID__client__device__1</device__identifier>
<client__site__identifier>ID__client__X__site</client__site__identifier>
<source__volume__identifier>ID__source__device</source__volume__identifier>
<blocks__to__copy>ALL</blocks__to__copy>
<target__volume__identifier>ID__target__device</target__volume__identifier>
<finalization__configuration__settings>
<metric>NUMBER__OF__PASSES <= 10</metric>
<metric>DELTA__DATA: ASYMPTOTE (LAST 3 PASSES)</metric>
<metric>DELTA__TIME: ASYMPTOTE (HISTORICAL)</metric>
<metric>MAX__COMPLETION__TIME: 60 seconds</metric>

-continued

```
            </finalization_configuration_settings>
            <predictive_optimization_configuration_settings>
                <setting>HISTORICAL_CHANGE_FREQUENCY</setting>
            </predictive_optimization_configuration_settings>
            <lookahead_optimization_configuration_settings>
                <setting>ACCELERATED_COPY</setting>
            </lookahead_optimization_configuration_settings>
    </backup_request>
</auth_request>
```

The MBR server may send a performance logs retrieve request 525 to a repository 510 to retrieve pertinent backup performance characteristics logs. In one implementation, the performance logs retrieve request may include data such as a request identifier, a device identifier, a client site identifier, date and/or time specification, performance logs data specification, and/or the like. In one embodiment, the MBR server may provide the following example performance logs retrieve request, substantially in the form of a HTTP(S) POST message including XML-formatted data, as provided below:

```
POST /performance_logs_retrieve_request.php HTTP/1.1
Host: www.server.com
Content-Type: Application/XML
Content-Length: 667
<?XML version = "1.0" encoding = "UTF-8"?>
<performance_logs_retrieve_request>
    <request_identifier>ID_request_2</request_identifier>
    <device_identifier>ID_client_device_1</device_identifier>
    <client_site_identifier>ID_client_X_site</client_site_identifier>
    <day_of_week>Wednesday</day_of_week>
    <performance_logs_data>
            DELTA_TIME,
            HISTORICAL_CHANGE_FREQUENCY
    </performance_logs_data>
</performance_logs_retrieve_request>
```

The repository may send a performance logs retrieve response 529 to the MBR server with the requested performance logs data. In one implementation, the performance logs retrieve response may include data such as a response identifier, the requested performance logs data, and/or the like. In one embodiment, the repository may provide the following example performance logs retrieve response, substantially in the form of a HTTP(S) POST message including XML-formatted data, as provided below:

```
POST /performance_logs_retrieve_response.php HTTP/1.1
Host: www.server.com
Content-Type: Application/XML
Content-Length: 667
<?XML version = "1.0" encoding = "UTF-8"?>
<performance_logs_retrieve_response>
    <response_identifier>ID_response_2</response_identifier>
    <performance_logs_data>requested performance Logs data</
    performance_logs_data>
</performance_logs_retrieve_response>
```

A backup processing (BP) component 533 may utilize data provided in the backup request to perform the backup. See FIG. 3 for additional details regarding the BP component. In some implementations, the BP component may utilize a finalization settings determining (FSD) component 537 to determine when to enter the CoW mode based on the finalization configuration settings. See FIG. 6 for additional details regarding the FSD component. In some implementations, the BP component may utilize a predictive optimization settings determining (POSD) component 538 to determine which blocks should be designated to be copied based on the predictive optimization configuration settings. See FIG. 7 for additional details regarding the POSD component. In some implementations, the BP component may utilize a lookahead optimization settings determining (LOSD) component 539 to determine which blocks to copy during a pass based on the lookahead optimization configuration settings. See FIG. 9 for additional details regarding the POSD component.

The MBR server may send a performance logs store request 541 to the repository to store backup performance characteristics logs associated with the backup. In one implementation, the performance logs store request may include data such as a request identifier, performance logs data, and/or the like. In one embodiment, the MBR server may provide the following example performance logs store request, substantially in the form of a HTTP(S) POST message including XML-formatted data, as provided below:

```
POST /performance_logs_store_request.php HTTP/1.1
Host: www.server.com
Content-Type: Application/XML
Content-Length: 667
<?XML version = "1.0" encoding = "UTF-8"?>
<performance_logs_store_request>
    <request_identifier>ID_request_3</request_identifier>
    <performance_logs_data>performance Logs data for the backup</
    performance_logs_data>
</performance_logs_store_request>
```

The repository may send a performance logs store response 545 to the MBR server to confirm that the performance logs data was stored successfully. In one implementation, the performance logs store response may include data such as a response identifier, a status, and/or the like. In one embodiment, the repository may provide the following example performance logs store response, substantially in the form of a HTTP(S) POST message including XML-formatted data, as provided below:

```
POST /performance_logs_store_response.php HTTP/1.1
Host: www.server.com
Content-Type: Application/XML
Content-Length: 667
<?XML version = "1.0" encoding = "UTF-8"?>
<performance_logs_store_response>
    <response_identifier>ID_response_3</response_identifier>
    <status>OK</status>
</performance_logs_store_response>
```

The MBR server may send a backup response 549 to the client to inform the client whether the backup completed successfully. In one implementation, the backup response may include data such as a response identifier, a status, and/or the like. In one embodiment, the MBR server may provide the following example backup response, substantially in the form of a HTTP(S) POST message including XML-formatted data, as provided below:

```
POST /backup_response.php HTTP/1.1
Host: www.server.com
Content-Type: Application/XML
Content-Length: 667
<?XML version = "1.0" encoding = "UTF-8"?>
<backup_response>
    <response_identifier>ID_response_1</response_identifier>
    <status>OK</status>
</backup_response>
```

FIG. 6 shows a logic flow illustrating embodiments of a finalization settings determining (FSD) component for the MBR. In FIG. 6, a finalization settings request may be obtained at 601. For example, the finalization settings request may be obtained as a result of a request from the BP component to obtain finalization settings for a backup requested via a backup request.

Finalization configuration settings for a usage profile associated with the backup may be determined at 605. In one embodiment, the finalization configuration settings may specify which metrics should be utilized to determine whether to enter the CoW mode. For example, the finalization configuration settings may indicate that the CoW mode should be entered when a specified metric or combination of metrics (e.g., based on logical operators such as AND, OR, NOT, etc.) has been satisfied. In one implementation, the backup request may be parsed (e.g., using PHP commands) to determine the specified finalization configuration settings. For example, the backup request may specify that number of passes, delta data between passes, delta time between passes, and maximum completion time metrics should be utilized to determine whether to enter the CoW mode. In another example, the backup request may specify a threshold value, which indicates when a metric has been satisfied, for each of the specified metrics (e.g., a threshold value for a metric may be specified as a constant (e.g., the number of passes metric is satisfied after 2 passes, or after 10 passes, or after 100 passes, etc. (e.g., determined based on previous experience regarding what number works well in practice)), a threshold value for a metric may be specified as a function or calculated parameter (e.g., the delta time between passes metric is satisfied when delta time reaches an asymptote) determined via statistical analysis of performance logs data (e.g., via a neural network)). In some embodiments, different finalization configuration settings may be utilized for the backup depending on the usage profile associated with the backup. For example, different finalization configuration settings may be utilized for different days (e.g., day of the week, weekday vs weekend), different times (e.g., time of day, working vs non-working hours), different entities (e.g., different client devices to be backed up (e.g., Client X Server 1 vs. Client X Server 2), different sites (e.g., Client X Site vs. Client Y Site), different customers (e.g., Client X vs. Client Y)), different number of users, and/or the like. Finalization configuration settings may vary with regard to metrics, metrics combinations, threshold values, and/or the like utilized for different usage profiles. In one implementation, a usage profile for the backup may be ascertained (e.g., based on data in the backup request, based on current date and/or time, etc.) and the finalization configuration settings for the usage profile may be determined (e.g., based on data stored in a database and/or based on data specified in the backup request). For example, the finalization configuration settings for the usage profile may be determined via a MySQL database command similar to the following:

```
SELECT usageProfileID,
usageProfileFinalizationConfigurationSettings
FROM UsageProfiles
WHERE device_ID = ID_client_device_1 AND dayOfWeek =
"Wednesday";
```

Pertinent performance logs may be retrieved at 609. For example, the pertinent performance logs may include backup performance characteristics for the usage profile (e.g., backup performance characteristics logged by device ID_client_device_1 for previous backups that occurred on a Wednesday) that may be utilized to determine whether a specified metric (e.g., having a threshold value specified as a function or calculated parameter) has been satisfied. In one implementation, the pertinent performance logs for metrics specified via the finalization configuration settings may be retrieved from a database. For example, the pertinent performance logs may be retrieved via a MySQL database command similar to the following:

```
SELECT passID, completionTimePerPass
FROM PerformanceLogs
WHERE device_ID = ID_client_device_1 AND
    matchingUsageProfileIDs LIKE '%' + usageProfileID + '%';
```

A determination may be made at 621 whether the block size metric should be utilized by the backup to determine whether to enter the CoW mode (e.g., based on metrics specified via the finalization configuration settings). If so, finalization settings for the block size metric may be determined at 625 (e.g., based on a threshold specified via the finalization configuration settings). In one implementation, the finalization settings for the block size metric may specify that the block size metric is satisfied if the aggregate size of changed blocks in a pass is less than a threshold (e.g., 10 MB). The threshold may be a fixed aggregate size (e.g., expressed in units of storage such as megabytes, gigabytes, or terabytes), or may be a dynamic size calculated based on an available bandwidth between source volume and target volume, or the size of the source volume or target volume. For example, the threshold may be calculated by determining the maximum amount of data that may be transferred from the source volume to the target volume within a pre-defined target maximum time, given the available bandwidth between the two volumes, or the threshold may be calculated based on a pre-defined proportion of the total size of at least one of the source volume or target volume. Threshold calculations and/or various components (e.g., data transfer rate, available bandwidth) of such threshold calculations may be calculated based on data for the backup (e.g., based on data for the last pass, based on data over several passes) and/or based on historical data. If historical data is utilized, such calculations may be performed (e.g., calculated as an average, determined via statistical analysis by a neural network) as part of determining the finalization settings. If data for the backup is utilized, such calculations may be performed during the backup and may utilize pre-calculated components of threshold calculations that are based on historical data. In another implementation, the finalization settings for the block size metric may specify that the block size metric is satisfied if the number of changed blocks in a pass is less than a threshold (e.g., 500 blocks).

A determination may be made at 631 whether the number of passes metric should be utilized by the backup to determine whether to enter the CoW mode (e.g., based on metrics specified via the finalization configuration settings). If so, finalization settings for the number of passes metric may be determined at 635 (e.g., based on a threshold specified via the finalization configuration settings). In one implementation, the finalization settings for the number of passes metric may specify that the number of passes metric is satisfied if the number of passes for the backup exceeds a threshold (e.g., 5 passes). The threshold may be a fixed number or a dynamic number (e.g., calculated based on the average number of passes for a backup for the device on Wednesdays). Threshold calculations (e.g., using the function: the threshold is equal to 1.2 times historical average number of passes) and/or various components of such threshold calculations may be calculated based on data for the backup (e.g., based on data for the last pass, based on data over several passes) and/or based on historical data. If historical data is utilized, such calculations may be performed (e.g., calculated as an average, determined via statistical analysis by a neural network) as part of determining the finalization settings. If data for the backup is utilized, such calculations may be performed during the backup and may utilize pre-calculated components of threshold calculations that are based on historical data.

A determination may be made at 641 whether the delta data metric should be utilized by the backup to determine whether to enter the CoW mode (e.g., based on metrics specified via the finalization configuration settings). If so, finalization settings for the delta data metric may be determined at 645 (e.g., based on a threshold specified via the finalization configuration settings). In one implementation, the finalization settings for the delta data metric may specify that the delta data metric is satisfied if the change in the amount of data copied between passes (delta data) is less than a threshold (e.g., 1 MB). The threshold may be set using various criteria, such as it is more efficient to finish copying the data in one pass than to copy in several increments. Continually going back to copy small data increments may open the opportunity for more data changes during the copying, prolonging the backup process and decreasing efficiency. The threshold may be stated in alternative measures of size (e.g., number of blocks, bytes, bits). The threshold may be a fixed number or a dynamic number (e.g., a calculated parameter). For example, the threshold may be a calculated parameter that is satisfied if the change in the amount of data copied between passes (delta data) over several passes (e.g., over the last 3 passes) reaches an asymptote. Delta data calculations and/or various components (e.g., a trend function that may be used for predicting delta data for a pass) of such delta data calculations may be calculated based on data for the backup and/or based on historical data. For example, delta data for a pass may be calculated by determining a delta data trend function (e.g., linear, exponential) for the backup (e.g., based on the last 3 passes) and predicting delta data for the pass using the delta data trend function.

A determination may be made at 651 whether the delta time metric should be utilized by the backup to determine whether to enter the CoW mode (e.g., based on metrics specified via the finalization configuration settings). If so, finalization settings for the delta time metric may be determined at 655 (e.g., based on a threshold specified via the finalization configuration settings). In one implementation, the finalization settings for the delta time metric may specify that the delta time metric is satisfied if the change between passes in the amount of time to complete a pass (delta time) is less than a threshold (e.g., 5 seconds). The threshold may be set using various criteria, such as it is more efficient to finish copying the data in one pass than to copy in several increments. Continuing to copy small data increments once delta time reaches an asymptote may open the opportunity for more data changes during the copying, prolonging the backup process and decreasing efficiency. The threshold may incorporate a variety of factors (e.g., overall time to complete a pass, I/O time for a pass, transmission time for a pass). The threshold may be a fixed number or a dynamic number (e.g., a calculated parameter). For example, the threshold may be a calculated parameter that is satisfied if the change between passes in the amount of time to complete a pass (delta time) over several passes (e.g., over the last 3 passes) reaches an asymptote. Delta time calculations and/or various components (e.g., a trend function that may be used for predicting delta time for a pass) of such delta time calculations may be calculated based on data for the backup and/or based on historical data. For example, delta time for a pass may be calculated by determining a delta time trend function (e.g., linear, exponential) for the backup (e.g., based on historical data for the device on Wednesdays) and predicting delta time for the pass using the delta time trend function.

A determination may be made at 661 whether the pass completion time metric should be utilized by the backup to determine whether to enter the CoW mode (e.g., based on metrics specified via the finalization configuration settings). If so, finalization settings for the pass completion time metric may be determined at 665 (e.g., based on a threshold specified via the finalization configuration settings). In one implementation, the finalization settings for the pass completion time metric may specify that the pass completion time metric is satisfied if the pass completion time for a pass of the backup is less than a threshold (e.g., 60 seconds). The threshold may be a fixed number or a dynamic number (e.g., calculated based on a statistically determined (e.g., via a neural network) optimal threshold for the device on Wednesdays). Threshold calculations (e.g., using a neural network) and/or various components of such threshold calculations may be calculated based on data for the backup and/or based on historical data (e.g., based on historical data for the device on Wednesdays).

A determination may be made at 671 whether the resource intensity metric should be utilized by the backup to determine whether to enter the CoW mode (e.g., based on metrics specified via the finalization configuration settings). If so, finalization settings for the resource intensity metric may be determined at 675 (e.g., based on a threshold specified via the finalization configuration settings). In one implementation, the finalization settings for the resource intensity metric may specify that the resource intensity metric is satisfied if the resource load for a pass of the backup is less than a threshold (e.g., utilization percentage). The threshold may incorporate a variety of factors (e.g., CPU utilization, I/O utilization, network utilization, power utilization). The threshold may be a fixed number or a dynamic number (e.g., calculated based on a statistically determined (e.g., via a neural network) optimal threshold for the device on Wednesdays). Threshold calculations (e.g., using a neural network) and/or various components of such threshold calculations may be calculated based on data for the backup and/or based on historical data (e.g., based on historical data for the device on Wednesdays).

A determination may be made at 681 whether to optimize the combination of the specified metrics. In one embodiment, the finalization configuration settings may include a set of logical operators that specify how to evaluate the combination of the specified metrics to determine whether finalization settings have been satisfied. For example, the finalization configuration settings may specify that the finalization settings have been satisfied if the number of passes reaches a threshold of N (e.g., 10 passes) OR, for any pass<N, if the pass completion time is less than a threshold of T (e.g., 60 seconds). Accordingly, no additional combination optimization may be utilized. In another embodiment, the finalization configuration settings may specify that the optimal combination of metrics should be determined. Accordingly, combination optimization may be utilized.

If combination optimization should be utilized, an optimal finalization settings combination may be determined at 685. For example, the optimal finalization settings combination may be a combination that minimizes backup completion time, usage resource, and/or the like. In one implementation, a machine learning technique (e.g., a neural network) may be utilized to determine the optimal finalization settings combination. For example, historical data for the device on Wednesdays may be analyzed to determine which finalization settings combination minimizes backup completion time.

Finalization settings may be provided (e.g., to the BP component) at 691. For example, the finalization settings may include the optimal finalization settings combination. In one implementation, the BP component may utilize the finalization settings to determine whether to enter the CoW mode as discussed with regard to the BP component at 308.

FIG. 7 shows a logic flow illustrating embodiments of a predictive optimization settings determining (POSD) component for the MBR. In FIG. 7, a predictive optimization settings request may be obtained at 701. For example, the predictive optimization settings request may be obtained as a result of a request from the BP component to obtain predictive optimization settings for a backup requested via a backup request.

A determination may be made at 705 whether predictive optimization should be utilized by the backup. By utilizing predictive optimization, the number of copy operations performed during the backup may be reduced. In one embodiment, predictive optimization may be utilized to configure the backup such that initial passes copy primarily the data blocks that tend to be more stable, while later passes copy the data blocks that tend to change more rapidly. As some data blocks, such as those that represent the operating system, applications and user data (e.g., pictures, video, audio), do not change often, while other data blocks, such as those that represent database entries and mail server files, tend to change rapidly, copying the rapidly changing blocks multiple times across iterations may be minimized by delaying their copying until a later pass. Additionally, the initial passes that do not copy the rapidly changing blocks may be copying fewer data blocks, hence may be performed more quickly.

If predictive optimization should not be utilized, the POSD component may indicate at 709 that all allocated and/or identified blocks should be included in a pass as discussed with regard to the BP component at 302 and/or 310.

If predictive optimization should be utilized, optimization configuration settings for a usage profile associated with the backup may be determined at 713. In one embodiment, the optimization configuration settings may specify how predictive optimization should be configured using a setting or a combination of settings (e.g., based on logical operators such as AND, OR, NOT, etc.). For example, the optimization configuration settings may indicate how (e.g., data attributes, historical trends) data blocks should be categorized into different frequency types (e.g., stable blocks, rapidly changing blocks). In one implementation, the backup request may be parsed (e.g., using PHP commands) to determine the specified optimization configuration settings. For example, the backup request may specify that historical change frequency associated with data blocks should be utilized to classify the data blocks into different frequency types. In another example, the backup request may specify the number of initial passes during which data blocks having a certain frequency type should not be copied (e.g., rapidly changing blocks should not be copied during the first two passes). It is to be understood that criteria such as number of passes, delta data between passes, delta time between passes, pass completion time, resource intensity, and/or the like may be utilized alone or in various combinations to determine when data blocks having a certain frequency type should be copied. In some embodiments, different optimization configuration settings may be utilized for the backup depending on the usage profile associated with the backup. For example, different optimization configuration settings may be utilized for different days (e.g., day of the week, weekday vs weekend), different times (e.g., time of day, working vs non-working hours), different entities (e.g., different client devices to be backed up (e.g., Client X Server 1 vs. Client X Server 2), different sites (e.g., Client X Site vs. Client Y Site), different customers (e.g., Client X vs. Client Y)), different number of users, and/or the like. Optimization configuration settings may vary with regard to settings, settings combinations, frequency types, number of initial passes for different frequency types, and/or the like utilized for different usage profiles. In one implementation, a usage profile for the backup may be ascertained (e.g., based on data in the backup request, based on current date and/or time, etc.) and the optimization configuration settings for the usage profile may be determined (e.g., based on data stored in a database and/or based on data specified in the backup request). For example, the optimization configuration settings for the usage profile may be determined via a MySQL database command similar to the following:

```
SELECT usageProfileID,
usageProfilePredictiveOptimizationConfigurationSettings
FROM UsageProfiles
WHERE device_ID = ID_client_device_1 AND dayOfWeek =
"Wednesday";
```

Pertinent performance logs may be retrieved at 717. For example, the pertinent performance logs may include backup performance characteristics for the usage profile (e.g., backup performance characteristics logged by device ID_client_device_1 for previous backups that occurred on a Wednesday) that may be utilized to categorize data blocks into different frequency types. In one implementation, the pertinent performance logs for settings specified via the optimization configuration settings may be retrieved from a database. For example, the pertinent performance logs may be retrieved via a MySQL database command similar to the following:

```
SELECT passID, dataBlocksChangeFrequency
FROM PerformanceLogs
WHERE device_ID = ID_client_device_1 AND
    matchingUsageProfileIDs LIKE '%' + usageProfileID + '%';
```

A determination may be made at 721 whether the stable blocks criteria should be utilized by the backup to categorize data blocks into different frequency types (e.g., based on settings specified via the predictive optimization configuration settings). If so, optimization settings for the stable blocks criteria may be determined at 725. In one embodiment, the stable blocks criteria may be used to identify data blocks that are not likely to change based on data type, such as blocks from executable applications, operating system functions, and user data. In one implementation, the stable blocks optimization settings may specify a list of blocks classified as stable blocks (e.g., data blocks that satisfy the stable blocks criteria) and/or the number of initial passes during which data blocks not classified as stable blocks should not be copied (e.g., a number specified via the predictive optimization configuration settings, an optimal number determined by a neural network based on analysis of historical data). It is to be understood that stable blocks may be a single frequency type or may be subdivided into multiple frequency types (e.g., based on probability ranges of being stable blocks, based on the amount of time blocks are likely to remain unchanged).

A determination may be made at 731 whether the busy blocks criteria should be utilized by the backup to categorize data blocks into different frequency types (e.g., based on settings specified via the predictive optimization configuration settings). If so, optimization settings for the busy blocks criteria may be determined at 735. In one embodiment, the busy blocks criteria may be used to identify data blocks that are likely to change more rapidly based on data type, such as files writtent to by heavily utilized applications that perform a significant amount of I/O (e.g., for a Microsoft Windows NTFS system the following may be categorized as busy blocks: NTFS transaction log journal, NTFS change journal, parts of the Master File Table; for a Microsoft SQL Server the following may be categorized as busy blocks: database files, transaction log). In one implementation, the busy blocks optimization settings may specify a list of blocks classified as busy blocks (e.g., data blocks that satisfy the busy blocks criteria) and/or the number of initial passes during which data blocks classified as busy blocks should not be copied (e.g., a number specified via the predictive optimization configuration settings, an optimal number determined by a neural network based on analysis of historical data). It is to be understood that busy blocks may be a single frequency type or may be subdivided into multiple frequency types (e.g., based on probability ranges of being busy blocks, based on the amount of time blocks are likely to remain unchanged).

A determination may be made at 741 whether the historical change frequency criteria should be utilized by the backup to categorize data blocks into different frequency types (e.g., based on settings specified via the predictive optimization configuration settings). If so, optimization settings for the historical change frequency criteria may be determined at 745. In one embodiment, the historical change frequency criteria may be used to categorize data blocks into different frequency types based on write history associated with the data blocks. For example, a record of block writes may be kept (e.g., for a specified time period, such as for recent block writes) and analyzed (e.g., via statistical analysis by a neural network) to categorize data blocks into different frequency types (e.g., based on historical data for the device on Wednesdays). In one implementation, the historical change frequency optimization settings may specify how data blocks are classified into different frequency types and/or the number of initial passes during which data blocks associated with each frequency type should not be copied (e.g., numbers specified via the predictive optimization configuration settings, optimal numbers determined by a neural network based on analysis of historical data).

A determination may be made at 751 whether to optimize the combination of the specified settings. In one embodiment, the predictive optimization configuration settings may include a set of logical operators that specify how to evaluate the combination of the specified settings to determine how data blocks are classified into different frequency types. For example, the predictive optimization configuration settings may specify that data blocks not classified as stable blocks should not be copied during the first two passes unless classified as busy blocks, which should not be copied during the first three passes. Accordingly, no additional combination optimization may be utilized. In another embodiment, the predictive optimization configuration settings may specify that the optimal combination of settings should be determined. Accordingly, combination optimization may be utilized.

If combination optimization should be utilized, an optimal optimization settings combination may be determined at 755. For example, the optimal optimization settings combination may be a combination that minimizes backup completion time, usage resource, and/or the like. In one implementation, a machine learning technique (e.g., a neural network) may be utilized to determine the optimal optimization settings combination. For example, historical data for the device on Wednesdays may be analyzed to determine which optimization settings combination minimizes the overall number of copy operations.

Predictive optimization settings may be provided (e.g., to the BP component) at 761. For example, the predictive optimization settings may include the optimal predictive optimization settings combination. In one implementation, the BP component may utilize the predictive optimization settings to determine how designated blocks to copy should be adjusted for each pass as discussed with regard to the BP component at 302 and/or 310.

FIGS. 8A-B show implementation cases for the MBR. In FIG. 8A, an exemplary embodiment in which predictive optimization is not utilized is illustrated. As shown at 801, blocks 1-20 should be copied to backup and blocks 3, 4 (e.g., busy blocks) tend to change frequently. During the initial full copy phase, all allocated blocks are copied, resulting in 20 copy operations. Blocks 3-6, 10, 12-13, 15 changed while copying. As shown at 810, since the full copy phase completed, blocks 3, 4, 7, 14 changed and are added to the list of blocks to copy. During the first pass of the incremental copy, the changed blocks 3-7, 10, 12-15 are copied, resulting in 10 copy operations. Blocks 1-5, 8, 12, 14, 19-20 changed while copying. As shown at 820, during the second pass of the incremental copy, the changed blocks 1-5, 8, 12, 14, 19-20 are copied, resulting in 10 copy operations. Blocks 3, 4, 20 changed while copying. Since the number of changed blocks is below a threshold (e.g., 5 blocks) for entering the CoW mode, the CoW mode is entered. As shown at 830, during the final pass of the incremental copy, the changed blocks 3, 4, 20 are copied using the CoW file, resulting in 3 copy operations. Thus, a total of 43 copy operations are performed during this backup.

In FIG. 8B, an exemplary embodiment in which predictive optimization is utilized is illustrated. As shown at 840, blocks 1-20 should be copied to backup and blocks 3, 4 (e.g., busy blocks) tend to change frequently. Predictive optimization is utilized to hold off copying the busy blocks until the CoW mode is entered. During the initial full copy phase, all allocated blocks except the busy blocks 3, 4 are copied, resulting in 18 copy operations. Blocks 3-6, 10, 12-13, 15 changed while copying. As shown at 850, since the full copy phase completed, blocks 3, 4, 7, 14 changed and are added to the list of blocks to copy. During the first pass of the incremental copy, the changed blocks 5-7, 10, 12-15 are copied while the busy blocks 3, 4 are not copied, resulting in 8 copy operations. Blocks 1-5, 8, 12, 14, 19-20 changed while copying. As shown at 860, during the second pass of the incremental copy, the changed blocks 1-2, 5, 8, 12, 14, 19-20 are copied while the busy blocks 3, 4 are not copied, resulting in 8 copy operations. Blocks 3, 4, 20 changed while copying. Since the number of changed blocks is below a threshold (e.g., 5 blocks) for entering the CoW mode, the CoW mode is entered and the busy blocks 3, 4 may now be copied. As shown at 870, during the final pass of the incremental copy, the changed blocks 3, 4, 20 are copied using the CoW file, resulting in 3 copy operations. Thus, a total of 37 copy operations are performed during this backup using predictive optimization, resulting in a reduced overall number of copy operations.

FIG. 9 shows a logic flow illustrating embodiments of a lookahead optimization settings determining (LOSD) component for the MBR. In FIG. 9, a lookahead optimization settings request may be obtained at 901. For example, the lookahead optimization settings request may be obtained as a result of a request from the BP component to obtain lookahead optimization settings for a backup requested via a backup request.

A determination may be made at 905 whether lookahead optimization should be utilized by the backup. By utilizing lookahead optimization, the number of passes utilized to complete the backup may be reduced and/or redundant copying may be avoided. In one embodiment, lookahead optimization (e.g., accelerated copy optimization) may be utilized to configure the backup such that data blocks that changed forward of the current position (e.g., position of the data block currently being read and copied) and that had not been marked as changed blocks at the start of a current pass are added to the designated blocks to copy. Since fewer changed blocks are copied in the subsequent pass, the threshold to enter the CoW mode may be reached faster, and the number of passes utilized to complete the backup may be reduced. In another embodiment, lookahead optimization (e.g., delayed copy optimization) may be utilized to configure the backup such that copying of data blocks that changed forward of the current position and that had been marked as changed blocks at the start of a current pass is skipped (e.g., because such blocks will be marked as changed blocks and copied in the subsequent pass). Since fewer changed blocks are copied in the current pass, redundant copying may be avoided.

If lookahead optimization should not be utilized, the LOSD component may indicate at 909 that the designated blocks should be copied in a pass as discussed with regard to the BP component at 304.

If lookahead optimization should be utilized, optimization configuration settings for a usage profile associated with the backup may be determined at 913. In one embodiment, the optimization configuration settings may specify how lookahead optimization should be configured using a setting or a combination of settings (e.g., based on logical operators such as AND, OR, NOT, etc.). For example, the optimization configuration settings may indicate which optimizations (e.g., accelerated copy optimization, delayed copy optimization) should be utilized. In one implementation, the backup request may be parsed (e.g., using PHP commands) to determine the specified optimization configuration settings. For example, the backup request may specify that accelerated copy optimization should be utilized during the backup. In another example, the backup request may specify a schedule for applying lookahead optimization to a read/copy position (e.g., periodically, after a predetermined period of time). It is to be understood that criteria such as number of passes, delta data between passes, delta time between passes, pass completion time, resource intensity, and/or the like may be utilized alone or in various combinations to determine the schedule for applying lookahead optimization. In some embodiments, different optimization configuration settings may be utilized for the backup depending on the usage profile associated with the backup. For example, different optimization configuration settings may be utilized for different days (e.g., day of the week, weekday vs weekend), different times (e.g., time of day, working vs non-working hours), different entities (e.g., different client devices to be backed up (e.g., Client X Server 1 vs. Client X Server 2), different sites (e.g., Client X Site vs. Client Y Site), different customers (e.g., Client X vs. Client Y)), different number of users, and/or the like. Optimization configuration settings may vary with regard to settings, settings combinations, and/or the like utilized for different usage profiles. In one implementation, a usage profile for the backup may be ascertained (e.g., based on data in the backup request, based on current date and/or time, etc.) and the optimization configuration settings for the usage profile may be determined (e.g., based on data stored in a database and/or based on data specified in the backup request). For example, the optimization configuration settings for the usage profile may be determined via a MySQL database command similar to the following:

```
SELECT usageProfileID,
usageProfileLookaheadOptimizationConfigurationSettings
FROM UsageProfiles
WHERE device_ID = ID_client_device_1 AND dayOfWeek =
"Wednesday";
```

Pertinent performance logs may be retrieved at 917. For example, the pertinent performance logs may include backup performance characteristics for the usage profile (e.g., backup performance characteristics logged by device ID_client_device_1 for previous backups that occurred on a Wednesday) that may be utilized to determine an optimal schedule for applying lookahead optimization (e.g., via a neural network based on analysis of historical data) that results in the best backup performance (e.g., fewest passes, fewest redundant blocks copied, quickest completion time). In one implementation, the pertinent performance logs for settings specified via the optimization configuration settings may be retrieved from a database. For example, the pertinent performance logs may be retrieved via a MySQL database command similar to the following:

```
SELECT passID, dataPerPass, completionTimePerPass
FROM PerformanceLogs
WHERE device_ID = ID_client_device_1 AND
    matchingUsageProfileIDs LIKE '%' + usageProfileID + '%';
```

A determination may be made at 921 whether accelerated copy optimization should be utilized by the backup (e.g., based on settings specified via the lookahead optimization configuration settings). If so, accelerated copy optimization settings may be determined at 925. In one implementation, the accelerated copy optimization settings may specify a schedule that determines when accelerated copy optimization should be utilized (e.g., check the current read/copy position during a pass every 15 seconds).

A determination may be made at 931 whether delayed copy optimization should be utilized by the backup (e.g., based on settings specified via the lookahead optimization configuration settings). If so, delayed copy optimization settings may be determined at 935. In one implementation, the delayed copy optimization settings may specify a schedule that determines when delayed copy optimization should be utilized (e.g., check the current read/copy position during a pass after every 10 megabytes copied).

A determination may be made at 941 whether to optimize the combination of the specified settings. In one embodiment, the lookahead optimization configuration settings may include a set of logical operators that specify how to evaluate the combination of the specified settings to determine which optimizations to use and/or when. For example, the lookahead optimization configuration settings may specify that the accelerated copy optimization but not the delayed copy optimization should be used for the backup. Accordingly, no additional combination optimization may be utilized. In another embodiment, the lookahead optimization configuration settings may specify that the optimal combination of settings should be determined. Accordingly, combination optimization may be utilized.

If combination optimization should be utilized, an optimal optimization settings combination may be determined at 945. For example, the optimal optimization settings combination may be a combination that minimizes backup completion time, usage resource, and/or the like. In one implementation, a machine learning technique (e.g., a neural network) may be utilized to determine the optimal optimization settings combination. For example, historical data for the device on Wednesdays may be analyzed to determine which optimization settings combination minimizes the number of passes utilized to complete the backup.

Lookahead optimization settings may be provided (e.g., to the BP component) at 951. For example, the lookahead optimization settings may include the optimal lookahead optimization settings combination. In one implementation, the BP component may utilize the lookahead optimization settings to determine how designated blocks to copy should be adjusted during each pass as discussed with regard to the BP component at 304.

FIGS. 10A-C show implementation cases for the MBR. In FIG. 10A, an exemplary embodiment in which lookahead optimization is not utilized is illustrated. As shown at 1001, blocks 1-20 should be copied to backup. During the initial full copy phase, all allocated blocks are copied, resulting in 20 copy operations. Blocks 5-6, 10, 12-13, 15 changed while copying. As shown at 1010, since the full copy phase completed, blocks 3, 4, 7, 14 changed and are added to the list of blocks to copy. During the first pass of the incremental copy, the changed blocks 3-7, 10, 12-15 are copied, resulting in 10 copy operations. Blocks 1-2, 5, 8, 12, 14, 19-20 changed while copying. As shown at 1020, during the second pass of the incremental copy, the changed blocks 1-2, 5, 8, 12, 14, 19-20 are copied, resulting in 8 copy operations. Blocks 3, 4, 20 changed while copying. Since the number of changed blocks is below a threshold (e.g., 5 blocks) for entering the CoW mode, the CoW mode is entered. As shown at 1030, during the final pass of the incremental copy, the changed blocks 3, 4, 20 are copied using the CoW file, resulting in 3 copy operations. Thus, a total of 41 copy operations in 4 passes are performed during this backup.

In FIG. 10B, an exemplary embodiment in which lookahead optimization is utilized is illustrated. In FIG. 10B, accelerated copy optimization is utilized. As shown at 1040, blocks 1-20 should be copied to backup. During the initial full copy phase, all allocated blocks are copied, resulting in 20 copy operations. Blocks 5-6, 10, 12-13, 15 changed while copying. As shown at 1050, since the full copy phase completed, blocks 3, 4, 7, 14 changed and are added to the list of blocks to copy. During the first pass of the incremental copy, accelerated copy optimization is utilized to add blocks that changed forward of the current read and copy position (e.g., marked by the copy tracker at block 14) and that had not been marked as changed blocks at the start of the first pass to the designated blocks to copy. Thus, blocks 19-20 are added to the designated blocks to copy, and the changed blocks 3-7, 10, 12-15, 19-20 are copied, resulting in 12 copy operations. As a result, even though blocks 1-2, 5, 8, 12, 14, 19-20 changed while copying up to block 14, just blocks 1-2, 5, 8, 12 are marked as changed for the next pass. The accelerated copy optimization may similarly be applied in the next pass at 1060. Alternatively, if the number of changed blocks is below a threshold (e.g., 5 blocks) for entering the CoW mode, the CoW mode is entered at 1060. Thus, 3 passes are performed during this backup using lookahead optimization, resulting in a reduced number of passes utilized to complete the backup.

In FIG. 10C, an exemplary embodiment in which lookahead optimization is utilized is illustrated. In FIG. 10C, delayed copy optimization is utilized. As shown at 1070, blocks 1-20 should be copied to backup. During the initial full copy phase, delayed copy optimization is utilized to skip copying of blocks that changed forward of the current read and copy position (e.g., marked by the copy tracker at block 11) and that had been marked as changed blocks at the start of the initial full copy phase. Since blocks 5-6, 10, 12-13, 15 changed while copying up to block 11, blocks 12-13, 15 are skipped, resulting in 17 copy operations. As shown at 1080, since the full copy phase completed, blocks 3, 4, 7, 14 changed and are added to the list of blocks to copy. Thus, during the first pass of the incremental copy, blocks 3-7, 10, 12-15 are marked as changed blocks to copy. The delayed copy optimization may similarly be applied in this pass and/or in the next pass at 1090. Thus, redundant copying is avoided (e.g., 17 copy operations at 1070 vs. 20 copy operations at 1001) during this backup using lookahead optimization, resulting in reduced resource usage.

FIGS. 11A-B show a datagraph illustrating data flow(s) for the MBR. In FIGS. 11A-B, a client 1102 (e.g., of an administrative user of an entity) may send a pairing request 1121 to a MBR source server 1106 to facilitate pairing services utilized by users (e.g., employees) of the entity (e.g., a company) to the MBR backup cloud. For example, the client may be a desktop, a laptop, a tablet, a smartphone, a smartwatch, and/or the like that is executing a client application. In one implementation, the pairing request may include data such as a request identifier, entity data, user data, service data, backup schedule, and/or the like. In one embodiment, the client may provide the following example pairing request, substantially in the form of a (Secure) Hypertext Transfer Protocol ("HTTP(S)") POST message including eXtensible Markup Language ("XML") formatted data, as provided below:

```
POST /authrequest.php HTTP/1.1
Host: www.server.com
Content-Type: Application/XML
Content-Length: 667
<?XML version = "1.0" encoding = "UTF-8"?>
<auth_request>
    <timestamp>2020-12-31 23:59:59</timestamp>
    <user_accounts_details>
        <user_account_credentials>
            <user_name>JohnDaDoeDoeDoooe@gmail.com</user_name>
            <password>abc123</password>
            //OPTIONAL <cookie>cookieID</cookie>
            //OPTIONAL <digital_cert_link>www.mydigitalcertificate.com/
JohnDoeDaDoeDoe@gmail.com/mycertifcate.dc</digital_cert_link>
            //OPTIONAL <digital_certificate>_DATA_</digital_certificate>
        </user_account_credentials>
    </user_accounts_details>
    <client_details> //iOS Client with App and Webkit
            //it should be noted that although several client details
            //sections are provided to show example variants of client
            //sources, further messages will include only on to save
            //space
        <client_IP>10.0.0.123</client_IP>
        <user_agent_string>Mozilla/5.0 (iPhone; CPU iPhone OS 7_1_1 like Mac OS X)
AppleWebKit/537.51.2 (KHTML, like Gecko) Version/7.0 Mobile/11D201
Safari/9537.53</user_agent_string>
        <client_product_type>iPhone6,1</client_product_type>
        <client_serial_number>DNXXX1X1XXXX</client_serial_number>
        <client_UDID>3XXXXXXXXXXXXXXXXXXXXXXXXD</client_UDID>
        <client_OS>iOS</client_OS>
        <client_OS_version>7.1.1</client_OS_version>
        <client_app_type>app with webkit</client_app_type>
        <app_installed_flag>true</app_installed_flag>
        <app_name>MBR.app</app_name>
        <app_version>1.0 </app_version>
        <app_webkit_name>Mobile Safari</client_webkit_name>
        <client_version>537.51.2</client_version>
    </client_details>
    <client_details> //iOS Client with Webbrowser
        <client_IP>10.0.0.123</client_IP>
        <user_agent_string>Mozilla/5.0 (iPhone; CPU iPhone OS 7_1_1 like Mac OS X)
AppleWebKit/537.51.2 (KHTML, like Gecko) Version/7.0 Mobile/11D201
Safari/9537.53</user_agent_string>
        <client_product_type>iPhone6,1</client_product_type>
        <client_serial_number>DNXXX1X1XXXX</client_serial_number>
        <client_UDID>3XXXXXXXXXXXXXXXXXXXXXXXXD</client_UDID>
        <client_OS>iOS</client_OS>
        <client_OS_version>7.1.1</client_OS_version>
        <client_app_type>web browser</client_app_type>
        <client_name>Mobile Safari</client_name>
        <client_version>9537.53</client_version>
    </client_details>
    <client_details> //Android Client with Webbrowser
        <client_IP>10.0.0.123</client_IP>
        <user_agent_string>Mozilla/5.0 (Linux; U; Android 4.0.4; en-us; Nexus S
Build/IMM76D) AppleWebKit/534.30 (KHTML, like Gecko) Version/4.0 Mobile
Safari/534.30</user_agent_string>
        <client_product_type>Nexus S</client_product_type>
        <client_serial_number>YXXXXXXXXZ</client_serial_number>
        <client_UDID>FXXXXXXXXX-XXXX-XXXX-XXXX-XXXXXXXXXXXX</client_UDID>
        <client_OS>Android</client_OS>
        <client_OS_version>4.0.4</client_OS_version>
        <client_app_type>web browser</client_app_type>
        <client_name>Mobile Safari</client_name>
        <client_version>534.30</client_version>
    </client_details>
    <client_details> //Mac Desktop with Webbrowser
        <client_IP>10.0.0.123</client_IP>
        <user_agent_string>Mozilla/5.0 (Macintosh; Intel Mac OS X 10_9_3)
AppleWebKit/537.75.14 (KHTML, like Gecko) Version/7.0.3
Safari/537.75.14</user_agent_string>
        <client_product_type>MacPro5,1</client_product_type>
        <client_serial_number>YXXXXXXXXZ</client_serial_number>
        <client_UDID>FXXXXXXXXX-XXXX-XXXX-XXXX-XXXXXXXXXXXX</client_UDID>
        <client_OS>Mac OS X</client_OS>
        <client_OS_version>10.9.3</client_OS_version>
        <client_app_type>web browser</client_app_type>
        <client_name>Mobile Safari</client_name>
        <client_version>537.75.14</client_version>
    </client_details>
    <pairing_request>
```

-continued

```
<request_identifier>ID_request_1</request_identifier>
<entity_identifier>ID_company_1</entity_identifier>
<users>ID_user_1, ID_user_2, ID_user_3</users>
<backup_settings>
    <user>
        <user_identifier>ID_user_1</user_identifier>
        <service>
            <service_identifier>ID_service_google_drive</service_identifier>
            <service_login_data>user's username and password</service_login_data>
            <backup_schedule>create a snapshot 2 times per day</backup_schedule>
        </service>
        <service>
            <service_identifier>ID_service_sharepoint</service_identifier>
            <service_login_data>user's username and password</service_login_data>
            <backup_schedule>create a snapshot 3 times per day</backup_schedule>
        </service>
    </user>
    <user>
        <user_identifier>ID_user_2</user_identifier>
        <service>
            <service_identifier>ID_service_onedrive</service_identifier>
            <service_login_data>user's username and password</service_login_data>
            <backup_schedule>create a snapshot 3 times per day</backup_schedule>
        </service>
        <service>
            <service_identifier>ID_service_sharepoint</service_identifier>
            <service_login_data>user's username and password</service_login_data>
            <backup_schedule>create a snapshot 3 times per day</backup_schedule>
        </service>
    </user>
    ...
</backup_settings>
</pairing_request>
</auth_request>
```

It is to be understood that although the pairing request was shown using username and password pairs for service authentication, other authentication methods may be used. In one implementation, an OAuth2 authentication scheme in which an entity (e.g., company) grants the MBR access to the data of their users (e.g., employees) may be utilized. Accordingly, service authentication may be performed via a client_id and client_secret, and a user's data may be accessed based on the user's username.

A service pairing (SP) component 1125 may utilize data provided in the pairing request to facilitate configuring pairing settings. See FIG. 12 for additional details regarding the SP component. It is to be understood that, in some implementations, a separate MBR pairing server may be utilized to handle pairing requests from clients and to execute the SP component, instead of using the MBR source server. Such MBR pairing server would also facilitate providing the MBR source server with relevant backup schedules.

The MBR source server may send a pairing data store request 1126 to a mappings database 1110 to store the pairing settings. In one implementation, the pairing data store request may include data such as a request identifier, pairing settings, and/or the like. In one embodiment, the MBR source server may provide the following example pairing data store request, substantially in the form of a HTTP(S) POST message including XML-formatted data, as provided below:

```
POST /pairing_data_store_request.php HTTP/1.1
Host: www.server.com
Content-Type: Application/XML
Content-Length: 667
<?XML version = "1.0" encoding = "UTF-8"?>
<pairing_data_store_request>
    <request_identifier>ID_request_2</request_identifier>
    <pairing_settings>
        <settings>
            <account_identifier>ID_company_1</account_identifier>
            <user_identifier>ID_user_1</user_identifier>
            <service_identifier>ID_service_google_drive</service_identifier>
            <source_node_identifier>ID_source_node</source_node_identifier>
            <source_node_volume>ID_backup_volume</source_node_volume>
            <target_node_identifier>ID_target_node</target_node_identifier>
            <target_node_volume>ID_replication_volume</target_node_volume>
        </settings>
        <settings>
            <account_identifier>ID_company_1</account_identifier>
            <user_identifier>ID_user_1</user_identifier>
            <service_identifier>ID_service_sharepoint</service_identifier>
            <source_node_identifier>ID_source_node</source_node_identifier>
            <source_node_volume>ID_backup_volume</source_node_volume>
```

-continued

```
            <target_node_identifier>ID_target_node</target_node_identifier>
            <target_node_volume>ID_replication_volume</target_node_volume>
        </settings>
        ...
    </pairing_settings>
</pairing_data_store_request>
```

The mappings database may confirm that the pairing settings were stored via a pairing data store response 1127.

The MBR source server may send a pairing response 1129 to the client to inform the administrative user whether pairing settings were configured successfully and/or to request corrections. In one implementation, the pairing response may include data such as a response identifier, a status, and/or the like. In one embodiment, the MBR source server may provide the following example pairing response, substantially in the form of a HTTP(S) POST message including XML-formatted data, as provided below:

```
POST /pairing_response.php HTTP/1.1
Host: www.server.com
Content-Type: Application/XML
Content-Length: 667
<?XML version = "1.0" encoding = "UTF-8"?>
<pairing_response>
    <response_identifier>ID_response_1</response_identifier>
    <status>OK</status>
</pairing_response>
```

A service backup processing (SBP) component 1133 may utilize data provided in the pairing request to facilitate backing up SaaS data of a paired service and/or generating a replication notification. See FIG. 13 for additional details regarding the SBP component.

The MBR source server may send a data sync request 1137 to a SaaS server 1104 to obtain SaaS data to be backed up. In one implementation, the data sync request may comprise a set of commands (e.g., specific to the paired service) that may facilitate logging in to access the associated user's data (e.g., using the MBR's client_id and client_secret (e.g., and the username of the associated user), using the associated user's credentials (e.g., username and password)), determining data that changed since the last backup (e.g., using timestamp data, using an API provided by the paired service), downloading SaaS data (e.g., available data, changed data), and/or the like. The SaaS server may send a data sync response 1141 to the MBR source server with the requested data.

A source replication (SR) component 1145 may (e.g., in response to the replication notification) utilize a snapshot of the backed-up SaaS data to facilitate sending a replication data stream to a MBR target server 1108. See FIG. 14 for additional details regarding the SR component.

The MBR source server may send a replication target request 1149 to a mappings database 1110 to facilitate determining the replication target node (e.g., the MBR target server) and/or replication target volume associated with the paired service. In one implementation, the replication target request may include data such as a request identifier, an entity identifier, a user identifier, a service identifier, a source node identifier, a source node volume, and/or the like. In one embodiment, the MBR source server may provide the following example replication target request, substantially in the form of a HTTP(S) POST message including XML-formatted data, as provided below:

```
POST /replication_target_request.php HTTP/1.1
Host: www.server.com
Content-Type: Application/XML
Content-Length: 667
<?XML version = "1.0" encoding = "UTF-8"?>
<replication_target_request>
    <request_identifier>ID_request_3</request_identifier>
    <account_identifier>ID_company_1</account_identifier>
    <user_identifier>ID_user_1</user_identifier>
    <service_identifier>ID_service_google_drive</service_identifier>
    <source_node_identifier>ID_source_node</
    source_node_identifier>
    <source_node_volume>ID_backup_volume</
    source_node_volume>
</replication_target_request>
```

The mappings database may send a replication target response 1153 to the MBR source server with the requested data. In one implementation, the replication target response may include data such as a response identifier, the requested data, and/or the like. In one embodiment, the mappings database may provide the following example replication target response, substantially in the form of a HTTP(S) POST message including XML-formatted data, as provided below:

```
POST /replication_target_response.php HTTP/1.1
Host: www.server.com
Content-Type: Application/XML
Content-Length: 667
<?XML version = "1.0" encoding = "UTF-8"?>
<replication_target_response>
    <response_identifier>ID_response_3</response_identifier>
    <target_node_identifier>ID_target_node</target_node_identifier>
    <target_node_volume>ID_replication_volume</
    target_node_volume>
</replication_target_response>
```

The MBR source server may send the replication data stream 1157 to the MBR target server to facilitate replication of the backed-up SaaS data. In one implementation, the replication data stream may include data such as multiplexed chunks representing serialized snapshot data corresponding to the backed-up SaaS data, multiplexed chunks representing serialized snapshot data corresponding to other users, services, etc., and/or the like data sent over a persistent connection (e.g., a TCP/IP connection).

A target replication (TR) component 1161 may utilize data provided in the replication data stream to facilitate replication of the backed-up SaaS data. See FIG. 15 for additional details regarding the TR component.

The MBR target server may send a replication confirmation 1165 to the MBR source server to confirm that the backed-up SaaS data obtained via the replication data stream was replicated successfully.

FIG. 12 shows a logic flow illustrating embodiments of a service pairing (SP) component for the MBR. In FIG. 12, a service pairing request from an entity (e.g., a company, an organization, an individual user) may be obtained at 1201. For example, the service pairing request from entity may be obtained as a result of an administrative user of the entity utilizing a MBR application, mobile app, website, and/or the like to pair a set of services for a set of users for backup via the MBR. It is to be understood that although the SP component is discussed in the context of back up and replication of SaaS data associated with services, other data (e.g., on a local client device) may be similarly paired for backup (e.g., including metadata) and replication via the MBR.

A determination may be made at 1205 whether there remain users to process. For example, multiple employees may be processed for a company. In another example, an individual user may be processed. In one implementation, each of the users specified in the service pairing request may be processed. If there remain users to process, the next user may be selected for processing at 1209.

A determination may be made at 1213 whether there remain services to process. For example, the same services or different services may be paired for different users. In one implementation, each of the services specified in the service pairing request for the selected user may be processed. If there remain services to process, the next service may be selected for processing at 1217.

Service identifying data for the selected service may be determined at 1221. For example, the service identifying data may specify the name, location (e.g., website address), subsection of the selected user's SaaS data on the selected service to be backed up, and/or the like. In another example, the service identifying data may specify an identifier associated with the selected service that may be used to retrieve such data from a previously configured database. In one implementation, the service pairing request may be parsed (e.g., using PHP commands) to determine the service identifying data (e.g., based on the value of the service_identifier field).

Service authentication data for the selected service may be determined at 1225. For example, the service authentication data may specify the MBR's client_id and client_secret that may be utilized to access SaaS data on the selected service, and a username of the selected user (e.g., which determines which SaaS data to access). In another example, the service authentication data may specify a username and password of the selected user that may be utilized to access the selected user's SaaS data on the selected service. In one implementation, the service pairing request may be parsed (e.g., using PHP commands) to determine the service authentication data (e.g., based on the value of the service_login_data field).

A service backup schedule may be determined at 1229. For example, the service backup schedule may specify when the selected user's SaaS data on the selected service should be backed up via the MBR. In one implementation, the service pairing request may be parsed (e.g., using PHP commands) to determine the service backup schedule (e.g., based on the value of the backup_schedule field).

A backup volume for the selected service at a source node may be generated at 1233. In one implementation, a backup volume may be a ZFS zvol (e.g., a virtual block device). In another implementation, a backup volume may be a ZFS dataset (e.g., a ZFS filesystem). Both a ZFS zvol and a ZFS dataset are snapshottable via ZFS and may be replicated via the MBR. For example, the source node may be the node executing the SP component or another node assigned for backup of the selected user's SaaS data on the selected service. In one embodiment, a separate backup volume may be created for each service utilized by a user. In another embodiment, a backup volume may be created for each user and may store the corresponding user's backed up SaaS data from services utilized by the corresponding user. In one implementation, the source node may be instructed to create a ZFS zvol (e.g., a simulated block device snapshotable via ZFS) backup volume.

A replication target node may be determined at 1237. In one embodiment, the replication target node may be utilized to replicate the selected user's SaaS data to create a secure second copy. In one implementation, the replication target node may be assigned for a set of specified entities, users, services, and/or the like. In another implementation, the replication target node may be selected at random. In another implementation, the replication target node may be assigned prior to obtaining the service pairing request (e.g., during onboarding of the entity). For example, the entity may send a pairing request with a desired geographic datacenter, and may be paired with a source and target nodes in the desired geographic datacenter. It is to be understood that a node (e.g., a source node, a replication target node) may be configured to serve any combination of specified entities, users, services, and/or the like.

A replication volume for the selected service at the target node may be generated at 1241. For example, the structure of the generated replication volumes may correspond to the structure of the generated backup volumes. In one implementation, the target node may be instructed to create a ZFS zvol (e.g., a simulated block device snapshotable via ZFS) or a ZFS dataset replication volume (e.g., corresponding to the backup volume). In an alternative embodiment, the replication volume may be created during the first replication event.

If there do not remain users to process, pairing configuration settings may be saved at 1245. For example, the pairing configuration settings may include information regarding the entity, the users, the services, service backup schedules, mapping data that links a backup volume on a source node to a replication volume on a target node, and/or the like. In one implementation, the pairing configuration settings (e.g., a service backup schedule) may be saved in a configuration file (e.g., on the corresponding source node). In another implementation, the pairing configuration settings (e.g., mapping data that links a backup volume on a source node to a replication volume on a target node) may be saved in a database (e.g., via MySQL database commands). For example, pairing configuration settings for a paired service may be saved via a MySQL database command similar to the following:

```
INSERT INTO Mappings (accountID, userID, serviceID, serviceAuthenticationDataForUser, serviceBackupScheduleForUser, sourceNodeID, sourceNodeBackupVolume, targetNodeID, targetNodeReplicationVolume)
VALUES (ID_company_1, ID_user_1, ID_service_google_drive, "username and password", "create a snapshot 2 times per day", ID_source_node, ID_backup_volume, ID_target_node, ID_replication_volume);
```

FIG. 13 shows a logic flow illustrating embodiments of a service backup processing (SBP) component for the MBR. In FIG. 13, a backup schedule may be checked at 1301 to determine whether it is time to backup SaaS data of a paired service (e.g., ID_service_google_drive) of a user (e.g., ID_user_1). In one implementation, a scheduler component on a source node executing the SBP component may send a notification when it is time to back up the service. It is to be understood that although the SBP component is discussed in the context of back up and replication of SaaS data associated with services, backups (e.g., including metadata) of other data (e.g., on a local client device) may be similarly processed.

If it is determined at 1305 that it is not yet time to back up the service, the MBR may wait at 1309 and check the backup schedule again at a later time. If it is determined at 1305 that it is time to back up the service, service identifying data may be retrieved at 1313. For example, the retrieved service identifying data may include service location (e.g., website address), a specification of a subsection of the user's SaaS data on the service to be backed up, and/or the like. In one implementation, the service identifying data may be retrieved from a configuration file (e.g., on the source node). In another implementation, the service identifying data may be retrieved from a database (e.g., via MySQL database commands). For example, the service identifying data may be retrieved via a MySQL database command similar to the following:

```
SELECT serviceURL
FROM Services
WHERE serviceID = ID_service_google_drive;
```

Service authentication data may be retrieved at 1317. For example, the retrieved service authentication data may include a username and password of the user that may be utilized to access the user's SaaS data on the service. In one implementation, the service authentication data may be retrieved from a configuration file (e.g., on the source node). In another implementation, the service authentication data may be retrieved from a database (e.g., via MySQL database commands). For example, the service authentication data may be retrieved via a MySQL database command similar to the following:

```
SELECT serviceAuthenticationDataForUser
FROM Mappings
WHERE accountID = ID_company_1 AND
    userID = ID_user_1 AND
    serviceID = ID_service_google_drive;
```

A network connection with the service may be established at 1321. In one implementation, the source node may connect to the service (e.g., via the website address of the service, via a network share location, via an API provided by the service) and may utilize the user's username and password to log in.

The user's SaaS data on the service may be synchronized to the backup volume for the service at the source node at 1325. For example, SaaS data may include documents (e.g., stored via Microsoft OneDrive), calendars (e.g., stored via Microsoft SharePoint), emails (e.g., stored via Microsoft Exchange), and/or the like. In one implementation, the entire contents of the user's SaaS data on the service (or the subsection of the user's SaaS data on the service to be backed up) may be copied. In another implementation, an incremental operation that copies the user's SaaS data that has changed since the previous backup may be performed. For example, a time (e.g., last changed time, created time, received time, sent time) associated with each SaaS data item may be checked and compared against the time of the previous backup to perform the incremental operation. In another example, an API provided by the service may be utilized to determine SaaS data items that had changed since the previous backup. In one implementation, the backup volume for the service may be determined from a configuration file (e.g., on the source node). In another implementation, the backup volume for the service may be determined from a database (e.g., via MySQL database commands). For example, the backup volume for the service may be determined via a MySQL database command similar to the following:

```
SELECT sourceNodeBackupVolume
FROM Mappings
WHERE accountID = ID_company_1 AND
    userID = ID_user_1 AND
    serviceID = ID_service_google_drive AND
    sourceNodeID = ID_source_node;
```

A determination may be made at 1329 whether the user's SaaS data on the service changed since the last backup. If so, a snapshot of the backup volume for the service at the source node may be generated at 1333. In one implementation, a ZFS snapshot of the zvol may be performed. For example, a snapshot may be utilized as a recovery point during a restore operation.

A replication notification may be generated at 1337. For example, the replication notification may be utilized to indicate (e.g., to the SR component) that a snapshot of the backup volume was taken and should be replicated. In one implementation, the replication notification may be a Scala event object sent from the SBP component to the SR component. For example, the replication notification may include data as provided below:

Replication Notification
account_identifier: ID_company_1
user_identifier: ID_user_1
service_identifier: ID_service_google_drive
source_node_identifier: ID_source_node
source_node_volume: ID_backup_volume
snapshot_identifier: ID_snapshot_1

FIG. 14 shows a logic flow illustrating embodiments of a source replication (SR) component for the MBR. In FIG. 14, a replication notification may be obtained at 1401. For example, the replication notification may be obtained as a result of the SBP component notifying the SR component that a snapshot of a backup volume was taken and should be replicated.

An entity identifier and/or a user identifier and/or a service identifier associated with the replication notification may be determined at 1405. In one implementation, the replication notification may be parsed (e.g., using PHP commands) to determine the entity identifier and/or the user identifier and/or the service identifier (e.g., based on the values of the account_identifier field and/or the user_identifier field and/or the service_identifier field).

A replication target node associated with the replication notification may be determined at 1409, and a replication volume associated with the replication notification may be determined at 1413. In one embodiment, the replication target node and/or the replication volume may be determined based on any combination of the entity identifier and/or the user identifier and/or the service identifier. In one implementation, the replication target node and/or the replication volume may be retrieved from a mappings database (e.g., via MySQL database commands). For example, the replication target node and/or the replication volume may be determined via a MySQL database command similar to the following:

```
SELECT targetNodeID, targetNodeReplicationVolume
FROM Mappings
WHERE accountID = ID_company_1 AND
    userID = ID_user_1 AND
    serviceID = ID_service_google_drive;
```

In another embodiment, the replication target node and/or the replication volume may be determined (e.g., alternatively or additionally) based on any combination of a source node identifier and/or a backup volume identifier (e.g., based on the values of the source_node_identifier field and/or the source_node_volume field in the replication notification). For example, the replication target node and/or the replication volume may be determined via a MySQL database command similar to the following:

```
SELECT targetNodeID, targetNodeReplicationVolume
FROM Mappings
WHERE sourceNodeID = ID_source_node AND
    source_node_volume = ID_backup_volume;
```

A determination may be made at 1417 whether a network connection with the replication target node has already been established. For example, a single persistent TCP/IP connection may be utilized to transfer multiplexed snapshot data from a plurality of snapshots for replication from the source node to the replication target node. If a network connection has not yet been established, a network connection with the replication target node may be established at 1421. In one implementation, a TCP/IP connection may be established (e.g., using a network address associated with the target node identifier). In another implementation, a UDP connection may be established (e.g., using custom reliability and/or error-checking implementations).

A backup volume identifier of the backup volume and/or a snapshot identifier of the snapshot may be determined at 1425. In one implementation, the replication notification may be parsed (e.g., using PHP commands) to determine the backup volume identifier and/or the snapshot identifier (e.g., based on the values of the source_node_volume field and/or the snapshot_identifier field).

A priority for the snapshot may be determined at 1433. For example, snapshot priority may be used to determine how to order snapshot data from a plurality of snapshots for replication from the source node to the replication target node. In one implementation, the priority for the snapshot may be determined based on the latest backup volume replication timestamp (e.g., to give higher priority to the least recently replicated backup volumes). In another implementation, the priority for the snapshot may be determined based on snapshot size (e.g., to give higher priority to smaller snapshots). In another implementation, the priority for the snapshot may be determined based on the associated entity identifier and/or user identifier and/or service identifier (e.g., to give higher priority to snapshots from specified entities and/or users and/or services). It is to be understood that a variety of rules and/or combinations of rules may be utilized to determined priority.

The snapshot may be added to a set of snapshots (e.g., a priority queue of snapshots) to be transferred to the target node at 1437. In one implementation, the backup volume identifier and/or the snapshot identifier of the snapshot may be added as an element with the determined priority to the priority queue of snapshots.

A determination may be made at 1441 whether it is time to send the snapshot to the replication target node. In one implementation, this determination may be made based on whether the element associated with the snapshot (e.g., comprising the backup volume identifier and/or the snapshot identifier and/or the priority of the snapshot) is the element of the priority queue with the highest priority.

If the element associated with the snapshot does not have the highest priority, a determination may be made at 1445 whether there are other snapshots of the backup volume in the priority queue (e.g., added while the snapshot was waiting to be sent). For example, if the backup volume is utilized to store SaaS data for a specific user, the priority queue may be searched for other snapshots of the backup volume that stores SaaS data for that user. In another example, if the backup volume is utilized to store SaaS data from a specific service, the priority queue may be searched for other snapshots of the backup volume that stores SaaS data for that service. If there are other snapshots of the backup volume, the priorities of the snapshots of the backup volume in the priority queue may be adjusted to combine snapshot data for transfer at 1449. In one implementation, the priorities of the snapshots of the backup volume may be adjusted (e.g., made equal or similar) to improve transfer efficiency (e.g., to send snapshot data from multiple snapshots for the backup volume multiplexed in a data stream).

If the element associated with the snapshot does have the highest priority, a named pipe (e.g., FIFO) for the snapshot may be created at 1451. In one implementation, the named pipe may be used to facilitate communication of the snapshot's data between MBR components. For example, the named pipe for the snapshot may be created as follows:

```
mkfifo fifo1
zfs send ID_backup_volume@ID_snapshot_1>fifo1
```

In some implementations, incremental snapshot data may be sent (e.g., using the zfs send -i option and a previously replicated snapshot).

Snapshot data of the snapshot may be serialized into chunks at 1453. In one implementation, protocol buffers (ProtoBufs) may be utilized (e.g., via Scala) to serialize the snapshot data into chunks. For example, Scala commands may be utilized to read the snapshot data from the named pipe created for the snapshot (e.g., fifo1) and to generate chunks as follows:

```
Proto definition file
syntax = "proto3";
message SendRecvMessage {
    string datasetId           = 1;
    string latestSnapshotId    = 2;
    string recvResumeToken     = 3;
    bytes data                 = 4;
    enum MessageType {
        UNKNOWN        = 0;
        SEND_SYN       = 1;
        SEND_ACK       = 2;
        SEND_CHUNK     = 3;
        SEND_FIN       = 4;
    }
    MessageType messageType = 5;
}
```

Serializing snapshot data into chunks

The following example code defines a Scala class that may be used to read snapshot data from a named pipe associated with the specified dataset and serialize it into chunks of a specified size on the replication source node.

The getFifoPath function is a helper method returning the path to the named pipe (e.g., fifo1) derived from the datasetId.

Each chunk is serialized as protocol buffer containing:

1) A message type specifying that the protocol buffer should be interpreted as a chunk of snapshot data
2) A datasetId identifying the ZFS dataset
3) A byte array containing a chunk snapshot data for the associated dataset

```
    class FifoReader(datasetId: String, chunkSize: Int) {
        val buffer: Array[Byte]          = new Array[Byte](chunkSize)
        val fifoPath: Path               = getFifoPath(datasetId)
        val sendStream: InputStream      = Files.newInputStream(fifoPath)
    def readSerializedChunk: Option[Array[Byte]] = {
        val read = sendStream.read(buffer, 0, chunkSize)
        if (read == −1) {
            None
        } else {
            val builder = SendRecvMessage.newBuilder( )
            builder.setMessageType(SendRecvMessage.MessageType.SEND_CHUNK)
            builder.setDatasetId(datasetId)
            builder.setData(buffer)
            Some(builder.build.toByteArray)
        }
    }
}
```

The serialized snapshot data chunks may be multiplexed into a replication data stream at 1457. For example, the SR component may be configured to transfer a specified number of snapshots (e.g., 3 snapshots) concurrently in the replication data stream via the network connection with the replication target node. In one implementation, chunks from one or more snapshots that are sent concurrently may be combined into the replication data stream as the chunks become available from the corresponding named pipes. For example, Scala commands may be utilized to combine the generated chunks into the replication data stream as follows:

Multiplexing data chunks

The following Scala code shows an example of how to instantiate a WebSocket client to a replication target node as well a function that utilizes the serialization code to read snapshot data from a named pipe, serialize the snapshot data into chunks, and send each chunk to the replication target node via the WebSocket.

Scala threading or concurrency frameworks such as Akka may be used to create multiple threads to concurrently read, serialize, and send chunks from multiple datasets over the same WebSocket instance.

```
val webSocket = new WebSocket("wss://targetNode.com:9992")
def sendChunksOverWebSocket(webSocket: WebSocket, datasetId:
String, chunkSize: int) =
{
    val reader = new FifoReader(datasetId, chunkSize)
    var serializedChunk = reader.readSerializedChunk
    while (serializedChunk.isDefined) {
        webSocket.send(serializedChunk)
        serializedChunk = reader.readSerializedChunk
    }
}
```

A determination may be made at 1461 whether to use compression to compress the replication data stream. If so, the replication data stream may be compressed at 1465. In one implementation, Zstandard (ZSTD) data compression algorithm may be utilized to compress the replication data stream. For example, utilizing data from multiple multiplexed snapshots to generate a compression dictionary may improve the compression ratio of the replication data stream. It is to be understood that compression may be applied to either individual chunks or to the replication data stream as a whole (e.g., to subsections of the replication data stream having a specified size).

The replication data stream may be sent to the replication target node at 1469. In one implementation, the multiplexed chunks in the replication data stream may be sent over the network connection to the replication target node using a WebSocket connection. For example, Scala commands may be utilized to send the replication data stream using a WebSocket connection.

FIG. 15 shows a logic flow illustrating embodiments of a target replication (TR) component for the MBR. In FIG. 15, a network connection request from a source node may be obtained by a replication target node at 1501. For example, the network connection request may be obtained as a result of the SR component on the source node requesting establishment of a network connection with the TR component on the replication target node to transfer multiplexed snapshot data from a plurality of snapshots for replication from the source node to the replication target node.

A network connection with the source node may be established at 1505. In one implementation, a TCP/IP connection may be established. In another implementation, a UDP connection may be established.

A replication data stream from the source node may be obtained at 1509. For example, the replication data stream may comprise multiplexed serialized snapshot data chunks of snapshots to be replicated. In one implementation, the multiplexed chunks in the replication data stream may be received over the network connection from the source node using WebSocket. For example, Scala commands may be utilized to receive the replication data stream using WebSocket.

A determination may be made at 1513 whether compression was used to compress the replication data stream. If so, the replication data stream may be decompressed at 1517. In one implementation, Zstandard (ZSTD) data compression algorithm may be utilized to decompress the replication data stream.

A determination may be made at 1521 whether there remain chunks of the replication data stream to process. In one implementation, each of the chunks of the replication data stream may be processed. If there remain chunks to process, the next chunk may be selected for processing at 1525.

The selected chunk may be deserialized at 1529. In one implementation, protocol buffers (ProtoBufs) may be utilized (e.g., via Scala) to deserialize the selected chunk. For example, Scala commands may be utilized to deserialize the selected chunk as follows:

Deserializing snapshot data

The following example code defines a Scala class that may be used to deserialize chunks and write the snapshot data to a named pipe on the replication target node.

The getFifoPath function is a helper method returning the path to the named pipe (e.g., fifo1) derived from the datasetId.

```
class FifoWriter( ) {
    val recvStream: Outputstream = null
    def writeDeserializeChunk(serializedChunk: Array[Byte]): Unit = {
        val message = SendRecvMessage.parseFrom(serializedChunk)
        val messageType = deserializeChunk.getMessageType
        if (messageType ==
        SendRecvMessage.MessageType.SEND_CHUNK) {
            if (recvStream == null) {
                val datasetId = message.getDatasetId
                val fifoPath = getFifoPath(datasetId)
                recvStream = Files.newOutputStream(fifoPath)
            }
            val snapshotChunk = message.getData
            recvStream.write(snapshotChunk)
        }
    }
}
```

A replication volume identifier of the replication volume (e.g., ID_replication_volume) and/or a snapshot identifier (e.g., ID_snapshot_1) of the snapshot associated with the selected chunk may be determined at 1533. In one implementation, the selected chunk may be parsed (e.g., via Scala) to determine the replication volume identifier of the replication volume and/or the snapshot identifier of the snapshot. For example, the replication volume identifier may be provided by the source node based on data from a mappings database. In another implementation, the selected chunk may be parsed (e.g., via Scala) to determine a backup volume identifier of a backup volume associated with the selected chunk and/or the snapshot identifier of the snapshot. For example, the replication volume identifier may then be determined by the replication node (e.g., using the backup volume identifier and/or a source node identifier of the source node) based on data from a mappings database.

A determination may be made at 1537 regarding the chunk type of the selected chunk In one implementation, the selected chunk may be parsed (e.g., via Scala) to determine the chunk type. For example, the chunk type may be one of: handshake, snapshot data, end of send.

If the chunk type is handshake, an acknowledgement message may be sent to the source node at 1541. In one implementation, a SEND-ACK message may be sent to indicate that the source node may send snapshot data.

If the chunk type is snapshot data, a named pipe (e.g., FIFO) for the snapshot associated with the selected chunk may be determined or created at 1551. In one implementation, a mapping may be established between the replication volume identifier and/or the snapshot identifier of the snapshot, and the named pipe. For example, a Scala Map object may be utilized to establish the mapping. The mapping may be checked (e.g., using the get operation of the Scala Map object) to determine whether the named pipe for the snapshot has been previously created (e.g., when the first snapshot data chunk was received).

If the named pipe for the snapshot has not been created yet, the named pipe for the snapshot may be created and added to the mapping. In one implementation, the named pipe may be used to facilitate communication of the snapshot's data between MBR components. For example, the named pipe for the snapshot may be created as follows:

mkfifo fifo1 zfs recv ID_replication_volume<fifo1

The named pipe may be added to the mapping to establish an associated between the named pipe and the replication volume identifier of the replication volume and/or the snapshot identifier of the snapshot.

If the named pipe for the snapshot has been previously created, the named pipe associated with the chunk may be determined. In one implementation, the replication volume identifier and/or the snapshot identifier associated with the selected chunk may be utilized to determine the associated named pipe using the mapping (e.g., using the get operation of the Scala Map object).

Snapshot data in the selected chunk may be written to the associated named pipe at 1555. For example, Scala commands may be utilized to write the snapshot data in the selected chunk to the associated named pipe (e.g., fifo1).

If the chunk type is end of send, a named pipe associated with the chunk may be determined at 1561. In one implementation, the replication volume identifier and/or the snapshot identifier associated with the selected chunk may be utilized to determine the associated named pipe using the mapping (e.g., using the get operation of the Scala Map object). Writing to the associated named pipe may be finalized at 1565. In one implementation, data indicating the end of snapshot data may be written to the named pipe. In another implementation, the named pipe may be deleted, removed from the mapping, and/or the like.

If the replication data stream has been processed, the network connection with the source node may be terminated at 1571. In one implementation, the network connection may be terminated based on a request from the source node. In another implementation, the network connection may be terminated based on determining that there are no more chunks of the replication data stream to process.

FIG. 16 shows implementation case(s) for the MBR. In FIG. 16, exemplary implementation cases to facilitate replication of snapshot data are illustrated. At 1601, an implementation case that does not utilize a replication data stream as discussed with regard to the SR and TR components is shown. To replicate snapshot data, a command (e.g., zfs list) may be utilized to iterate through backup volumes. Then a command (e.g., zfs list -t snapshot) may be utilized for each backup volume on both a source node and a replication target node to list snapshots associated with the corresponding backup volume. The snapshot lists on the source node and on the replication target node may be compared to determine incremental sends. Then a command (e.g., zfs send . . . | ssh zfs recv . . . ) may be utilized to replicate snapshot data. In this implementation case, it may take over 100K zfs list calls to do a full replication of a node. Further, since zfs send is bursty, multiple ssh tunnels may be taking up system resource during idle periods.

At 1610, an implementation case that utilizes a replication data stream as discussed with regard to the SR and TR components is shown. When a backup completes on a source node, a SendActor (e.g., the SR component) is notified that a snapshot should be replicated to a replication target node. The SR component creates a named pipe for the snapshot at the source node (e.g., using commands: mkfifo fifo1 and zfs send . . . >fifo1). A RecvActor (e.g., the TR component)

creates a named pipe for the snapshot at the replication target node (e.g., using commands: mkfifo fifo1 and zfs recv . . . <fifo1). The SR component is notified that snapshot data is available from the named pipe on the source node, reads chunks from the named pipe, and sends the chunks to the TR component (e.g., using WebSocket). The TR component is notified that snapshot data is available (e.g., on WebSocket), reads chunks, and writes the chunks to the named pipe on the replication target node. In this implementation case, iterating through backup volumes is eliminated and multiple snapshots are sent utilizing a single persistent connection (e.g., TCP/IP connection), improving utilization of system resources.

FIG. 17 shows implementation case(s) for the MBR. In FIG. 17, an exemplary implementation case to facilitate replication of snapshot data is illustrated. At 1701, messages that may be sent during a replication event are shown. A SEND-SYNC message from a source node may initiate a handshake with payload containing the name of a backup volume on the source node. Alternatively, the payload may contain the name of a corresponding replication volume on a replication target node. A SEND_ACK message from the replication target node may include payload that contains either a receive_resume_token, most recent snapshot on the replication volume, or nothing. The source node may compute what to send and may send multiple SEND-CHUNK messages containing ZFS send data. A SEND-FIN message from the source node may signal end of send. In one implementation, message payloads may be encoded as protocol buffers (ProtoBufs).

ADDITIONAL ALTERNATIVE EMBODIMENT EXAMPLES

The following alternative example embodiments provide a number of variations of some of the core principles already discussed for expanded color on the abilities of the MBR.

Alternative Embodiment 1

A system for replicating data snapshots from multiple (e.g., SaaS) clients at a source node to respective replication targets on a replication target node using a multiplexed data stream, comprising:

1. A multi-client (e.g., SaaS) protection module on the source node that contains the (e.g., SaaS) client snapshot data, where the (e.g., SaaS) client snapshot data is associated with respective (e.g., SaaS) client identifiers (e.g., customer IDs)

2. A cloud database that contains an index that maps the (e.g., SaaS) client identifiers to the respective replication targets 3. A notification module on the source node that notifies a queueing module that (e.g., SaaS) client snapshot data are available for replicating. The multi-client (e.g., SaaS) protection module on the source node uses the notification module after taking and performing a backup and creating a snapshot.

4. A queueing module responsive to a notification from the notification module, that forms a prioritized queue of the (e.g., SaaS) client snapshot data that should be replicated.

5. A sending module operating on the source node that acquires the queued-prioritized (e.g., SaaS) client snapshot data, establishes a TCP connection to a replication target node, forms a multiplexed, serialized data stream of prioritized SaaS client snapshot data, and sends the multiplexed, serialized data stream to the replication target node 6. A receiving module on the replication target node that receives the multiplexed, serialized data stream, demultiplexes and deserializes the data within the stream into individual streams according to the mapping in the database, and persists the (e.g., SaaS) client snapshot data to ZFS files at replication targets according to the mapping in the database.

Alternative Embodiment 2

As a data backup procedure, a SaaS protection module will take snapshots using a snapshot enabled file system. For example, a snapshot may be something that can be mounted and contains the backed up cloud data at a specific point-in-time. The snapshots are taken periodically. The snapshots should be replicated to a secondary node to create a second copy within the MBR cloud in order to provide a more secure backup. For every dataset (e.g., backup volume) we should replicate, we pipe zfs send into a named pipe (FIFO) and use Scala to read the send data from the named pipes and combine them into a single stream (single stream communication). That combined stream is sent over a single TCP/IP connection to the replication target. On the replication target, the stream is split back up. This approach enables stream multiplexing and using advanced compression techniques. Also, a customer can replicate to different targets on a replication node. If a node gets full, the stream can move to another node. Further, the target can replicate to another node, and can replicate back to a different primary node.

When the SaaS protection module creates a snapshot on the source node it will start communicating with a replication module, indicating that it took a snapshot and it should be replicated. A queueing module is within the replication module. The queueing module waits to be notified by the SaaS protection module that a new snapshot has been generated and should be replicated. The queueing module sorts the snapshots by various rules to build a queue of prioritized snapshots. An example of queue prioritization of snapshots is to give highest priority to the least recently replicated datasets. In addition to prioritization, if there are multiple snapshots in the queue that are from the same dataset, the queueing module can aggregate that snapshot data increasing the efficiency of the sending module. The queueing module has an orchestration function. It keeps track of everything that should be sent and performs aggregations and prioritizations. The module enqueues information in the snapshots that should be replicated. It puts information into the queue that the replication may utilize downstream, such as zfs data set name and snapshot name.

A send module sends the data to a replication target node. Software on the source node communicates with the queue and obtains the prioritized snapshots, i.e., it gets data that we want to replicate. It opens a TCP connection to the replication target node, which it looks up in the database mapping. So, it knows that a particular snapshot from a client/customer should be replicated to a replication target node and replication target based on the database lookup. The send module then streams the data to the replication target node. This may not be happening one-by-one (customer data is not sent strictly customer-by-customer serial). It may be popping multiple snapshots that should be replicated off the queue. The streaming is of multiple sources of data over to the replication target node. One client may be generating many snapshots per day. We may snapshot per user. If a client has 50 users in their organization, we may be generating 50 snapshots three times per day at the source node. If we should replicate these in parallel and if the snapshots that are being replicated in parallel have the same replication target node, then the send module multiplexes the snapshots and sends them over the same connection. If a snapshot for a dataset already exists on the replication node and a newer snapshot needs to be replicated for that same dataset, only the changes between the last replicated snapshot on the replication target and the newest snapshot are streamed.

The receiving module at the replication target node receives the replication data. It demultiplexes and de-serializes it, i.e., a data chunk is for a particular customer for a particular dataset. So, it appropriately writes the data chunks to zfs datasets that we are replicating.

If multiple replication nodes are specified, multiple queues and TCP data streams may be used.

MBR Controller

FIG. 18 shows a block diagram illustrating embodiments of a MBR controller. In this embodiment, the MBR controller 1801 may serve to aggregate, process, store, search, serve, identify, instruct, generate, match, and/or facilitate interactions with a computer through backup systems technologies, and/or other related data.

Users, which may be people and/or other systems, may engage information technology systems (e.g., computers) to facilitate information processing. In turn, computers employ processors to process information; such processors 1803 may be referred to as central processing units (CPU). One form of processor is referred to as a microprocessor. CPUs use communicative circuits to pass binary encoded signals acting as instructions to allow various operations. These instructions may be operational and/or data instructions containing and/or referencing other instructions and data in various processor accessible and operable areas of memory 1829 (e.g., registers, cache memory, random access memory, etc.). Such communicative instructions may be stored and/or transmitted in batches (e.g., batches of instructions) as programs and/or data components to facilitate desired operations. These stored instruction codes, e.g., programs, may engage the CPU circuit components and other motherboard and/or system components to perform desired operations. One type of program is a computer operating system, which, may be executed by CPU on a computer; the operating system enables and facilitates users to access and operate computer information technology and resources. Some resources that may be employed in information technology systems include: input and output mechanisms through which data may pass into and out of a computer; memory storage into which data may be saved; and processors by which information may be processed. These information technology systems may be used to collect data for later retrieval, analysis, and manipulation, which may be facilitated through a database program. These information technology systems provide interfaces that allow users to access and operate various system components.

In one embodiment, the MBR controller 1801 may be connected to and/or communicate with entities such as, but not limited to: one or more users from peripheral devices 1812 (e.g., user input devices 1811); an optional cryptographic processor device 1828; and/or a communications network 1813.

Networks comprise the interconnection and interoperation of clients, servers, and intermediary nodes in a graph topology. It should be noted that the term "server" as used throughout this application refers generally to a computer, other device, program, or combination thereof that processes and responds to the requests of remote users across a communications network. Servers serve their information to requesting "clients." The term "client" as used herein refers generally to a computer, program, other device, user and/or combination thereof that is capable of processing and making requests and obtaining and processing any responses from servers across a communications network. A computer, other device, program, or combination thereof that facilitates, processes information and requests, and/or furthers the passage of information from a source user to a destination user is referred to as a "node." Networks are generally thought to facilitate the transfer of information from source points to destinations. A node specifically tasked with furthering the passage of information from a source to a destination is called a "router." There are many forms of networks such as Local Area Networks (LANs), Pico networks, Wide Area Networks (WAN s), Wireless Networks (WLANs), etc. For example, the Internet is, generally, an interconnection of a multitude of networks whereby remote clients and servers may access and interoperate with one another.

The MBR controller 1801 may be based on computer systems that may comprise, but are not limited to, components such as: a computer systemization 1802 connected to memory 1829.

Computer Systemization

A computer systemization 1802 may comprise a clock 1830, central processing unit ("CPU(s)" and/or "processor(s)" (these terms are used interchangeable throughout the disclosure unless noted to the contrary)) 1803, a memory 1829 (e.g., a read only memory (ROM) 1806, a random access memory (RAM) 1805, etc.), and/or an interface bus 1807, and most frequently, although not necessarily, are all interconnected and/or communicating through a system bus 1804 on one or more (mother)board(s) 1802 having conductive and/or otherwise transportive circuit pathways through which instructions (e.g., binary encoded signals) may travel to effectuate communications, operations, storage, etc. The computer systemization may be connected to a power source 1886; e.g., optionally the power source may be internal. Optionally, a cryptographic processor 1826 may be connected to the system bus. In another embodiment, the cryptographic processor, transceivers (e.g., ICs) 1874, and/or sensor array (e.g., accelerometer, altimeter, ambient light, barometer, global positioning system (GPS) (thereby allowing MBR controller to determine its location), gyroscope, magnetometer, pedometer, proximity, ultra-violet sensor, etc.) 1873 may be connected as either internal and/or external peripheral devices 1812 via the interface bus I/O 1808 (not pictured) and/or directly via the interface bus 1807. In turn, the transceivers may be connected to antenna(s) 1875, thereby effectuating wireless transmission and reception of various communication and/or sensor protocols; for example the antenna(s) may connect to various transceiver chipsets (depending on deployment needs), including: Broadcom® BCM4329FKUBG transceiver chip (e.g., providing 802.11n, Bluetooth 2.1+EDR, FM, etc.); a Broadcom® BCM4752 GPS receiver with accelerometer, altimeter, GPS, gyroscope, magnetometer; a Broadcom® BCM4335 transceiver chip (e.g., providing 2G, 3G, and 4G long-term evolution (LTE) cellular communications; 802.11ac, Bluetooth 4.0 low energy (LE) (e.g., beacon features)); a Broadcom® BCM43341 transceiver chip (e.g., providing 2G, 3G and 4G LTE cellular communications; 802.11 g/, Bluetooth 4.0, near field communication (NFC), FM radio); an Infineon Technologies® X-Gold 618-PMB9800 transceiver chip (e.g., providing 2G/3G HSDPA/HSUPA communications); a MediaTek® MT6620 transceiver chip (e.g., providing 802.11a/ac/b/g/n, Bluetooth 4.0 LE, FM, GPS; a Lapis Semiconductor® ML8511 UV sensor; a maxim integrated MAX44000 ambient light and infrared proximity sensor; a Texas Instruments® WiLink WL1283 transceiver chip (e.g., providing 802.11n, Bluetooth 3.0, FM, GPS); and/or the like. The system clock may have a crystal oscillator and generates a base signal through the computer systemization's circuit pathways. The clock may be coupled to the system bus and various clock multipliers that will increase or decrease the base operating frequency for other components interconnected in the computer systemization. The clock and various components in a computer systemization drive signals embodying information throughout the system. Such transmission and reception of instructions embodying information throughout a computer systemization may be referred to as communications. These communicative instructions may further be transmitted, received, and the cause of return and/or reply communications beyond the instant computer systemization to: communications networks, input devices, other computer systemizations, peripheral devices, and/or the like. It should be understood that in alternative embodiments, any of the above components may be connected directly to one another, connected to the CPU, and/or organized in numerous variations employed as exemplified by various computer systems.

The CPU comprises at least one high-speed data processor adequate to execute program components for executing user and/or system-generated requests. The CPU is often packaged in a number of formats varying from large supercomputer(s) and mainframe(s) computers, down to mini computers, servers, desktop computers, laptops, thin clients (e.g., Chromebooks®), netbooks, tablets (e.g., Android®, iPads®, and Windows® tablets, etc.), mobile smartphones (e.g., Android®, iPhones®, Nokia®, Palm® and Windows® phones, etc.), wearable device(s) (e.g., watches, glasses, goggles (e.g., Google Glass), etc.), and/or the like. Often, the processors themselves will incorporate various specialized processing units, such as, but not limited to: integrated system (bus) controllers, memory management control units, floating point units, and even specialized processing sub-units like graphics processing units, digital signal processing units, and/or the like. Additionally, processors may include internal fast access addressable memory, and be capable of mapping and addressing memory 1829 beyond the processor itself; internal memory may include, but is not limited to: fast registers, various levels of cache memory (e.g., level 1, 2, 3, etc.), RAM, etc. The processor may access this memory through the use of a memory address space that is accessible via instruction address, which the processor can construct and decode allowing it to access a circuit path to a specific memory address space having a memory state. The CPU may be a microprocessor such as: AMD's Athlon®, Duron® and/or Opteron®; Apple's® A series of processors (e.g., A5, A6, A7, A8, etc.); ARM's® application, embedded and secure processors; IBM® and/or Motorola's DragonBall® and PowerPC®; IBM's® and Sony's® Cell processor; Intel's® 80X86 series (e.g., 80386, 80486), Pentium®, Celeron®, Core (2) Duo®, i series (e.g., i3, i5, i7, etc.), Itanium®, Xeon®, and/or XScale®; Motorola's® 680X0 series (e.g., 68020, 68030, 68040, etc.); and/or the like processor(s). The CPU interacts with memory through instruction passing through conductive and/or transportive conduits (e.g., (printed) electronic and/or optic circuits) to execute stored instructions (i.e., program code) according to various data processing techniques. Such instruction passing facilitates communication within the MBR controller and beyond through various interfaces. Should processing requirements dictate a greater amount speed and/or capacity, distributed processors (e.g., see Distributed MBR below), mainframe, multi-core, parallel, and/or super-computer architectures may similarly be employed. Alternatively, should deployment requirements dictate greater portability, smaller mobile devices (e.g., Personal Digital Assistants (PDAs)) may be employed.

Depending on the particular implementation, features of the MBR may be achieved by implementing a microcontroller such as CAST's® R8051XC2 microcontroller; Intel's® MCS 51 (i.e., 8051 microcontroller); and/or the like. Also, to implement certain features of the MBR, some feature implementations may rely on embedded components, such as: Application-Specific Integrated Circuit ("ASIC"), Digital Signal Processing ("DSP"), Field Programmable Gate Array ("FPGA"), and/or the like embedded technology. For example, any of the MBR component collection (distributed or otherwise) and/or features may be implemented via the microprocessor and/or via embedded components; e.g., via ASIC, coprocessor, DSP, FPGA, and/or the like. Alternately, some implementations of the MBR may be implemented with embedded components that are configured and used to achieve a variety of features or signal processing.

Depending on the particular implementation, the embedded components may include software solutions, hardware solutions, and/or some combination of both hardware/software solutions. For example, MBR features discussed herein may be achieved through implementing FPGAs, which are a semiconductor devices containing programmable logic components called "logic blocks", and programmable interconnects, such as the high performance FPGA Virtex® series and/or the low cost Spartan® series manufactured by Xilinx®. Logic blocks and interconnects can be programmed by the customer or designer, after the FPGA is manufactured, to implement any of the MBR features. A hierarchy of programmable interconnects allow logic blocks to be interconnected as needed by the MBR system designer/administrator, somewhat like a one-chip programmable breadboard. An FPGA's logic blocks can be programmed to perform the operation of basic logic gates such as AND, and XOR, or more complex combinational operators such as decoders or mathematical operations. In most FPGAs, the logic blocks also include memory elements, which may be circuit flip-flops or more complete blocks of memory. In some circumstances, the MBR may be developed on FPGAs and then migrated into a fixed version that more resembles ASIC implementations. Alternate or coordinating implementations may migrate MBR controller features to a final ASIC instead of or in addition to FPGAs. Depending on the implementation all of the aforementioned embedded components and microprocessors may be considered the "CPU" and/or "processor" for the MBR.

Power Source

The power source 1886 may be of any various form for powering small electronic circuit board devices such as the following power cells: alkaline, lithium hydride, lithium ion, lithium polymer, nickel cadmium, solar cells, and/or the like. Other types of AC or DC power sources may be used as well. In the case of solar cells, in one embodiment, the case provides an aperture through which the solar cell may capture photonic energy. The power cell 1886 is connected to at least one of the interconnected subsequent components of the MBR thereby providing an electric current to all subsequent components. In one example, the power source 1886 is connected to the system bus component 1804. In an alternative embodiment, an outside power source 1886 is provided through a connection across the I/O 1808 interface. For example, a USB and/or IEEE 1394 connection carries both data and power across the connection and is therefore a suitable source of power.

Interface Adapters

Interface bus(ses) 1807 may accept, connect, and/or communicate to a number of interface adapters, variously although not necessarily in the form of adapter cards, such as but not limited to: input output interfaces (I/O) 1808, storage interfaces 1809, network interfaces 1810, and/or the like. Optionally, cryptographic processor interfaces 1827 similarly may be connected to the interface bus. The interface bus provides for the communications of interface adapters with one another as well as with other components of the computer systemization. Interface adapters are adapted for a compatible interface bus. Interface adapters variously connect to the interface bus via a slot architecture. Various slot architectures may be employed, such as, but not limited to: Accelerated Graphics Port (AGP), Card Bus, (Extended) Industry Standard Architecture ((E)ISA), Micro Channel Architecture (MCA), NuBus, Peripheral Component Interconnect (Extended) (PCI(X)), PCI Express, Personal Computer Memory Card International Association (PCMCIA), and/or the like.

Storage interfaces 1809 may accept, communicate, and/or connect to a number of storage devices such as, but not limited to: storage devices 1814, removable disc devices, and/or the like. Storage interfaces may employ connection protocols such as, but not limited to: (Ultra) (Serial) Advanced Technology Attachment (Packet Interface) ((Ultra) )(Serial) ATA(PI)), (Enhanced) Integrated Drive Electronics ((E)IDE), Institute of Electrical and Electronics Engineers (IEEE) 1394, fiber channel, Small Computer Systems Interface (SCSI), Universal Serial Bus (USB), and/or the like.

Network interfaces 1810 may accept, communicate, and/or connect to a communications network 1813. Through a communications network 1813, the MBR controller is accessible through remote clients **1833*b* (e.g., computers with web browsers) by users 1833*a*. Network interfaces may employ connection protocols such as, but not limited to: direct connect, Ethernet (thick, thin, twisted pair 10/100/1000/10000 Base T, and/or the like), Token Ring, wireless connection such as IEEE 802.11a-x, and/or the like. Should processing requirements dictate a greater amount speed and/or capacity, distributed network controllers (e.g., see Distributed MBR below), architectures may similarly be employed to pool, load balance, and/or otherwise decrease/increase the communicative bandwidth required by the MBR controller. A communications network may be any one and/or the combination of the following: a direct interconnection; the Internet; Interplanetary Internet (e.g., Coherent File Distribution Protocol (CFDP), Space Communications Protocol Specifications (SCPS), etc.); a Local Area Network (LAN); a Metropolitan Area Network (MAN); an Operating Missions as Nodes on the Internet (OMNI); a secured custom connection; a Wide Area Network (WAN); a wireless network (e.g., employing protocols such as, but not limited to a cellular, WiFi, Wireless Application Protocol (WAP), I-mode, and/or the like); and/or the like. A network interface may be regarded as a specialized form of an input output interface. Further, multiple network interfaces 1810 may be used to engage with various communications network types 1813**. For example, multiple network interfaces may be employed to allow for the communication over broadcast, multicast, and/or unicast networks.

Input Output interfaces (I/O) 1808 may accept, communicate, and/or connect to user, peripheral devices 1812 (e.g., input devices 1811), cryptographic processor devices 1828, and/or the like. I/O may employ connection protocols such as, but not limited to: audio: analog, digital, monaural, RCA, stereo, and/or the like; data: Apple Desktop Bus (ADB), IEEE 1394a-b, serial, universal serial bus (USB); infrared; joystick; keyboard; midi; optical; PC AT; PS/2; parallel; radio; touch interfaces: capacitive, optical, resistive, etc. displays; video interface: Apple Desktop Connector (ADC), BNC, coaxial, component, composite, digital, Digital Visual Interface (DVI), (mini) displayport, high-definition multimedia interface (HDMI), RCA, RF antennae, S-Video, VGA, and/or the like; wireless transceivers: 802.11a/ac/b/g/n/x; Bluetooth; cellular (e.g., code division multiple access (CDMA), high speed packet access (HSPA(+)), high-speed downlink packet access (HSDPA), global system for mobile communications (GSM), long term evolution (LTE), WiMax, etc.); and/or the like. One output device may include a video display, which may comprise a Cathode Ray Tube (CRT) or Liquid Crystal Display (LCD) based monitor with an interface (e.g., DVI circuitry and cable) that accepts signals from a video interface, may be used. The video interface composites information generated by a computer systemization and generates video signals based on the composited information in a video memory frame. Another output device is a television set, which accepts signals from a video interface. The video interface provides the composited video information through a video connection interface that accepts a video display interface (e.g., an RCA composite video connector accepting an RCA composite video cable; a DVI connector accepting a DVI display cable, etc.).

Peripheral devices 1812 may be connected and/or communicate to I/O and/or other facilities of the like such as network interfaces, storage interfaces, directly to the interface bus, system bus, the CPU, and/or the like. Peripheral devices may be external, internal and/or part of the MBR controller. Peripheral devices may include: antenna, audio devices (e.g., line-in, line-out, microphone input, speakers, etc.), cameras (e.g., gesture (e.g., Microsoft Kinect) detection, motion detection, still, video, webcam, etc.), dongles (e.g., for copy protection, ensuring secure transactions with a digital signature, and/or the like), external processors (for added capabilities; e.g., crypto devices 528), force-feedback devices (e.g., vibrating motors), infrared (IR) transceiver, network interfaces, printers, scanners, sensors/sensor arrays and peripheral extensions (e.g., ambient light, GPS, gyroscopes, proximity, temperature, etc.), storage devices, transceivers (e.g., cellular, GPS, etc.), video devices (e.g., goggles, monitors, etc.), video sources, visors, and/or the like. Peripheral devices often include types of input devices (e.g., cameras).

User input devices 1811 often are a type of peripheral device 512 (see above) and may include: card readers, dongles, finger print readers, gloves, graphics tablets, joysticks, keyboards, microphones, mouse (mice), remote controls, security/biometric devices (e.g., fingerprint reader, iris reader, retina reader, etc.), touch screens (e.g., capacitive, resistive, etc.), trackballs, trackpads, styluses, and/or the like.

It should be noted that although user input devices and peripheral devices may be employed, the MBR controller may be embodied as an embedded, dedicated, and/or monitor-less (i.e., headless) device, wherein access would be provided over a network interface connection.

Cryptographic units such as, but not limited to, microcontrollers, processors 1826, interfaces 1827, and/or devices 1828 may be attached, and/or communicate with the MBR controller. A MC68HC16 microcontroller, manufactured by Motorola, Inc.®, may be used for and/or within cryptographic units. The MC68HC16 microcontroller utilizes a 16-bit multiply-and-accumulate instruction in the 16 MHz configuration and requires less than one second to perform a 512-bit RSA private key operation. Cryptographic units support the authentication of communications from interacting agents, as well as allowing for anonymous transactions. Cryptographic units may also be configured as part of the CPU. Equivalent microcontrollers and/or processors may also be used. Other specialized cryptographic processors include: Broadcom's® CryptoNetX and other Security Processors; nCipher's® nShield; SafeNet's® Luna PCI (e.g., 7100) series; Semaphore Communications'® 40 MHz Roadrunner 184; Sun's® Cryptographic Accelerators (e.g., Accelerator 6000 PCIe Board, Accelerator 500 Daughtercard); Via Nano® Processor (e.g., L2100, L2200, U2400) line, which is capable of performing 500+MB/s of cryptographic instructions; VLSI Technology's® 33 MHz 6868; and/or the like.

Memory

Generally, any mechanization and/or embodiment allowing a processor to affect the storage and/or retrieval of information is regarded as memory 1829. However, memory is a fungible technology and resource, thus, any number of memory embodiments may be employed in lieu of or in concert with one another. It is to be understood that the MBR controller and/or a computer systemization may employ various forms of memory 1829. For example, a computer systemization may be configured wherein the operation of on-chip CPU memory (e.g., registers), RAM, ROM, and any other storage devices are provided by a paper punch tape or paper punch card mechanism; however, such an embodiment would result in an extremely slow rate of operation. In one configuration, memory 1829 will include ROM 1806, RAM 1805, and a storage device 1814. A storage device 1814 may be any various computer system storage. Storage devices may include: an array of devices (e.g., Redundant Array of Independent Disks (RAID)); a drum; a (fixed and/or removable) magnetic disk drive; a magneto-optical drive; an optical drive (i.e., Blueray, CD ROM/RAM/Recordable (R)/ReWritable (RW), DVD R/RW, HD DVD R/RW etc.); RAM drives; solid state memory devices (USB memory, solid state drives (SSD), etc.); other processor-readable storage mediums; and/or other devices of the like. Thus, a computer systemization generally requires and makes use of memory.

Component Collection

The memory 1829 may contain a collection of program and/or database components and/or data such as, but not limited to: operating system component(s) 1815 (operating system); information server component(s) 1816 (information server); user interface component(s) 1817 (user interface); Web browser component(s) 1818 (Web browser); database(s) 1819; mail server component(s) 1821; mail client component(s) 1822; cryptographic server component(s) 1820 (cryptographic server); the MBR component(s) 1835; and/or the like (i.e., collectively a component collection). These components may be stored and accessed from the storage devices and/or from storage devices accessible through an interface bus. Although unconventional program components such as those in the component collection may be stored in a local storage device 1814, they may also be loaded and/or stored in memory such as: peripheral devices, RAM, remote storage facilities through a communications network, ROM, various forms of memory, and/or the like.

Operating System

The operating system component 1815 is an executable program component facilitating the operation of the MBR controller. The operating system may facilitate access of I/O, network interfaces, peripheral devices, storage devices, and/or the like. The operating system may be a highly fault tolerant, scalable, and secure system such as: Apple's Macintosh OS X (Server) and macOS®; AT&T Plan 9®; Be OS®; Blackberry's QNX®; Google's Chrome®; Microsoft's Windows® 7/8/10; Unix and Unix-like system distributions (such as AT&T's UNIX®; Berkley Software Distribution (BSD)® variations such as FreeBSD®, NetBSD, OpenBSD, and/or the like; Linux distributions such as Red Hat, Ubuntu, and/or the like); and/or the like operating systems. However, more limited and/or less secure operating systems also may be employed such as Apple Macintosh OS® (i.e., versions 1-9), IBM OS/2®, Microsoft DOS®, Microsoft Windows 2000/2003/3.1/95/98/CE/Millenium/Mobile/NT/Vista/XP (Server)®, Palm OS®, and/or the like. Additionally, for robust mobile deployment applications, mobile operating systems may be used, such as: Apple's iOS®; China Operating System COS®; Google's Android®; Microsoft Windows RT/Phone®; Palm's WebOS®; Samsung/Intel's Tizen®; and/or the like. An operating system may communicate to and/or with other components in a component collection, including itself, and/or the like. Most frequently, the operating system communicates with other program components, user interfaces, and/or the like. For example, the operating system may contain, communicate, generate, obtain, and/or provide program component, system, user, and/or data communications, requests, and/or responses. The operating system, once executed by the CPU, may enable the interaction with communications networks, data, I/O, peripheral devices, program components, memory, user input devices, and/or the like. The operating system may provide communications protocols that allow the MBR controller to communicate with other entities through a communications network 1813. Various communication protocols may be used by the MBR controller as a subcarrier transport mechanism for interaction, such as, but not limited to: multicast, TCP/IP, UDP, unicast, and/or the like.

Information Server

An information server component 1816 is a stored program component that is executed by a CPU. The information server may be a an Internet information server such as, but not limited to Apache Software Foundation's Apache, Microsoft's Internet Information Server, and/or the like. The information server may allow for the execution of program components through facilities such as Active Server Page (ASP), ActiveX, (ANSI) (Objective-) C (++), C # and/or .NET, Common Gateway Interface (CGI) scripts, dynamic (D) hypertext markup language (HTML), FLASH, Java, JavaScript, Practical Extraction Report Language (PERL), Hypertext Pre-Processor (PHP), pipes, Python, wireless application protocol (WAP), WebObjects®, and/or the like. The information server may support secure communications protocols such as, but not limited to, File Transfer Protocol (FTP); HyperText Transfer Protocol (HTTP); Secure Hypertext Transfer Protocol (HTTPS), Secure Socket Layer (SSL), messaging protocols (e.g., America Online (AOL) Instant Messenger (AIM)®, Application Exchange (APEX), ICQ, Internet Relay Chat (IRC), Microsoft Network (MSN) Messenger® Service, Presence and Instant Messaging Protocol (PRIM), Internet Engineering Task Force's® (IETF's) Session Initiation Protocol (SIP), SIP for Instant Messaging and Presence Leveraging Extensions (SIMPLE), open XML-based Extensible Messaging and Presence Protocol (XMPP) (i.e., Jabber® or Open Mobile Alliance's (OMA's) Instant Messaging and Presence Service (IMPS)), Yahoo! Instant Messenger® Service, and/or )(like. The information server provides results in the form of Web pages to Web browsers, and allows for the manipulated generation of the Web pages through interaction with other program components. After a Domain Name System (DNS) resolution portion of an HTTP request is resolved to a particular information server, the information server resolves requests for information at specified locations on the MBR controller based on the remainder of the HTTP request. For example, a request such as http://123.124.125.126/myInformation.html might have the IP portion of the request "123.124.125.126" resolved by a DNS server to an information server at that IP address; that information server might in turn further parse the http request for the "/myInformation.html" portion of the request and resolve it to a location in memory containing the information "myInformation.html." Additionally, other information serving protocols may be employed across various ports, e.g., FTP communications across port 21, and/or the like. An information server may communicate to and/or with other components in a component collection, including itself, and/or facilities of the like. Most frequently, the information server communicates with the MBR database 1819, operating systems, other program components, user interfaces, Web browsers, and/or the like.

Access to the MBR database may be achieved through a number of database bridge mechanisms such as through scripting languages as enumerated below (e.g., CGI) and through inter-application communication channels as enumerated below (e.g., CORBA, WebObjects, etc.). Any data requests through a Web browser are parsed through the bridge mechanism into appropriate grammars as required by the MBR. In one embodiment, the information server would provide a Web form accessible by a Web browser. Entries made into supplied fields in the Web form are tagged as having been entered into the particular fields, and parsed as such. The entered terms are then passed along with the field tags, which act to instruct the parser to generate queries directed to appropriate tables and/or fields. In one embodiment, the parser may generate queries in SQL by instantiating a search string with the proper join/select commands based on the tagged text entries, wherein the resulting command is provided over the bridge mechanism to the MBR as a query. Upon generating query results from the query, the results are passed over the bridge mechanism, and may be parsed for formatting and generation of a new results Web page by the bridge mechanism. Such a new results Web page is then provided to the information server, which may supply it to the requesting Web browser.

Also, an information server may contain, communicate, generate, obtain, and/or provide program component, system, user, and/or data communications, requests, and/or responses.

User Interface

Computer interfaces in some respects are similar to automobile operation interfaces. Automobile operation interface elements such as steering wheels, gearshifts, and speedometers facilitate the access, operation, and display of automobile resources, and status. Computer interaction interface elements such as buttons, check boxes, cursors, menus, scrollers, and windows (collectively referred to as widgets) similarly facilitate the access, capabilities, operation, and display of data and computer hardware and operating system resources, and status. Operation interfaces are called user interfaces. Graphical user interfaces (GUIs) such as the Apple's iOS®, Macintosh Operating System's Aqua®; IBM's OS/2®; Google's Chrome® (e.g., and other web-browser/cloud based client OSs); Microsoft's Windows® varied UIs 2000/2003/3.1/95/98/CE/Millenium/Mobile/NT/Vista/XP (Server) (i.e., Aero, Surface, etc.); Unix's X-Windows (e.g., which may include additional Unix graphic interface libraries and layers such as K Desktop Environment (KDE), mythTV and GNU Network Object Model Environment (GNOME)), web interface libraries (e.g., ActiveX, AJAX, (D)HTML, FLASH, Java, JavaScript, etc. interface libraries such as, but not limited to, Dojo, jQuery (UI), MooTools, Prototype, script.aculo.us, SWFObject, Yahoo! User Interface®, any of which may be used and) provide a baseline and means of accessing and displaying information graphically to users.

A user interface component 1817 is a stored program component that is executed by a CPU. The user interface may be a graphic user interface as provided by, with, and/or atop operating systems and/or operating environments such as already discussed. The user interface may allow for the display, execution, interaction, manipulation, and/or operation of program components and/or system facilities through textual and/or graphical facilities. The user interface provides a facility through which users may affect, interact, and/or operate a computer system. A user interface may communicate to and/or with other components in a component collection, including itself, and/or facilities of the like. Most frequently, the user interface communicates with operating systems, other program components, and/or the like. The user interface may contain, communicate, generate, obtain, and/or provide program component, system, user, and/or data communications, requests, and/or responses.

Web Browser

A Web browser component 1818 is a stored program component that is executed by a CPU. The Web browser may be a hypertext viewing application such as Apple's (mobile) Safari®, Google's Chrome®, Microsoft Internet Explorer®, Mozilla's Firefox®, Netscape Navigator®, and/or the like. Secure Web browsing may be supplied with 128 bit (or greater) encryption by way of HTTPS, SSL, and/or the like. Web browsers allowing for the execution of program components through facilities such as ActiveX, AJAX, (D)HTML, FLASH, Java, JavaScript, web browser plug-in APIs (e.g., FireFox®, Safari® Plug-in, and/or the like APIs), and/or the like. Web browsers and like information access tools may be integrated into PDAs, cellular telephones, and/or other mobile devices. A Web browser may communicate to and/or with other components in a component collection, including itself, and/or facilities of the like. Most frequently, the Web browser communicates with information servers, operating systems, integrated program components (e.g., plug-ins), and/or the like; e.g., it may contain, communicate, generate, obtain, and/or provide program component, system, user, and/or data communications, requests, and/or responses. Also, in place of a Web browser and information server, a combined application may be developed to perform similar operations of both. The combined application would similarly affect the obtaining and the provision of information to users, user agents, and/or the like from the MBR enabled nodes. The combined application may be nugatory on systems employing Web browsers.

Mail Server

A mail server component 1821 is a stored program component that is executed by a CPU 1803. The mail server may be an Internet mail server such as, but not limited to: dovecot, Courier IMAP, Cyrus IMAP, Maildir, Microsoft Exchange, sendmail, and/or the like. The mail server may allow for the execution of program components through facilities such as ASP, ActiveX, (ANSI) (Objective-) C (++), C # and/or .NET, CGI scripts, Java, JavaScript, PERL, PHP, pipes, Python, WebObjects®, and/or the like. The mail server may support communications protocols such as, but not limited to: Internet message access protocol (IMAP), Messaging Application Programming Interface (MAPI)/Microsoft Exchange, post office protocol (POPS), simple mail transfer protocol (SMTP), and/or the like. The mail server can route, forward, and process incoming and outgoing mail messages that have been sent, relayed and/or otherwise traversing through and/or to the MBR. Alternatively, the mail server component may be distributed out to mail service providing entities such as Google's® cloud services (e.g., Gmail and notifications may alternatively be provided via messenger services such as AOL's Instant Messenger®, Apple's iMessage®, Google Messenger®, SnapChat®, etc.).

Access to the MBR mail may be achieved through a number of APIs offered by the individual Web server components and/or the operating system.

Also, a mail server may contain, communicate, generate, obtain, and/or provide program component, system, user, and/or data communications, requests, information, and/or responses.

Mail Client

A mail client component 1822 is a stored program component that is executed by a CPU 1803. The mail client may be a mail viewing application such as Apple Mail®, Microsoft Entourage®, Microsoft Outlook®, Microsoft Outlook Express®, Mozilla®, Thunderbird®, and/or the like. Mail clients may support a number of transfer protocols, such as: IMAP, Microsoft Exchange, POPS, SMTP, and/or the like. A mail client may communicate to and/or with other components in a component collection, including itself, and/or facilities of the like. Most frequently, the mail client communicates with mail servers, operating systems, other mail clients, and/or the like; e.g., it may contain, communicate, generate, obtain, and/or provide program component, system, user, and/or data communications, requests, information, and/or responses. Generally, the mail client provides a facility to compose and transmit electronic mail messages.

Cryptographic Server

A cryptographic server component 1820 is a stored program component that is executed by a CPU 1803, cryptographic processor 1826, cryptographic processor interface 1827, cryptographic processor device 1828, and/or the like. Cryptographic processor interfaces will allow for expedition of encryption and/or decryption requests by the cryptographic component; however, the cryptographic component, alternatively, may run on a CPU. The cryptographic component allows for the encryption and/or decryption of provided data. The cryptographic component allows for both symmetric and asymmetric (e.g., Pretty Good Protection (PGP)) encryption and/or decryption. The cryptographic component may employ cryptographic techniques such as, but not limited to: digital certificates (e.g., X.509 authentication framework), digital signatures, dual signatures, enveloping, password access protection, public key management, and/or the like. The cryptographic component will facilitate numerous (encryption and/or decryption) security protocols such as, but not limited to: checksum, Data Encryption Standard (DES), Elliptical Curve Encryption (ECC), International Data Encryption Algorithm (IDEA), Message Digest 5 (MD5, which is a one way hash operation), passwords, Rivest Cipher (RC5), Rijndael, RSA (which is an Internet encryption and authentication system that uses an algorithm developed in 1977 by Ron Rivest, Adi Shamir, and Leonard Adleman), Secure Hash Algorithm (SHA), Secure Socket Layer (SSL), Secure Hypertext Transfer Protocol (HTTPS), Transport Layer Security (TLS), and/or the like. Employing such encryption security protocols, the MBR may encrypt all incoming and/or outgoing communications and may serve as node within a virtual private network (VPN) with a wider communications network. The cryptographic component facilitates the process of "security authorization" whereby access to a resource is inhibited by a security protocol wherein the cryptographic component effects authorized access to the secured resource. In addition, the cryptographic component may provide unique identifiers of content, e.g., employing and MD5 hash to obtain a unique signature for an digital audio file. A cryptographic component may communicate to and/or with other components in a component collection, including itself, and/or facilities of the like. The cryptographic component supports encryption schemes allowing for the secure transmission of information across a communications network to allow the MBR component to engage in secure transactions if so desired. The cryptographic component facilitates the secure accessing of resources on the MBR and facilitates the access of secured resources on remote systems; i.e., it may act as a client and/or server of secured resources. Most frequently, the cryptographic component communicates with information servers, operating systems, other program components, and/or the like. The cryptographic component may contain, communicate, generate, obtain, and/or provide program component, system, user, and/or data communications, requests, and/or responses.

The MBR Database

The MBR database component 1819 may be embodied in a database and its stored data. The database is a stored program component, which is executed by the CPU; the stored program component portion configuring the CPU to process the stored data. The database may be a fault tolerant, relational, scalable, secure database such as MySQL®, Oracle®, Sybase®, etc. may be used. Additionally, optimized fast memory and distributed databases such as IBM's Netezza®, MongoDB's MongoDB®, opensource Hadoop®, opensource VoltDB, SAP's Hana®, etc. Relational databases are an extension of a flat file. Relational databases consist of a series of related tables. The tables are interconnected via a key field. Use of the key field allows the combination of the tables by indexing against the key field; i.e., the key fields act as dimensional pivot points for combining information from various tables. Relationships generally identify links maintained between tables by matching primary keys. Primary keys represent fields that uniquely identify the rows of a table in a relational database. Alternative key fields may be used from any of the fields having unique value sets, and in some alternatives, even non-unique values in combinations with other fields. More precisely, they uniquely identify rows of a table on the "one" side of a one-to-many relationship.

Alternatively, the MBR database may be implemented using various other data-structures, such as an array, hash, (linked) list, struct, structured text file (e.g., XML), table, and/or the like. Such data-structures may be stored in memory and/or in (structured) files. In another alternative, an object-oriented database may be used, such as Frontier™, ObjectStore, Poet, Zope, and/or the like. Object databases can include a number of object collections that are grouped and/or linked together by common attributes; they may be related to other object collections by some common attributes. Object-oriented databases perform similarly to relational databases with the exception that objects are not just pieces of data but may have other types of capabilities encapsulated within a given object. If the MBR database is implemented as a data-structure, the use of the MBR database 1819 may be integrated into another component such as the MBR component 1835. Also, the database may be implemented as a mix of data structures, objects, and relational structures. Databases may be consolidated and/or distributed in countless variations (e.g., see Distributed MBR below). Portions of databases, e.g., tables, may be exported and/or imported and thus decentralized and/or integrated.

In one embodiment, the database component 1819 includes several tables 1819*a-m*:

An accounts table 1819*a* includes fields such as, but not limited to: an accountID, accountOwnerID, accountContactID, asseaDs, deviceIDs, paymentIDs, transactionIDs, userIDs, accountType (e.g., agent, entity (e.g., corporate, non-profit, partnership, etc.), individual, etc.), accountCreationDate, accountUpdateDate, accountName, accountNumber, routingNumber, linkWalletsID, accountPrioritAccaountRatio, accountAddress, accountState, accountZIPcode, accountCountry, accountEmail, accountPhone, accountAuthKey, accountIPaddress, accountURLAccessCode, accountPortNo, accountAuthorizationCode, accountAccessPrivileges, accountPreferences, accountRestrictions, and/or the like;

A users table 1819*b* includes fields such as, but not limited to: a userID, userSSN, taxID, userContactID, accountID, assetIDs, deviceIDs, paymentIDs, transactionIDs, userType (e.g., agent, entity (e.g., corporate, non-profit, partnership, etc.), individual, etc.), namePrefix, firstName, middleName, lastName, nameSuffix, DateOfBirth, userAge, userName, userEmail, userSocialAccountID, contactType, contactRelationship, userPhone, userAddress, userCity, userState, userZIPCode, userCountry, userAuthorizationCode, userAccessPrivilges, userPreferences, userRestrictions, and/or the like (the user table may support and/or track multiple entity accounts on a MBR);

An devices table 1819*c* includes fields such as, but not limited to: deviceID, sensorIDs, accountID, assetIDs, paymentIDs, deviceType, deviceName, deviceManufacturer, deviceModel, deviceVersion, deviceSerialNo, deviceIPaddress, deviceMACaddress, device_ECID, deviceUUID, deviceLocation, deviceCertificate, deviceOS, appIDs, deviceResources, deviceVersion, authKey, deviceSecureKey, walletAppInstalledFlag, deviceAccessPrivileges, devicePreferences, deviceRestrictions, hardware_config, software_config, storage_location, sensor_value, pin_reading, data_length, channel_requirement, sensor_name, sensor_model_no, sensor_manufacturer, sensor_type, sensor_serial_number, sensor_power_requirement, device_power_requirement, location, sensor_associated_tool, sensor_dimensions, device_dimensions, sensor_communications_type, device_communications_type, power_percentage, power_condition, temperature_setting, speed_adjust, hold_duration, part_actuation, and/or the like. Device table may, in some embodiments, include fields corresponding to one or more Bluetooth profiles, such as those published at https://www.bluetooth.org/en-us/specification/adopted-specifications, and/or other device specifications, and/or the like;

An apps table 1819*d* includes fields such as, but not limited to: appID, appName, appType, appDependencies, accountID, deviceIDs, transactionID, userID, appStoreAuthKey, appStoreAccountID, appStoreIPaddress, appStoreURLaccessCode, appStorePortNo, appAccessPrivileges, appPreferences, app Restrictions, portNum, access_API_call, linked_wallets_list, and/or the like;

An assets table 1819*e* includes fields such as, but not limited to: assetID, accountID, userID, distributorAccountID, distributorPaymentID, distributorOnwerID, assetOwnerID, assetType, assetSourceDeviceID, assetSourceDeviceType, assetSourceDeviceName, assetSourceDistributionChannelID, assetSourceDistributionChannelType, assetSourceDistributionChannelName, assetTargetChannelID, assetTargetChannelType, assetTargetChannelName, assetName, assetSeriesName, assetSeriesSeason, assetSeriesEpisode, assetCode, assetQuantity, assetCost, assetPrice, assetValue, assetManufactuer, assetModelNo, assetSerialNo, assetLocation, assetAddress, assetState, assetZIPcode, assetState, assetCountry, assetEmail, assetIPaddress, assetURLaccessCode, assetOwnerAccountID, subscriptionIDs, assetAuthroizationCode, assetAccessPrivileges, assetPreferences, assetRestrictions, assetAPI, assetAPIconnectionAddress, and/or the like;

A payments table 1819*f* includes fields such as, but not limited to: paymentID, accountID, userID, couponID, couponValue, couponConditions, couponExpiration, paymentType, paymentAccountNo, paymentAccountName, paymentAccoun tAuthorizationCodes, paymentExpirationDate, paymentCCV, paymentRoutingNo, paymentRoutingType, paymentAddress, paymentState, paymentZIPcode, paymentCountry, paymentEmail, paymentAuthKey, paymentIPaddress, paymentURLaccessCode, paymentPortNo, paymentAccessPrivileges, paymentPreferences, payementRestrictions, and/or the like;

An transactions table 1819*g* includes fields such as, but not limited to: transactionID, accountID, assetIDs, deviceIDs, paymentIDs, transactionIDs, userID, merchantID, transactionType, transactionDate, transactionTime, transactionAmount, transactionQuantity, transactionDetails, productsList, productType, productTitle, productsSummary, productParamsList, transactionNo, transactionAccessPrivileges, transactionPreferences, transactionRestrictions, merchantAuthKey, merchantAuthCode, and/or the like;

An merchants table **1819*h*** includes fields such as, but not limited to: merchantID, merchantTaxID, merchanteName, merchantContactUserID, accountID, issuerID, acquirerID, merchantEmail, merchantAddress, merchantState, merchantZIPcode, merchantCountry, merchantAuthKey, merchantIPaddress, portNum, merchantURLaccessCode, merchantPortNo, merchantAccessPrivileges, merchantPreferences, merchantRestrictions, and/or the like;

An ads table **1819*i*** includes fields such as, but not limited to: adID, advertiserID, adMerchantID, adNetworkID, adName, adTags, advertiserName, adSponsor, adTime, adGeo, adAttributes, adFormat, adProduct, adText, adMedia, adMediaID, adChannelID, adTagTime, adAudioSignature, adHash, adTemplateID, adTemplateData, adSourceID, adSourceName, adSourceServerIP, adSourceURL, adSourceSecurityProtocol, adSourceFTP, adAuthKey, adAccessPrivileges, adPreferences, adRestrictions, adNetworkXchangeID, adNetworkXchangeName, adNetworkXchangeCost, adNetworkXchangeMetricType (e.g., CPA, CPC, CPM, CTR, etc.), adNetworkXchangeMetricValue, adNetworkXchangeServer, adNetworkXchangePortNumber, publisherID, publisherAddress, publisherURL, publisherTag, publisherIndustry, publisherName, publisherDescription, siteDomain, siteURL, siteContent, siteTag, siteContext, siteImpression, siteVisits, siteHeadline, sitePage, siteAdPrice, sitePlacement, sitePosition, bidID, bidExchange, bidOS, bidTarget, bidTimestamp, bidPrice, bidImpressionID, bidType, bidScore, adType (e.g., mobile, desktop, wearable, largescreen, interstitial, etc.), assetID, merchantID, deviceID, userID, accountID, impressionID, impressionOS, impressionTimeStamp, impressionGeo, impressionAction, impressionType, impressionPublisherID, impressionPublisherURL, and/or the like;

A performance logs table **1819*j*** includes fields such as, but not limited to: deviceID, accountID, performanceCharacteristicsData, numberOfPasses, passID, dataPerPass, completionTimePerPass, usageIntensity, numberOfUsers, dataBlocksChangeFrequency, matchingUsageProfileIDs, and/or the like;

A usage profiles table **1819*k*** includes fields such as, but not limited to: usageProfileID, usageProfileDescriptor, deviceID, accountID, timeRange, dayOfWeek, numberOfUsers, usageProfileFinalizationConfigurationSettings, usageProfilePredictiveOptimizationConfigurationSettings, usageProfileLookaheadOptimizationConfigurationSettings, and/or the like;

A services table 18191 includes fields such as, but not limited to: serviceID, serviceName, serviceURL, and/or the like;

A mappings table **1819*m*** includes fields such as, but not limited to: accountID (e.g., of entity), userID, serviceID, serviceAuthenticationDataForUser, serviceBackupScheduleForUser, sourceNodeID, sourceNodeBackupVolume, targetNodeID, targetNodeReplicationVolume, and/or the like.

In one embodiment, the MBR database may interact with other database systems. For example, employing a distributed database system, queries and data access by search MBR component may treat the combination of the MBR database, an integrated data security layer database as a single database entity (e.g., see Distributed MBR below).

In one embodiment, user programs may contain various user interface primitives, which may serve to update the MBR. Also, various accounts may require custom database tables depending upon the environments and the types of clients the MBR may need to serve. It should be noted that any unique fields may be designated as a key field throughout. In an alternative embodiment, these tables have been decentralized into their own databases and their respective database controllers (i.e., individual database controllers for each of the above tables). Employing various data processing techniques, one may further distribute the databases over several computer systemizations and/or storage devices. Similarly, configurations of the decentralized database controllers may be varied by consolidating and/or distributing the various database components **1819*a-m***. The MBR may be configured to keep track of various settings, inputs, and parameters via database controllers.

The MBR database may communicate to and/or with other components in a component collection, including itself, and/or facilities of the like. Most frequently, the MBR database communicates with the MBR component, other program components, and/or the like. The database may contain, retain, and provide information regarding other nodes and data.

The MBRs

The MBR component 1835 is a stored program component that is executed by a CPU. In one embodiment, the MBR component incorporates any and/or all combinations of the aspects of the MBR that was discussed in the previous figures. As such, the MBR affects accessing, obtaining and the provision of information, services, transactions, and/or the like across various communications networks. The features and embodiments of the MBR discussed herein increase network efficiency by reducing data transfer requirements the use of more efficient data structures and mechanisms for their transfer and storage. As a consequence, more data may be transferred in less time, and latencies with regard to transactions, are also reduced. In many cases, such reduction in storage, transfer time, bandwidth requirements, latencies, etc., will reduce the capacity and structural infrastructure requirements to support the MBR's features and facilities, and in many cases reduce the costs, energy consumption/requirements, and extend the life of MBR's underlying infrastructure; this has the added benefit of making the MBR more reliable. Similarly, many of the features and mechanisms are designed to be easier for users to use and access, thereby broadening the audience that may enjoy/employ and exploit the feature sets of the MBR; such ease of use also helps to increase the reliability of the MBR. In addition, the feature sets include heightened security as noted via the Cryptographic components 1820, 1826, 1828 and throughout, making access to the features and data more reliable and secure The MBR transforms pairing request, replication data stream inputs, via MBR components (e.g., SP, SBP, SR, TR), into pairing response, replication confirmation outputs.

The MBR component enabling access of information between nodes may be developed by employing various development tools and languages such as, but not limited to: Apache® components, Assembly, ActiveX, binary executables, (ANSI) (Objective-) C (++), C # and/or .NET, database adapters, CGI scripts, Java, JavaScript, mapping tools, procedural and object oriented development tools, PERL, PHP, Python, shell scripts, SQL commands, web application server extensions, web development environments and libraries (e.g., Microsoft's® ActiveX; Adobe® AIR, FLEX & FLASH; AJAX; (D)HTML; Dojo, Java; JavaScript; jQuery(UI); MooTools; Prototype; script.aculo.us; Simple Object Access Protocol (SOAP); SWFObject; Yahoo!® User Interface; and/or the like), WebObjects®, and/or the like. In one embodiment, the MBR server employs a cryptographic server to encrypt and decrypt communications. The MBR component may communicate to and/or with other components in a component collection, including itself, and/or facilities of the like. Most frequently, the MBR component communicates with the MBR database, operating systems, other program components, and/or the like. The MBR may contain, communicate, generate, obtain, and/or provide program component, system, user, and/or data communications, requests, and/or responses.

Distributed MBRs

The structure and/or operation of any of the MBR node controller components may be combined, consolidated, and/or distributed in any number of ways to facilitate development and/or deployment. Similarly, the component collection may be combined in any number of ways to facilitate deployment and/or development. To accomplish this, one may integrate the components into a common code base or in a facility that can dynamically load the components on demand in an integrated fashion. As such a combination of hardware may be distributed within a location, within a region and/or globally where logical access to a controller may be abstracted as a singular node, yet where a multitude of private, semiprivate and publically accessible node controllers (e.g., via dispersed data centers) are coordinated to serve requests (e.g., providing private cloud, semi-private cloud, and public cloud computing resources) and allowing for the serving of such requests in discrete regions (e.g., isolated, local, regional, national, global cloud access).

The component collection may be consolidated and/or distributed in countless variations through various data processing and/or development techniques. Multiple instances of any one of the program components in the program component collection may be instantiated on a single node, and/or across numerous nodes to improve performance through load-balancing and/or data-processing techniques. Furthermore, single instances may also be distributed across multiple controllers and/or storage devices; e.g., databases. All program component instances and controllers working in concert may do so through various data processing communication techniques.

The configuration of the MBR controller will depend on the context of system deployment. Factors such as, but not limited to, the budget, capacity, location, and/or use of the underlying hardware resources may affect deployment requirements and configuration. Regardless of if the configuration results in more consolidated and/or integrated program components, results in a more distributed series of program components, and/or results in some combination between a consolidated and distributed configuration, data may be communicated, obtained, and/or provided. Instances of components consolidated into a common code base from the program component collection may communicate, obtain, and/or provide data. This may be accomplished through intra-application data processing communication techniques such as, but not limited to: data referencing (e.g., pointers), internal messaging, object instance variable communication, shared memory space, variable passing, and/or the like. For example, cloud services such as Amazon Data Services®, Microsoft Azure®, Hewlett Packard Helion®, IBM® Cloud services allow for MBR controller and/or MBR component collections to be hosted in full or partially for varying degrees of scale.

If component collection components are discrete, separate, and/or external to one another, then communicating, obtaining, and/or providing data with and/or to other component components may be accomplished through inter-application data processing communication techniques such as, but not limited to: Application Program Interfaces (API) information passage; (distributed) Component Object Model ((D)COM), (Distributed) Object Linking and Embedding ((D)OLE), and/or the like), Common Object Request Broker Architecture (CORBA), Jini local and remote application program interfaces, JavaScript Object Notation (JSON), Remote Method Invocation (RMI), SOAP, process pipes, shared files, and/or the like. Messages sent between discrete component components for inter-application communication or within memory spaces of a singular component for intra-application communication may be facilitated through the creation and parsing of a grammar A grammar may be developed by using development tools such as lex, yacc, XML, and/or the like, which allow for grammar generation and parsing capabilities, which in turn may form the basis of communication messages within and between components.

For example, a grammar may be arranged to recognize the tokens of an HTTP post command, e.g.:

w3c-post http:// . . . Value1 where Value1 is discerned as being a parameter because “http://” is part of the grammar syntax, and what follows is considered part of the post value. Similarly, with such a grammar, a variable “Value1” may be inserted into an “http://” post command and then sent. The grammar syntax itself may be presented as structured data that is interpreted and/or otherwise used to generate the parsing mechanism (e.g., a syntax description text file as processed by lex, yacc, etc.). Also, once the parsing mechanism is generated and/or instantiated, it itself may process and/or parse structured data such as, but not limited to: character (e.g., tab) delineated text, HTML, structured text streams, XML, and/or the like structured data. In another embodiment, inter-application data processing protocols themselves may have integrated parsers (e.g., JSON, SOAP, and/or like parsers) that may be employed to parse (e.g., communications) data. Further, the parsing grammar may be used beyond message parsing, but may also be used to parse: databases, data collections, data stores, structured data, and/or the like. Again, the desired configuration will depend upon the context, environment, and requirements of system deployment.

For example, in some implementations, the MBR controller may be executing a PHP script implementing a Secure Sockets Layer (“SSL”) socket server via the information server, which listens to incoming communications on a server port to which a client may send data, e.g., data encoded in JSON format. Upon identifying an incoming communication, the PHP script may read the incoming message from the client device, parse the received JSON-encoded text data to extract information from the JSON-encoded text data into PHP script variables, and store the data (e.g., client identifying information, etc.) and/or extracted information in a relational database accessible using the Structured Query Language (“SQL”). An exemplary listing, written substantially in the form of PHP/SQL commands, to accept JSON-encoded input data from a client device via a SSL connection, parse the data to extract variables, and store the data to a database, is provided below:

```
<?PHP
header('Content-Type: text/plain');
// set ip address and port to listen to for incoming data
$address = '192.168.0.100';
$port = 255;
// create a server-side SSL socket, listen for/accept incoming
communication
```

-continued

```
$sock = socket_create(AF_INET, SOCK_STREAM, 0);
socket_bind($sock, $address, $port) or die('Could not bind to address');
socket_listen($sock);
$client = socket_accept($sock);
// read input data from client device in 1024 byte blocks until end of
message
do {
    $input = "";
    $input = socket_read($client, 1024);
    $data .= $input;
} while($input != "");
// parse data to extract variables
$obj = json_decode($data, true);
// store input data in a database
mysql_connect("201.408.185.132",$DBserver,$password); //
access database server
mysql_select("CLIENT_DB.SQL"); // select database to append
mysql_query("INSERT INTO UserTable (transmission)
VALUES ($data)"); // add data to UserTable table in a CLIENT database
mysql_close("CLIENT_DB.SQL"); // close connection to database
?>
```

Also, the following resources may be used to provide example embodiments regarding SOAP parser implementation:

http://www.xay.com/perl/site/lib/SOAP/Parser.html
http://publib.boulder.ibm.com/infocenter/tivihelp/v2r1/index.jsp?topic=/com.ibm.IBMDI.doc/referenceguide295.htm and other parser implementations:

http://publib.boulder.ibm.com/infocenter/tivihelp/v2r1/index.jsp?topic=/com.ibm.IBMDI.doc/referenceguide259.htm all of which are hereby expressly incorporated by reference.

Additional embodiments may include:

1. A backup apparatus, comprising:
a memory;
a component collection in the memory, including:
a backup processing component, and
a finalization settings determining component;
a processor disposed in communication with the memory, and configured to issue a plurality of processing instructions from the component collection stored in the memory,
wherein the processor issues instructions from the backup processing component, stored in the memory, to:
(a) designate, via at least one processor, a set of one or more blocks to be copied from a source volume to a target volume;
(b) copy, via at least one processor, the designated set of one or more blocks from the source volume to the target volume while an operating system is configured to write to the source volume;
(c) identify, via at least one processor, blocks of the source volume that were written to by the operating system while the operating system was configured to write to the source volume during element (b);
(d) analyze, via at least one processor, finalization settings to determine whether to enter a copy-on-write mode, when one or more blocks were identified in element (c);
(d)(i) change, via at least one processor, the designated set of one or more blocks to be copied from the source volume to the target volume to include at least one of the identified one or more blocks and repeat elements (b), (c), and (d), when it is determined that the copy-on-write mode should not be entered;
(d)(ii) instruct, via at least one processor, the operating system to enter the copy-on-write mode and bring the target volume into a state consistent with a state of the source volume at the time the copy-on-write mode was entered, when it is determined that the copy-on-write mode should be entered;
wherein the processor issues instructions from the finalization settings determining component, stored in the memory, to:
obtain, via at least one processor, a finalization settings request from the backup processing component; and
provide, via at least one processor, the finalization settings to the backup processing component.

2. The apparatus of embodiment 1, wherein the copy-on-write mode is a mode in which contents of a block of the source volume that is targeted by a write instruction from the operating system are preserved in a copy-on-write file before the write instruction modifies the contents of the targeted block.

3. The apparatus of embodiment 1, further, comprising:
the processor issues instructions from the backup processing component, stored in the memory, to:
log, via at least one processor, backup performance characteristics.

4. The apparatus of embodiment 3, wherein the backup performance characteristics include: number of passes through elements (b), (c), and (d) until the copy-on-write mode is entered, amount of data stored in each pass, completion time for each pass.

5. The apparatus of embodiment 1, further, comprising:
the processor issues instructions from the finalization settings determining component, stored in the memory, to:
determine, via at least one processor, finalization configuration settings associated with the finalization settings request, wherein the finalization configuration settings specify a set of metrics utilized to determine whether to enter the copy-on-write mode, and a threshold value, for each metric in the set of metrics, that indicates whether a metric has been satisfied.

6. The apparatus of embodiment 5, wherein a threshold value is specified as a constant.

7. The apparatus of embodiment 5, wherein a threshold value is specified as a function or calculated parameter.

8. The apparatus of embodiment 7, further, comprising:
the processor issues instructions from the finalization settings determining component, stored in the memory, to:
determine, via at least one processor, a usage profile associated with the finalization settings request;
retrieve, via at least one processor, performance logs associated with the usage profile for the threshold value specified as a function or calculated parameter; and
evaluate, via at least one processor, the threshold value specified as a function or calculated parameter using the retrieved performance logs.

9. The apparatus of embodiment 5, wherein the finalization configuration settings further include a set of logical operators that specify how to evaluate a combination of metrics in the set of metrics to determine whether the finalization settings have been satisfied.

10. The apparatus of embodiment 5, wherein the set of metrics includes a block size metric that is satisfied when aggregate size of changed blocks in a pass through elements (b), (c), and (d) crosses a threshold value that is dynamically calculated based on either available bandwidth between the source volume and the target volume, or size of at least one of: the source volume or the target volume.

11. The apparatus of embodiment 5, wherein the set of metrics includes a number of passes metric that is satisfied when the number of passes through elements (b), (c), and (d) crosses a threshold value specified as a dynamic number calculated based on the average number of passes for a usage profile associated with the finalization settings request.

12. The apparatus of embodiment 5, wherein the set of metrics includes a delta data metric that is satisfied when the change in the amount of data copied between passes through elements (b), (c), and (d) reaches an asymptote.

13. The apparatus of embodiment 5, wherein the set of metrics includes a delta time metric that is satisfied when the change between passes through elements (b), (c), and (d) in the amount of time to complete a pass crosses a threshold value.

14. The apparatus of embodiment 5, wherein the set of metrics includes a pass completion time metric that is satisfied when pass completion time for pass through elements (b), (c), and (d) crosses a threshold value specified as a constant.

15. The apparatus of embodiment 5, wherein the set of metrics includes a resource intensity metric that is satisfied when resource load for pass through elements (b), (c), and (d) crosses a threshold value, wherein the resource load includes at least one of: processor utilization, disk utilization, network utilization, power utilization.

16. A processor-readable backup non-transient physical medium storing processor-executable components, the components, comprising:

a component collection stored in the medium, including:
a backup processing component, and
a finalization settings determining component;
wherein the backup processing component, stored in the medium, includes processor-issuable instructions to:
(a) designate, via at least one processor, a set of one or more blocks to be copied from a source volume to a target volume;
(b) copy, via at least one processor, the designated set of one or more blocks from the source volume to the target volume while an operating system is configured to write to the source volume;
(c) identify, via at least one processor, blocks of the source volume that were written to by the operating system while the operating system was configured to write to the source volume during element (b);
(d) analyze, via at least one processor, finalization settings to determine whether to enter a copy-on-write mode, when one or more blocks were identified in element (c);
(d)(i) change, via at least one processor, the designated set of one or more blocks to be copied from the source volume to the target volume to include at least one of the identified one or more blocks and repeat elements (b), (c), and (d), when it is determined that the copy-on-write mode should not be entered;
(d)(ii) instruct, via at least one processor, the operating system to enter the copy-on-write mode and bring the target volume into a state consistent with a state of the source volume at the time the copy-on-write mode was entered, when it is determined that the copy-on-write mode should be entered;
wherein the finalization settings determining component, stored in the medium, includes processor-issuable instructions to:
obtain, via at least one processor, a finalization settings request from the backup processing component; and
provide, via at least one processor, the finalization settings to the backup processing component.

17. The medium of embodiment 16, wherein the copy-on-write mode is a mode in which contents of a block of the source volume that is targeted by a write instruction from the operating system are preserved in a copy-on-write file before the write instruction modifies the contents of the targeted block.

18. The medium of embodiment 16, further, comprising:
the backup processing component, stored in the medium, includes processor-issuable instructions to:
log, via at least one processor, backup performance characteristics.

19. The medium of embodiment 18, wherein the backup performance characteristics include: number of passes through elements (b), (c), and (d) until the copy-on-write mode is entered, amount of data stored in each pass, completion time for each pass.

20. The medium of embodiment 16, further, comprising:
the finalization settings determining component, stored in the medium, includes processor-issuable instructions to:
determine, via at least one processor, finalization configuration settings associated with the finalization settings request, wherein the finalization configuration settings specify a set of metrics utilized to determine whether to enter the copy-on-write mode, and a threshold value, for each metric in the set of metrics, that indicates whether a metric has been satisfied.

21. The medium of embodiment 20, wherein a threshold value is specified as a constant.

22. The medium of embodiment 20, wherein a threshold value is specified as a function or calculated parameter.

23. The medium of embodiment 22, further, comprising:
the finalization settings determining component, stored in the medium, includes processor-issuable instructions to:
determine, via at least one processor, a usage profile associated with the finalization settings request;
retrieve, via at least one processor, performance logs associated with the usage profile for the threshold value specified as a function or calculated parameter; and
evaluate, via at least one processor, the threshold value specified as a function or calculated parameter using the retrieved performance logs.

24. The medium of embodiment 20, wherein the finalization configuration settings further include a set of logical operators that specify how to evaluate a combination of metrics in the set of metrics to determine whether the finalization settings have been satisfied.

25. The medium of embodiment 20, wherein the set of metrics includes a block size metric that is satisfied when aggregate size of changed blocks in a pass through elements (b), (c), and (d) crosses a threshold value that is dynamically calculated based on either available bandwidth between the source volume and the target volume, or size of at least one of: the source volume or the target volume.

26. The medium of embodiment 20, wherein the set of metrics includes a number of passes metric that is satisfied when the number of passes through elements (b), (c), and (d) crosses a threshold value specified as a dynamic number calculated based on the average number of passes for a usage profile associated with the finalization settings request.

27. The medium of embodiment 20, wherein the set of metrics includes a delta data metric that is satisfied when the change in the amount of data copied between passes through elements (b), (c), and (d) reaches an asymptote.

28. The medium of embodiment 20, wherein the set of metrics includes a delta time metric that is satisfied when the change between passes through elements (b), (c), and (d) in the amount of time to complete a pass crosses a threshold value.

29. The medium of embodiment 20, wherein the set of metrics includes a pass completion time metric that is satisfied when pass completion time for pass through elements (b), (c), and (d) crosses a threshold value specified as a constant.

30. The medium of embodiment 20, wherein the set of metrics includes a resource intensity metric that is satisfied when resource load for pass through elements (b), (c), and (d) crosses a threshold value, wherein the resource load includes at least one of: processor utilization, disk utilization, network utilization, power utilization.

31. A processor-implemented backup system, comprising:
  a backup processing component means, to:
    (a) designate, via at least one processor, a set of one or more blocks to be copied from a source volume to a target volume;
    (b) copy, via at least one processor, the designated set of one or more blocks from the source volume to the target volume while an operating system is configured to write to the source volume;
    (c) identify, via at least one processor, blocks of the source volume that were written to by the operating system while the operating system was configured to write to the source volume during element (b);
    (d) analyze, via at least one processor, finalization settings to determine whether to enter a copy-on-write mode, when one or more blocks were identified in element (c);
      (d)(i) change, via at least one processor, the designated set of one or more blocks to be copied from the source volume to the target volume to include at least one of the identified one or more blocks and repeat elements (b), (c), and (d), when it is determined that the copy-on-write mode should not be entered;
      (d)(ii) instruct, via at least one processor, the operating system to enter the copy-on-write mode and bring the target volume into a state consistent with a state of the source volume at the time the copy-on-write mode was entered, when it is determined that the copy-on-write mode should be entered;
  a finalization settings determining component means, to:
    obtain, via at least one processor, a finalization settings request from the backup processing component; and
    provide, via at least one processor, the finalization settings to the backup processing component.

32. The system of embodiment 31, wherein the copy-on-write mode is a mode in which contents of a block of the source volume that is targeted by a write instruction from the operating system are preserved in a copy-on-write file before the write instruction modifies the contents of the targeted block.

33. The system of embodiment 31, further, comprising:
  the backup processing component means, to:
    log, via at least one processor, backup performance characteristics.

34. The system of embodiment 33, wherein the backup performance characteristics include: number of passes through elements (b), (c), and (d) until the copy-on-write mode is entered, amount of data stored in each pass, completion time for each pass.

35. The system of embodiment 31, further, comprising:
  the finalization settings determining component means, to:
    determine, via at least one processor, finalization configuration settings associated with the finalization settings request, wherein the finalization configuration settings specify a set of metrics utilized to determine whether to enter the copy-on-write mode, and a threshold value, for each metric in the set of metrics, that indicates whether a metric has been satisfied.

36. The system of embodiment 35, wherein a threshold value is specified as a constant.

37. The system of embodiment 35, wherein a threshold value is specified as a function or calculated parameter.

38. The system of embodiment 37, further, comprising:
  the finalization settings determining component means, to:
    determine, via at least one processor, a usage profile associated with the finalization settings request;
    retrieve, via at least one processor, performance logs associated with the usage profile for the threshold value specified as a function or calculated parameter; and
    evaluate, via at least one processor, the threshold value specified as a function or calculated parameter using the retrieved performance logs.

39. The system of embodiment 35, wherein the finalization configuration settings further include a set of logical operators that specify how to evaluate a combination of metrics in the set of metrics to determine whether the finalization settings have been satisfied.

40. The system of embodiment 35, wherein the set of metrics includes a block size metric that is satisfied when aggregate size of changed blocks in a pass through elements (b), (c), and (d) crosses a threshold value that is dynamically calculated based on either available bandwidth between the source volume and the target volume, or size of at least one of: the source volume or the target volume.

41. The system of embodiment 35, wherein the set of metrics includes a number of passes metric that is satisfied when the number of passes through elements (b), (c), and (d) crosses a threshold value specified as a dynamic number calculated based on the average number of passes for a usage profile associated with the finalization settings request.

42. The system of embodiment 35, wherein the set of metrics includes a delta data metric that is satisfied when the change in the amount of data copied between passes through elements (b), (c), and (d) reaches an asymptote.

43. The system of embodiment 35, wherein the set of metrics includes a delta time metric that is satisfied when the change between passes through elements (b), (c), and (d) in the amount of time to complete a pass crosses a threshold value.

44. The system of embodiment 35, wherein the set of metrics includes a pass completion time metric that is satisfied when pass completion time for pass through elements (b), (c), and (d) crosses a threshold value specified as a constant.

45. The system of embodiment 35, wherein the set of metrics includes a resource intensity metric that is satisfied when resource load for pass through elements (b), (c), and (d) crosses a threshold value, wherein the resource load includes at least one of: processor utilization, disk utilization, network utilization, power utilization.

46. A processor-implemented backup method, comprising:
executing processor-implemented backup processing component instructions to:
(a) designate, via at least one processor, a set of one or more blocks to be copied from a source volume to a target volume;
(b) copy, via at least one processor, the designated set of one or more blocks from the source volume to the target volume while an operating system is configured to write to the source volume;
(c) identify, via at least one processor, blocks of the source volume that were written to by the operating system while the operating system was configured to write to the source volume during element (b);
(d) analyze, via at least one processor, finalization settings to determine whether to enter a copy-on-write mode, when one or more blocks were identified in element (c);
(d)(i) change, via at least one processor, the designated set of one or more blocks to be copied from the source volume to the target volume to include at least one of the identified one or more blocks and repeat elements (b), (c), and (d), when it is determined that the copy-on-write mode should not be entered;
(d)(ii) instruct, via at least one processor, the operating system to enter the copy-on-write mode and bring the target volume into a state consistent with a state of the source volume at the time the copy-on-write mode was entered, when it is determined that the copy-on-write mode should be entered;
executing processor-implemented finalization settings determining component instructions to:
obtain, via at least one processor, a finalization settings request from the backup processing component; and
provide, via at least one processor, the finalization settings to the backup processing component.

47. The method of embodiment 46, wherein the copy-on-write mode is a mode in which contents of a block of the source volume that is targeted by a write instruction from the operating system are preserved in a copy-on-write file before the write instruction modifies the contents of the targeted block.

48. The method of embodiment 46, further, comprising:
executing processor-implemented backup processing component instructions to:
log, via at least one processor, backup performance characteristics.

49. The method of embodiment 48, wherein the backup performance characteristics include: number of passes through elements (b), (c), and (d) until the copy-on-write mode is entered, amount of data stored in each pass, completion time for each pass.

50. The method of embodiment 46, further, comprising:
executing processor-implemented finalization settings determining component instructions to:
determine, via at least one processor, finalization configuration settings associated with the finalization settings request, wherein the finalization configuration settings specify a set of metrics utilized to determine whether to enter the copy-on-write mode, and a threshold value, for each metric in the set of metrics, that indicates whether a metric has been satisfied.

51. The method of embodiment 50, wherein a threshold value is specified as a constant.

52. The method of embodiment 50, wherein a threshold value is specified as a function or calculated parameter.

53. The method of embodiment 52, further, comprising:
executing processor-implemented finalization settings determining component instructions to:
determine, via at least one processor, a usage profile associated with the finalization settings request;
retrieve, via at least one processor, performance logs associated with the usage profile for the threshold value specified as a function or calculated parameter; and
evaluate, via at least one processor, the threshold value specified as a function or calculated parameter using the retrieved performance logs.

54. The method of embodiment 50, wherein the finalization configuration settings further include a set of logical operators that specify how to evaluate a combination of metrics in the set of metrics to determine whether the finalization settings have been satisfied.

55. The method of embodiment 50, wherein the set of metrics includes a block size metric that is satisfied when aggregate size of changed blocks in a pass through elements (b), (c), and (d) crosses a threshold value that is dynamically calculated based on either available bandwidth between the source volume and the target volume, or size of at least one of: the source volume or the target volume.

56. The method of embodiment 50, wherein the set of metrics includes a number of passes metric that is satisfied when the number of passes through elements (b), (c), and (d) crosses a threshold value specified as a dynamic number calculated based on the average number of passes for a usage profile associated with the finalization settings request.

57. The method of embodiment 50, wherein the set of metrics includes a delta data metric that is satisfied when the change in the amount of data copied between passes through elements (b), (c), and (d) reaches an asymptote.

58. The method of embodiment 50, wherein the set of metrics includes a delta time metric that is satisfied when the change between passes through elements (b), (c), and (d) in the amount of time to complete a pass crosses a threshold value.

59. The method of embodiment 50, wherein the set of metrics includes a pass completion time metric that is satisfied when pass completion time for pass through elements (b), (c), and (d) crosses a threshold value specified as a constant.

60. The method of embodiment 50, wherein the set of metrics includes a resource intensity metric that is satisfied when resource load for pass through elements (b), (c), and (d) crosses a threshold value, wherein the resource load includes at least one of: processor utilization, disk utilization, network utilization, power utilization.

101. A backup apparatus, comprising:

a memory;

a component collection in the memory, including:

a backup processing component;

a processor disposed in communication with the memory, and configured to issue a plurality of processing instructions from the component collection stored in the memory, wherein the processor issues instructions from the backup processing component, stored in the memory, to:

(a) designate, via at least one processor, a set of one or more blocks to be copied from a source volume to a target volume based on predictive optimization settings associated with a backup request;

(b) copy, via at least one processor, at least some of the designated set of one or more blocks from the source volume to the target volume based on lookahead optimization settings associated with the backup request, while an operating system is configured to write to the source volume;

(c) identify, via at least one processor, blocks of the source volume that were written to by the operating system while the operating system was configured to write to the source volume during element (b);

(d) determine, via at least one processor, whether to enter a copy-on-write mode, when one or more blocks were identified in element (c);

(d)(i) change, via at least one processor, the designated set of one or more blocks to be copied from the source volume to the target volume to include at least one of the identified one or more blocks based on the predictive optimization settings and repeat elements (b), (c), and (d), when it is determined that the copy-on-write mode should not be entered;

(d)(ii) instruct, via at least one processor, the operating system to enter the copy-on-write mode and bring the target volume into a state consistent with a state of the source volume at the time the copy-on-write mode was entered, when it is determined that the copy-on-write mode should be entered.

102. The apparatus of embodiment 101, further, comprising:

the processor issues instructions from the backup processing component, stored in the memory, to:

determine, via at least one processor, a usage profile associated with the backup request; and set, via at least one processor, the predictive optimization settings to settings corresponding to the usage profile.

103. The apparatus of embodiment 102, further, comprising:

the processor issues instructions from the backup processing component, stored in the memory, to:

retrieve, via at least one processor, performance logs associated with the usage profile; and determine, via at least one processor, an optimal predictive optimization settings combination based on analysis of the performance logs via a machine learning technique, wherein the predictive optimization settings are set to the optimal predictive optimization settings combination.

104. The apparatus of embodiment 101, wherein the predictive optimization settings specify that stable blocks criteria, which identify blocks on the source volume that are unlikely to change, are utilized to designate the set of one or more blocks to be copied.

105. The apparatus of embodiment 104, wherein stable blocks optimization settings specify a set of blocks classified as stable blocks, and wherein blocks other than the stable blocks are not designated in the set of one or more blocks to be copied for a specified number of passes through elements (b), (c), and (d).

106. The apparatus of embodiment 105, wherein the stable blocks include blocks that represent at least one of: the operating system, applications, user data.

107. The apparatus of embodiment 105, wherein the stable blocks include blocks classified as stable based on analysis of write history associated with blocks on the source volume via a machine learning technique.

108. The apparatus of embodiment 101, wherein the predictive optimization settings specify that busy blocks criteria, which identify blocks on the source volume that are likely to change frequently, are utilized to designate the set of one or more blocks to be copied.

109. The apparatus of embodiment 108, wherein busy blocks optimization settings specify a set of blocks classified as busy blocks, and wherein the busy blocks are not designated in the set of one or more blocks to be copied for a specified number of passes through elements (b), (c), and (d).

110. The apparatus of embodiment 109, wherein the busy blocks include blocks that represent at least one of: database entries, mail server files.

111. The apparatus of embodiment 109, wherein the busy blocks include blocks classified as busy based on analysis of write history associated with blocks on the source volume via a statistical technique.

112. The apparatus of embodiment 101, wherein the predictive optimization settings specify that historical change frequency criteria, which categorize blocks on the source volume into different frequency types based on analysis of write history, are utilized to designate the set of one or more blocks to be copied.

113. The apparatus of embodiment 112, wherein historical change frequency optimization settings specify the number of passes through elements (b), (c), and (d) during which blocks of each frequency type are not designated in the set of one or more blocks to be copied.

114. The apparatus of embodiment 101, further, comprising:

the processor issues instructions from the backup processing component, stored in the memory, to:

determine, via at least one processor, a usage profile associated with the backup request; and set, via at least one processor, the lookahead optimization settings to settings corresponding to the usage profile.

115. The apparatus of embodiment 114, further, comprising:

the processor issues instructions from the backup processing component, stored in the memory, to:

retrieve, via at least one processor, performance logs associated with the usage profile; and determine, via at least one processor, an optimal lookahead optimization settings combination based on analysis of the performance logs via a statistical technique, wherein the lookahead optimization settings are set to the optimal lookahead optimization settings combination.

116. The apparatus of embodiment 101, wherein the lookahead optimization settings specify that accelerated copy optimization is utilized to configure copying of the designated set of one or more blocks.

117. The apparatus of embodiment 116, wherein accelerated copy optimization settings specify that blocks on the source volume that changed forward of a current position and that had not been marked as changed blocks at the start of a current pass through elements (b), (c), and (d) are added to the set of one or more blocks to copy.

118. The apparatus of embodiment 117, wherein the accelerated copy optimization settings specify a schedule that determines when the accelerated copy optimization is utilized.

119. The apparatus of embodiment 101, wherein the lookahead optimization settings specify that delayed copy optimization is utilized to configure copying of the designated set of one or more blocks.

120. The apparatus of embodiment 119, wherein delayed copy optimization settings specify that blocks on the source volume that changed forward of a current position and that had been marked as changed blocks at the start of a current pass through elements (b), (c), and (d) are removed from the set of one or more blocks to copy.

121. A processor-readable backup non-transient physical medium storing processor-executable components, the components, comprising:

a component collection stored in the medium, including:
a backup processing component;
wherein the backup processing component, stored in the medium, includes processor-issuable instructions to:
(a) designate, via at least one processor, a set of one or more blocks to be copied from a source volume to a target volume based on predictive optimization settings associated with a backup request;
(b) copy, via at least one processor, at least some of the designated set of one or more blocks from the source volume to the target volume based on lookahead optimization settings associated with the backup request, while an operating system is configured to write to the source volume;
(c) identify, via at least one processor, blocks of the source volume that were written to by the operating system while the operating system was configured to write to the source volume during element (b);
(d) determine, via at least one processor, whether to enter a copy-on-write mode, when one or more blocks were identified in element (c);
(d)(i) change, via at least one processor, the designated set of one or more blocks to be copied from the source volume to the target volume to include at least one of the identified one or more blocks based on the predictive optimization settings and repeat elements (b), (c), and (d), when it is determined that the copy-on-write mode should not be entered;
(d)(ii) instruct, via at least one processor, the operating system to enter the copy-on-write mode and bring the target volume into a state consistent with a state of the source volume at the time the copy-on-write mode was entered, when it is determined that the copy-on-write mode should be entered.

122. The medium of embodiment 121, further, comprising: the backup processing component, stored in the medium, includes processor-issuable instructions to:
determine, via at least one processor, a usage profile associated with the backup request; and
set, via at least one processor, the predictive optimization settings to settings corresponding to the usage profile.

123. The medium of embodiment 122, further, comprising: the backup processing component, stored in the medium, includes processor-issuable instructions to:
retrieve, via at least one processor, performance logs associated with the usage profile; and
determine, via at least one processor, an optimal predictive optimization settings combination based on analysis of the performance logs via a machine learning technique,
wherein the predictive optimization settings are set to the optimal predictive optimization settings combination.

124. The medium of embodiment 121, wherein the predictive optimization settings specify that stable blocks criteria, which identify blocks on the source volume that are unlikely to change, are utilized to designate the set of one or more blocks to be copied.

125. The medium of embodiment 124, wherein stable blocks optimization settings specify a set of blocks classified as stable blocks, and wherein blocks other than the stable blocks are not designated in the set of one or more blocks to be copied for a specified number of passes through elements (b), (c), and (d).

126. The medium of embodiment 125, wherein the stable blocks include blocks that represent at least one of: the operating system, applications, user data.

127. The medium of embodiment 125, wherein the stable blocks include blocks classified as stable based on analysis of write history associated with blocks on the source volume via a machine learning technique.

128. The medium of embodiment 121, wherein the predictive optimization settings specify that busy blocks criteria, which identify blocks on the source volume that are likely to change frequently, are utilized to designate the set of one or more blocks to be copied.

129. The medium of embodiment 128, wherein busy blocks optimization settings specify a set of blocks classified as busy blocks, and wherein the busy blocks are not designated in the set of one or more blocks to be copied for a specified number of passes through elements (b), (c), and (d).

130. The medium of embodiment 129, wherein the busy blocks include blocks that represent at least one of: database entries, mail server files.

131. The medium of embodiment 129, wherein the busy blocks include blocks classified as busy based on analysis of write history associated with blocks on the source volume via a statistical technique.

132. The medium of embodiment 121, wherein the predictive optimization settings specify that historical change frequency criteria, which categorize blocks on the source volume into different frequency types based on analysis of write history, are utilized to designate the set of one or more blocks to be copied.

133. The medium of embodiment 132, wherein historical change frequency optimization settings specify the number of passes through elements (b), (c), and (d) during which blocks of each frequency type are not designated in the set of one or more blocks to be copied.

134. The medium of embodiment 121, further, comprising: the backup processing component, stored in the medium, includes processor-issuable instructions to:
determine, via at least one processor, a usage profile associated with the backup request; and
set, via at least one processor, the lookahead optimization settings to settings corresponding to the usage profile.

135. The medium of embodiment 134, further, comprising: the backup processing component, stored in the medium, includes processor-issuable instructions to:
retrieve, via at least one processor, performance logs associated with the usage profile; and
determine, via at least one processor, an optimal lookahead optimization settings combination based on analysis of the performance logs via a statistical technique,
wherein the lookahead optimization settings are set to the optimal lookahead optimization settings combination.

136. The medium of embodiment 121, wherein the lookahead optimization settings specify that accelerated copy optimization is utilized to configure copying of the designated set of one or more blocks.

137. The medium of embodiment 136, wherein accelerated copy optimization settings specify that blocks on the source volume that changed forward of a current position and that had not been marked as changed blocks at the start of a current pass through elements (b), (c), and (d) are added to the set of one or more blocks to copy.

138. The medium of embodiment 137, wherein the accelerated copy optimization settings specify a schedule that determines when the accelerated copy optimization is utilized.

139. The medium of embodiment 121, wherein the lookahead optimization settings specify that delayed copy optimization is utilized to configure copying of the designated set of one or more blocks.

140. The medium of embodiment 139, wherein delayed copy optimization settings specify that blocks on the source volume that changed forward of a current position and that had been marked as changed blocks at the start of a current pass through elements (b), (c), and (d) are removed from the set of one or more blocks to copy.

141. A processor-implemented backup system, comprising: a backup processing component means, to:
(a) designate, via at least one processor, a set of one or more blocks to be copied from a source volume to a target volume based on predictive optimization settings associated with a backup request;
(b) copy, via at least one processor, at least some of the designated set of one or more blocks from the source volume to the target volume based on lookahead optimization settings associated with the backup request, while an operating system is configured to write to the source volume;
(c) identify, via at least one processor, blocks of the source volume that were written to by the operating system while the operating system was configured to write to the source volume during element (b);
(d) determine, via at least one processor, whether to enter a copy-on-write mode, when one or more blocks were identified in element (c);
(d)(i) change, via at least one processor, the designated set of one or more blocks to be copied from the source volume to the target volume to include at least one of the identified one or more blocks based on the predictive optimization settings and repeat elements (b), (c), and (d), when it is determined that the copy-on-write mode should not be entered;
(d)(ii) instruct, via at least one processor, the operating system to enter the copy-on-write mode and bring the target volume into a state consistent with a state of the source volume at the time the copy-on-write mode was entered, when it is determined that the copy-on-write mode should be entered.

142. The system of embodiment 141, further, comprising: the backup processing component means, to:
determine, via at least one processor, a usage profile associated with the backup request; and
set, via at least one processor, the predictive optimization settings to settings corresponding to the usage profile.

143. The system of embodiment 142, further, comprising: the backup processing component means, to:
retrieve, via at least one processor, performance logs associated with the usage profile; and
determine, via at least one processor, an optimal predictive optimization settings combination based on analysis of the performance logs via a machine learning technique,
wherein the predictive optimization settings are set to the optimal predictive optimization settings combination.

144. The system of embodiment 141, wherein the predictive optimization settings specify that stable blocks criteria, which identify blocks on the source volume that are unlikely to change, are utilized to designate the set of one or more blocks to be copied.

145. The system of embodiment 144, wherein stable blocks optimization settings specify a set of blocks classified as stable blocks, and wherein blocks other than the stable blocks are not designated in the set of one or more blocks to be copied for a specified number of passes through elements (b), (c), and (d).

146. The system of embodiment 145, wherein the stable blocks include blocks that represent at least one of: the operating system, applications, user data.

147. The system of embodiment 145, wherein the stable blocks include blocks classified as stable based on analysis of write history associated with blocks on the source volume via a machine learning technique.

148. The system of embodiment 141, wherein the predictive optimization settings specify that busy blocks criteria, which identify blocks on the source volume that are likely to change frequently, are utilized to designate the set of one or more blocks to be copied.

149. The system of embodiment 148, wherein busy blocks optimization settings specify a set of blocks classified as busy blocks, and wherein the busy blocks are not designated in the set of one or more blocks to be copied for a specified number of passes through elements (b), (c), and (d).

150. The system of embodiment 149, wherein the busy blocks include blocks that represent at least one of: database entries, mail server files.

151. The system of embodiment 149, wherein the busy blocks include blocks classified as busy based on analysis of write history associated with blocks on the source volume via a statistical technique.

152. The system of embodiment 141, wherein the predictive optimization settings specify that historical change frequency criteria, which categorize blocks on the source volume into different frequency types based on analysis of write history, are utilized to designate the set of one or more blocks to be copied.

153. The system of embodiment 152, wherein historical change frequency optimization settings specify the number of passes through elements (b), (c), and (d) during which blocks of each frequency type are not designated in the set of one or more blocks to be copied.

154. The system of embodiment 141, further, comprising: the backup processing component means, to:
determine, via at least one processor, a usage profile associated with the backup request; and
set, via at least one processor, the lookahead optimization settings to settings corresponding to the usage profile.

155. The system of embodiment 154, further, comprising: the backup processing component means, to:
retrieve, via at least one processor, performance logs associated with the usage profile; and
determine, via at least one processor, an optimal lookahead optimization settings combination based on analysis of the performance logs via a statistical technique,
wherein the lookahead optimization settings are set to the optimal lookahead optimization settings combination.

156. The system of embodiment 141, wherein the lookahead optimization settings specify that accelerated copy optimization is utilized to configure copying of the designated set of one or more blocks.

157. The system of embodiment 156, wherein accelerated copy optimization settings specify that blocks on the source volume that changed forward of a current position and that had not been marked as changed blocks at the start of a current pass through elements (b), (c), and (d) are added to the set of one or more blocks to copy.

158. The system of embodiment 157, wherein the accelerated copy optimization settings specify a schedule that determines when the accelerated copy optimization is utilized.

159. The system of embodiment 141, wherein the lookahead optimization settings specify that delayed copy optimization is utilized to configure copying of the designated set of one or more blocks.

160. The system of embodiment 159, wherein delayed copy optimization settings specify that blocks on the source volume that changed forward of a current position and that had been marked as changed blocks at the start of a current pass through elements (b), (c), and (d) are removed from the set of one or more blocks to copy.

161. A processor-implemented backup method, comprising: executing processor-implemented backup processing component instructions to:
(a) designate, via at least one processor, a set of one or more blocks to be copied from a source volume to a target volume based on predictive optimization settings associated with a backup request;
(b) copy, via at least one processor, at least some of the designated set of one or more blocks from the source volume to the target volume based on lookahead optimization settings associated with the backup request, while an operating system is configured to write to the source volume;
(c) identify, via at least one processor, blocks of the source volume that were written to by the operating system while the operating system was configured to write to the source volume during element (b);
(d) determine, via at least one processor, whether to enter a copy-on-write mode, when one or more blocks were identified in element (c);
(d)(i) change, via at least one processor, the designated set of one or more blocks to be copied from the source volume to the target volume to include at least one of the identified one or more blocks based on the predictive optimization settings and repeat elements (b), (c), and (d), when it is determined that the copy-on-write mode should not be entered;
(d)(ii) instruct, via at least one processor, the operating system to enter the copy-on-write mode and bring the target volume into a state consistent with a state of the source volume at the time the copy-on-write mode was entered, when it is determined that the copy-on-write mode should be entered.

162. The method of embodiment 161, further, comprising: executing processor-implemented backup processing component instructions to:
determine, via at least one processor, a usage profile associated with the backup request; and
set, via at least one processor, the predictive optimization settings to settings corresponding to the usage profile.

163. The method of embodiment 162, further, comprising: executing processor-implemented backup processing component instructions to:
retrieve, via at least one processor, performance logs associated with the usage profile; and
determine, via at least one processor, an optimal predictive optimization settings combination based on analysis of the performance logs via a machine learning technique,
wherein the predictive optimization settings are set to the optimal predictive optimization settings combination.

164. The method of embodiment 161, wherein the predictive optimization settings specify that stable blocks criteria, which identify blocks on the source volume that are unlikely to change, are utilized to designate the set of one or more blocks to be copied.

165. The method of embodiment 164, wherein stable blocks optimization settings specify a set of blocks classified as stable blocks, and wherein blocks other than the stable blocks are not designated in the set of one or more blocks to be copied for a specified number of passes through elements (b), (c), and (d).

166. The method of embodiment 165, wherein the stable blocks include blocks that represent at least one of: the operating system, applications, user data.

167. The method of embodiment 165, wherein the stable blocks include blocks classified as stable based on analysis of write history associated with blocks on the source volume via a machine learning technique.

168. The method of embodiment 161, wherein the predictive optimization settings specify that busy blocks criteria, which identify blocks on the source volume that are likely to change frequently, are utilized to designate the set of one or more blocks to be copied.

169. The method of embodiment 168, wherein busy blocks optimization settings specify a set of blocks classified as busy blocks, and wherein the busy blocks are not designated in the set of one or more blocks to be copied for a specified number of passes through elements (b), (c), and (d).

170. The method of embodiment 169, wherein the busy blocks include blocks that represent at least one of: database entries, mail server files.

171. The method of embodiment 169, wherein the busy blocks include blocks classified as busy based on analysis of write history associated with blocks on the source volume via a statistical technique.

172. The method of embodiment 161, wherein the predictive optimization settings specify that historical change frequency criteria, which categorize blocks on the source volume into different frequency types based on analysis of write history, are utilized to designate the set of one or more blocks to be copied.

173. The method of embodiment 172, wherein historical change frequency optimization settings specify the number of passes through elements (b), (c), and (d) during which blocks of each frequency type are not designated in the set of one or more blocks to be copied.

174. The method of embodiment 161, further, comprising: executing processor-implemented backup processing component instructions to:
determine, via at least one processor, a usage profile associated with the backup request; and
set, via at least one processor, the lookahead optimization settings to settings corresponding to the usage profile.

175. The method of embodiment 174, further, comprising: executing processor-implemented backup processing component instructions to:
retrieve, via at least one processor, performance logs associated with the usage profile; and
determine, via at least one processor, an optimal lookahead optimization settings combination based on analysis of the performance logs via a statistical technique,
wherein the lookahead optimization settings are set to the optimal lookahead optimization settings combination.

176. The method of embodiment 161, wherein the lookahead optimization settings specify that accelerated copy optimization is utilized to configure copying of the designated set of one or more blocks.

177. The method of embodiment 176, wherein accelerated copy optimization settings specify that blocks on the source volume that changed forward of a current position and that had not been marked as changed blocks at the start of a current pass through elements (b), (c), and (d) are added to the set of one or more blocks to copy.

178. The method of embodiment 177, wherein the accelerated copy optimization settings specify a schedule that determines when the accelerated copy optimization is utilized.

179. The method of embodiment 161, wherein the lookahead optimization settings specify that delayed copy optimization is utilized to configure copying of the designated set of one or more blocks.

180. The method of embodiment 179, wherein delayed copy optimization settings specify that blocks on the source volume that changed forward of a current position and that had been marked as changed blocks at the start of a current pass through elements (b), (c), and (d) are removed from the set of one or more blocks to copy.

201. A method for copying a source volume comprising multiple blocks to a target volume while an operating system is configured to write to the source volume, the method comprising:
(a) designating a set of one or more blocks to be copied from the source volume to the target volume;
(b) copying the designated set of one or more blocks from the source volume to the target volume while the operating system is configured to write to the source volume;
(c) identifying blocks of the source volume that were written to by the operating system while the operating system was configured to write to the source volume during step (b);
(d) if one or more blocks were identified in step (c), comparing an aggregate size of the identified one or more blocks to a threshold, wherein:
(d)(i) if the aggregate size is greater than or equal to the threshold:
changing the designated set of one or more blocks to be copied from the source volume to the target volume to include at least one of the identified one or more blocks, and repeating steps (b), (c), and (d);
(d)(ii) if the aggregate size is below the threshold:
causing the operating system to enter a copy-on-write mode, in which contents of a block of the source volume that is targeted by a write instruction from the operating system are preserved in a copy-on-write file before the write instruction modifies the contents of the targeted block, and
bringing the target volume into a state consistent with a state of the source volume at the time the copy-on-write mode was entered.

202. The method of embodiment 201, wherein the changing the designated set of one or more blocks to be copied from the source volume to the target volume to include the at least one of the identified one or more blocks in step (d)(i) comprises changing the designated set of one or more blocks to be copied from the source volume to the target volume to include only the at least one of the identified one or more blocks.

203. The method of embodiment 201, wherein the method concludes if no blocks were identified in step (c).

204. The method of embodiment 201, wherein designating the set of one or more blocks to be copied from the source volume to the target volume in step (a) comprises designating at least one of (i) all allocated blocks in the source volume, and (ii) all blocks in the source volume.

205. The method of embodiment 201, further comprising designating a set of excluded blocks in the source volume, wherein the designating the set of one or more blocks to be copied from the source volume to the target volume in step (a) comprises excluding the excluded blocks from the designated set of one or more blocks to be copied from the source volume to the target volume.

206. The method of embodiment 201, wherein the operating system refrains from entering the copy-on-write mode during steps (a), (b), (c), and (d)(i).

207. The method of embodiment 201, further comprising:
receiving, during step (b), an indication that the operating system has written to a block of the source volume;
determining, during step (b), whether the written-to block has already been copied to the target volume;
if the written-to block has already been copied to the target volume, adding an identifier corresponding to the written-to block to a list of modified blocks; and
if the written-to block has not already been copied to the target volume, refraining from adding the identifier corresponding to the written-to block to the list of modified blocks,
wherein step (c) comprises evaluating said list of modified blocks.

208. The method of embodiment 207, wherein the evaluating said list of modified blocks comprises identifying the file types associated with at least one of the modified blocks and determining if said file type is designated to be copied.

209. The method of embodiment 201, further comprising:
receiving, during step (b), an instruction from the operating system to write to a block of the source volume; and
adding an identifier corresponding to the written-to block to a list of modified blocks,
wherein step (c) comprises evaluating said list of modified blocks.
210. The method of embodiment 209, wherein the evaluating said list of modified blocks comprises identifying the file types associated with at least one of the modified blocks and determining if said file type is designated to be copied.
211. The method of embodiment 201, wherein the threshold is determined based on a maximum number of blocks that may be transferred from the source volume to the target volume within a target maximum time.
212. The method of embodiment 201, wherein the threshold is determined based on a pre-defined proportion of a total size of at least one of the source volume and the target volume.
213. The method of embodiment 201, wherein the aggregate size of the identified one or more blocks is a numerical count of the identified one or more blocks, and the threshold comprises a number of blocks.
214. The method of embodiment 201, wherein step (d)(ii) comprises copying the at least one of the identified one or more blocks from the source volume to the target volume while the operating system is in the copy-on-write mode.
215. The method of embodiment 201, wherein the source volume is a client device and the target volume is a backup aggregator at a site local to the client device.
216. The method of embodiment 201, wherein the source volume is a client device and the target volume is a storage server at a cloud storage center remote from the client device.
217. The method of embodiment 201, wherein the source volume includes an image-based backup, and wherein the set of one or more blocks to be copied from the source volume to the target volume includes one or more blocks of the image-based backup.
218. The method of embodiment 201, wherein the target volume is a cloud storage volume.
219. The method of embodiment 201, wherein step (b) comprises sending the designated stet of one or more blocks to the target volume via the internet.
220. A method for copying a source volume comprising multiple blocks to a target volume, the method comprising:
(a) designating a set of one or more blocks to be copied from the source volume to the target volume;
(b) copying the designated set of one or more blocks from the source volume to the target volume while an operating system is configured to write to the source volume;
(c) identifying blocks of the source volume that were written to by the operating system while the operating system was configured to write to the source volume during step (b); and
(d) comparing an aggregate size of the identified one or more blocks to a threshold, wherein:
(d)(i) if the aggregate size is greater than or equal to the threshold:
changing the designated set of one or more blocks to be copied from the source volume to the target volume to include at least one of the identified one or more blocks, and
repeating steps (b), (c), and (d).
221. The method of embodiment 220, the changing the designated set of one or more blocks to be copied from the source volume to the target volume to include the at least one of the identified one or more blocks in step (d)(i) comprises changing the designated set of one or more blocks to be copied from the source volume to the target volume to include only the at least one of the identified one or more blocks.
222. The method of embodiment 220, wherein step (d) further comprises:
(d)(ii) if the aggregate size is below the threshold:
causing the operating system to enter a copy-on-write mode, in which contents of a block of the source volume that is targeted by a write instruction from the operating system are preserved in a copy-on-write file before the write instruction modifies the contents of the targeted block, and
bringing the target volume into a state consistent with a state of the source volume at the time the copy-on-write mode was entered.
223. The method of embodiment 220, wherein designating the set of one or more blocks to be copied from the source volume to the target volume in step (a) comprises designating at least one of (i) all allocated blocks in the source volume, and (ii) all blocks in the source volume.
224. The method of embodiment 220, wherein the operating system refrains from entering the copy-on-write mode during steps (a), (b), (c), and (d)(i).
225. The method of embodiment 220, further comprising:
receiving, during step (b), an indication that the operating system has written to a block of the source volume;
determining, during step (b), whether the written-to block has already been copied to the target volume;
if the written-to block has already been copied to the target volume, adding an identifier corresponding to the written-to block to a list of modified blocks; and
wherein step (c) comprises evaluating said list of modified blocks.
226. The method of embodiment 225, wherein the evaluating said list of modified blocks comprises identifying the file types associated with at least one of the modified blocks and determining if said file type is designated to be copied.
227. The method of embodiment 220, wherein the threshold is determined based on a maximum number of blocks that may be transferred from the source volume to the target volume within a target maximum time.
228. The method of embodiment 220, wherein the aggregate size of the identified one or more blocks is a numerical count of the identified one or more blocks, and the threshold comprises a number of blocks.
229. The method of embodiment 220, wherein step (d)(ii) comprises copying the at least one of the identified one or more blocks from the source volume to the target volume while the operating system is in the copy-on-write mode.
230. The method of embodiment 220, wherein the source volume is a client device and the target volume is a backup aggregator at a site local to the client device.
231. The method of embodiment 220, wherein the source volume is a client device and the target volume is a storage server at a cloud storage center remote from the client device.
232. The method of embodiment 220, wherein the source volume includes an image-based backup, and wherein the set of one or more blocks to be copied from the source volume to the target volume includes one or more blocks of the image-based backup.

233. The method of embodiment 220, wherein the target volume is a cloud storage volume.

234. The method of embodiment 220, wherein step (b) comprises sending the designated stet of one or more blocks to the target volume via the internet.

235. A method for copying a source volume comprising multiple blocks to a cloud storage volume while an operating system is configured to write to the source volume, the method comprising:

(a) designating a set of one or more blocks to be copied from the source volume to the cloud storage volume, wherein the source volume includes an image-based backup, and wherein the set of one or more blocks to be copied from the source volume to the cloud storage volume includes one or more blocks of the image-based backup;

(b) copying the designated set of one or more blocks from the source volume to the cloud storage volume while the operating system is configured to write to the source volume by sending the designated stet of one or more blocks to the cloud storage volume via the internet;

(c) identifying blocks of the source volume that were written to by the operating system while the operating system was configured to write to the source volume during step (b);

(d) if one or more blocks were identified in step (c), comparing an aggregate size of the identified one or more blocks to a threshold, wherein:

(d)(i) if the aggregate size is greater than or equal to the threshold:

changing the designated set of one or more blocks to be copied from the source volume to the cloud storage volume to include at least one of the identified one or more blocks, and repeating steps (b), (c), and (d);

(d)(ii) if the aggregate size is below the threshold:

causing the operating system to enter a copy-on-write mode, in which contents of a block of the source volume that is targeted by a write instruction from the operating system are preserved in a copy-on-write file before the write instruction modifies the contents of the targeted block, and bringing the cloud storage volume into a state consistent with a state of the source volume at the time the copy-on-write mode was entered.

301. A multi-client snapshot replicating apparatus, comprising:

a memory;

a component collection in the memory, including:

a source replication component, and a target replication component;

a processor disposed in communication with the memory, and configured to issue a plurality of processing instructions from the component collection stored in the memory, wherein the processor issues instructions from the source replication component, stored in the memory, to:

obtain, via at least one processor, a replication notification associated with a snapshot of a backup volume at a source node;

determine, via at least one processor, a replication target node associated with the replication notification;

create, via at least one processor, a source node named pipe associated with the snapshot, wherein the source node named pipe is configured to facilitate reading snapshot data of the snapshot from the backup volume;

determine, via at least one processor, a snapshot priority for the snapshot, wherein snapshot priority determines how to order snapshot data from a plurality of snapshots for replication from the source node to the replication target node;

determine, via at least one processor, that the snapshot priority of the snapshot indicates that it is time to send the snapshot to the replication target node;

serialize, via at least one processor, snapshot data of the snapshot, read from the source node named pipe, into one or more chunks;

multiplex, via at least one processor, the one or more chunks associated with the snapshot and one or more chunks associated with one or more other snapshots from the plurality of snapshots into a replication data stream; and send, via at least one processor, the replication data stream to the replication target node via a persistent network connection between the source node and the replication target node;

wherein the processor issues instructions from the target replication component, stored in the memory, to:

receive, via at least one processor, the replication data stream;

deserialize, via at least one processor, a first chunk associated with the snapshot received via the replication data stream;

determine, via at least one processor, a replication volume associated with the snapshot at the replication target node based on the first chunk's payload;

create, via at least one processor, a replication target node named pipe associated with the snapshot, wherein the replication target node named pipe is configured to facilitate writing snapshot data of the snapshot to the replication volume;

deserialize, via at least one processor, a second chunk associated with the snapshot received via the replication data stream; and write, via at least one processor, to the replication target node named pipe snapshot data of the snapshot provided in the second chunk's payload.

302. The apparatus of embodiment 301, wherein the replication notification is obtained upon completion of backup of SaaS data of a paired service of a user associated with the backup volume.

303. The apparatus of embodiment 301, wherein the backup volume is configured to store backup data for a client, wherein the client is one of: an entity, a user, a service.

304. The apparatus of embodiment 303, wherein the replication target node associated with the replication notification is determined based on an identifier of the client.

305. The apparatus of embodiment 301, wherein the replication target node associated with the replication notification is determined based on an identifier of the source node.

306. The apparatus of embodiment 303, further, comprising:

the processor issues instructions from the source replication component, stored in the memory, to:

determine, via at least one processor, the replication volume associated with the snapshot at the replication target node based on at least one of: an identifier of the client, an identifier of the backup volume.

307. The apparatus of embodiment 303, wherein the snapshot priority for the snapshot is determined based on at least one of: last backup volume replication timestamp, snapshot size, client identifier.

308. The apparatus of embodiment 301, further, comprising: the processor issues instructions from the source replication component, stored in the memory, to:
add, via at least one processor, an element corresponding to the snapshot and having the snapshot priority to a priority queue; and
determine, via at least one processor, that the snapshot priority of the snapshot indicates that it is time to send the snapshot to the replication target node when the element corresponding to the snapshot has the highest priority in the priority queue.

309. The apparatus of embodiment 308, further, comprising: the processor issues instructions from the source replication component, stored in the memory, to:
adjust, via at least one processor, the snapshot priority of the element corresponding to the snapshot to match snapshot priorities of one or more other elements in the priority queue corresponding to one or more other snapshots of the backup volume.

310. The apparatus of embodiment 301, wherein the snapshot data of the snapshot is serialized into the one or more chunks using protocol buffers.

311. The apparatus of embodiment 301, wherein the source replication component is configured to transfer a specified number of snapshots concurrently in the replication data stream.

312. The apparatus of embodiment 301, wherein a data compression technique is utilized to compress the replication data stream, and wherein a compression dictionary for the data compression technique is generated utilizing data from multiple multiplexed snapshots.

313. The apparatus of embodiment 301, wherein the persistent network connection is a TCP/IP connection established to transfer multiplexed snapshot data from a plurality of snapshots for replication from the source node to the replication target node.

314. The apparatus of embodiment 301, wherein the first chunk's payload includes at least one of: an identifier of the replication volume, an identifier of the backup volume.

315. The apparatus of embodiment 301, further, comprising: the processor issues instructions from the target replication component, stored in the memory, to:
deserialize, via at least one processor, a third chunk associated with the snapshot received via the replication data stream;
finalize, via at least one processor, writing to the replication target node named pipe based on the third chunk's payload;
determine, via at least one processor, that the replication data stream has been processed; and
terminate, via at least one processor, the persistent network connection between the source node and the replication target node.

316. A processor-readable multi-client snapshot replicating non-transient physical medium storing processor-executable components, the components, comprising:
a component collection stored in the medium, including:
a source replication component, and
a target replication component;
wherein the source replication component, stored in the medium, includes processor-issuable instructions to:
obtain, via at least one processor, a replication notification associated with a snapshot of a backup volume at a source node;
determine, via at least one processor, a replication target node associated with the replication notification;
create, via at least one processor, a source node named pipe associated with the snapshot, wherein the source node named pipe is configured to facilitate reading snapshot data of the snapshot from the backup volume;
determine, via at least one processor, a snapshot priority for the snapshot, wherein snapshot priority determines how to order snapshot data from a plurality of snapshots for replication from the source node to the replication target node;
determine, via at least one processor, that the snapshot priority of the snapshot indicates that it is time to send the snapshot to the replication target node;
serialize, via at least one processor, snapshot data of the snapshot, read from the source node named pipe, into one or more chunks;
multiplex, via at least one processor, the one or more chunks associated with the snapshot and one or more chunks associated with one or more other snapshots from the plurality of snapshots into a replication data stream; and
send, via at least one processor, the replication data stream to the replication target node via a persistent network connection between the source node and the replication target node;
wherein the target replication component, stored in the medium, includes processor-issuable instructions to:
receive, via at least one processor, the replication data stream;
deserialize, via at least one processor, a first chunk associated with the snapshot received via the replication data stream;
determine, via at least one processor, a replication volume associated with the snapshot at the replication target node based on the first chunk's payload;
create, via at least one processor, a replication target node named pipe associated with the snapshot, wherein the replication target node named pipe is configured to facilitate writing snapshot data of the snapshot to the replication volume;
deserialize, via at least one processor, a second chunk associated with the snapshot received via the replication data stream; and
write, via at least one processor, to the replication target node named pipe snapshot data of the snapshot provided in the second chunk's payload.

317. The medium of embodiment 316, wherein the replication notification is obtained upon completion of backup of SaaS data of a paired service of a user associated with the backup volume.

318. The medium of embodiment 316, wherein the backup volume is configured to store backup data for a client, wherein the client is one of: an entity, a user, a service.

319. The medium of embodiment 318, wherein the replication target node associated with the replication notification is determined based on an identifier of the client.

320. The medium of embodiment 316, wherein the replication target node associated with the replication notification is determined based on an identifier of the source node.

321. The medium of embodiment 318, further, comprising: the source replication component, stored in the medium, includes processor-issuable instructions to:

determine, via at least one processor, the replication volume associated with the snapshot at the replication target node based on at least one of: an identifier of the client, an identifier of the backup volume.

322. The medium of embodiment 318, wherein the snapshot priority for the snapshot is determined based on at least one of: last backup volume replication timestamp, snapshot size, client identifier.

323. The medium of embodiment 316, further, comprising:

the source replication component, stored in the medium, includes processor-issuable instructions to:

add, via at least one processor, an element corresponding to the snapshot and having the snapshot priority to a priority queue; and determine, via at least one processor, that the snapshot priority of the snapshot indicates that it is time to send the snapshot to the replication target node when the element corresponding to the snapshot has the highest priority in the priority queue.

324. The medium of embodiment 323, further, comprising:

the source replication component, stored in the medium, includes processor-issuable instructions to:

adjust, via at least one processor, the snapshot priority of the element corresponding to the snapshot to match snapshot priorities of one or more other elements in the priority queue corresponding to one or more other snapshots of the backup volume.

325. The medium of embodiment 316, wherein the snapshot data of the snapshot is serialized into the one or more chunks using protocol buffers.

326. The medium of embodiment 316, wherein the source replication component is configured to transfer a specified number of snapshots concurrently in the replication data stream.

327. The medium of embodiment 316, wherein a data compression technique is utilized to compress the replication data stream, and wherein a compression dictionary for the data compression technique is generated utilizing data from multiple multiplexed snapshots.

328. The medium of embodiment 316, wherein the persistent network connection is a TCP/IP connection established to transfer multiplexed snapshot data from a plurality of snapshots for replication from the source node to the replication target node.

329. The medium of embodiment 316, wherein the first chunk's payload includes at least one of: an identifier of the replication volume, an identifier of the backup volume.

330. The medium of embodiment 316, further, comprising:

the target replication component, stored in the medium, includes processor-issuable instructions to:

deserialize, via at least one processor, a third chunk associated with the snapshot received via the replication data stream;

finalize, via at least one processor, writing to the replication target node named pipe based on the third chunk's payload;

determine, via at least one processor, that the replication data stream has been processed; and terminate, via at least one processor, the persistent network connection between the source node and the replication target node.

331. A processor-implemented multi-client snapshot replicating system, comprising:

a source replication component means, to:

obtain, via at least one processor, a replication notification associated with a snapshot of a backup volume at a source node;

determine, via at least one processor, a replication target node associated with the replication notification;

create, via at least one processor, a source node named pipe associated with the snapshot, wherein the source node named pipe is configured to facilitate reading snapshot data of the snapshot from the backup volume;

determine, via at least one processor, a snapshot priority for the snapshot, wherein snapshot priority determines how to order snapshot data from a plurality of snapshots for replication from the source node to the replication target node;

determine, via at least one processor, that the snapshot priority of the snapshot indicates that it is time to send the snapshot to the replication target node;

serialize, via at least one processor, snapshot data of the snapshot, read from the source node named pipe, into one or more chunks;

multiplex, via at least one processor, the one or more chunks associated with the snapshot and one or more chunks associated with one or more other snapshots from the plurality of snapshots into a replication data stream; and send, via at least one processor, the replication data stream to the replication target node via a persistent network connection between the source node and the replication target node;

a target replication component means, to:

receive, via at least one processor, the replication data stream;

deserialize, via at least one processor, a first chunk associated with the snapshot received via the replication data stream;

determine, via at least one processor, a replication volume associated with the snapshot at the replication target node based on the first chunk's payload;

create, via at least one processor, a replication target node named pipe associated with the snapshot, wherein the replication target node named pipe is configured to facilitate writing snapshot data of the snapshot to the replication volume;

deserialize, via at least one processor, a second chunk associated with the snapshot received via the replication data stream; and write, via at least one processor, to the replication target node named pipe snapshot data of the snapshot provided in the second chunk's payload.

332. The system of embodiment 331, wherein the replication notification is obtained upon completion of backup of SaaS data of a paired service of a user associated with the backup volume.

333. The system of embodiment 331, wherein the backup volume is configured to store backup data for a client, wherein the client is one of: an entity, a user, a service.

334. The system of embodiment 333, wherein the replication target node associated with the replication notification is determined based on an identifier of the client.

335. The system of embodiment 331, wherein the replication target node associated with the replication notification is determined based on an identifier of the source node.

336. The system of embodiment 333, further, comprising: the source replication component means, to:

determine, via at least one processor, the replication volume associated with the snapshot at the replication target node based on at least one of: an identifier of the client, an identifier of the backup volume.

337. The system of embodiment 333, wherein the snapshot priority for the snapshot is determined based on at least one of: last backup volume replication timestamp, snapshot size, client identifier.

338. The system of embodiment 331, further, comprising: the source replication component means, to:

add, via at least one processor, an element corresponding to the snapshot and having the snapshot priority to a priority queue; and determine, via at least one processor, that the snapshot priority of the snapshot indicates that it is time to send the snapshot to the replication target node when the element corresponding to the snapshot has the highest priority in the priority queue.

339. The system of embodiment 338, further, comprising: the source replication component means, to:

adjust, via at least one processor, the snapshot priority of the element corresponding to the snapshot to match snapshot priorities of one or more other elements in the priority queue corresponding to one or more other snapshots of the backup volume.

340. The system of embodiment 331, wherein the snapshot data of the snapshot is serialized into the one or more chunks using protocol buffers.

341. The system of embodiment 331, wherein the source replication component is configured to transfer a specified number of snapshots concurrently in the replication data stream.

342. The system of embodiment 331, wherein a data compression technique is utilized to compress the replication data stream, and wherein a compression dictionary for the data compression technique is generated utilizing data from multiple multiplexed snapshots.

343. The system of embodiment 331, wherein the persistent network connection is a TCP/IP connection established to transfer multiplexed snapshot data from a plurality of snapshots for replication from the source node to the replication target node.

344. The system of embodiment 331, wherein the first chunk's payload includes at least one of: an identifier of the replication volume, an identifier of the backup volume.

345. The system of embodiment 331, further, comprising: the target replication component means, to:

deserialize, via at least one processor, a third chunk associated with the snapshot received via the replication data stream;

finalize, via at least one processor, writing to the replication target node named pipe based on the third chunk's payload;

determine, via at least one processor, that the replication data stream has been processed; and terminate, via at least one processor, the persistent network connection between the source node and the replication target node.

346. A processor-implemented multi-client snapshot replicating method, comprising:

executing processor-implemented source replication component instructions to:

obtain, via at least one processor, a replication notification associated with a snapshot of a backup volume at a source node;

determine, via at least one processor, a replication target node associated with the replication notification;

create, via at least one processor, a source node named pipe associated with the snapshot, wherein the source node named pipe is configured to facilitate reading snapshot data of the snapshot from the backup volume;

determine, via at least one processor, a snapshot priority for the snapshot, wherein snapshot priority determines how to order snapshot data from a plurality of snapshots for replication from the source node to the replication target node;

determine, via at least one processor, that the snapshot priority of the snapshot indicates that it is time to send the snapshot to the replication target node;

serialize, via at least one processor, snapshot data of the snapshot, read from the source node named pipe, into one or more chunks;

multiplex, via at least one processor, the one or more chunks associated with the snapshot and one or more chunks associated with one or more other snapshots from the plurality of snapshots into a replication data stream; and send, via at least one processor, the replication data stream to the replication target node via a persistent network connection between the source node and the replication target node;

executing processor-implemented target replication component instructions to:

receive, via at least one processor, the replication data stream;

deserialize, via at least one processor, a first chunk associated with the snapshot received via the replication data stream;

determine, via at least one processor, a replication volume associated with the snapshot at the replication target node based on the first chunk's payload;

create, via at least one processor, a replication target node named pipe associated with the snapshot, wherein the replication target node named pipe is configured to facilitate writing snapshot data of the snapshot to the replication volume;

deserialize, via at least one processor, a second chunk associated with the snapshot received via the replication data stream; and write, via at least one processor, to the replication target node named pipe snapshot data of the snapshot provided in the second chunk's payload.

347. The method of embodiment 346, wherein the replication notification is obtained upon completion of backup of SaaS data of a paired service of a user associated with the backup volume.

348. The method of embodiment 346, wherein the backup volume is configured to store backup data for a client, wherein the client is one of: an entity, a user, a service.

349. The method of embodiment 348, wherein the replication target node associated with the replication notification is determined based on an identifier of the client.

350. The method of embodiment 346, wherein the replication target node associated with the replication notification is determined based on an identifier of the source node.

351. The method of embodiment 348, further, comprising:

executing processor-implemented source replication component instructions to:

determine, via at least one processor, the replication volume associated with the snapshot at the replication target node based on at least one of: an identifier of the client, an identifier of the backup volume.

352. The method of embodiment 348, wherein the snapshot priority for the snapshot is determined based on at least one of: last backup volume replication timestamp, snapshot size, client identifier.

353. The method of embodiment 346, further, comprising: executing processor-implemented source replication component instructions to:

add, via at least one processor, an element corresponding to the snapshot and having the snapshot priority to a priority queue; and determine, via at least one processor, that the snapshot priority of the snapshot indicates that it is time to send the snapshot to the replication target node when the element corresponding to the snapshot has the highest priority in the priority queue.

354. The method of embodiment 353, further, comprising: executing processor-implemented source replication component instructions to:

adjust, via at least one processor, the snapshot priority of the element corresponding to the snapshot to match snapshot priorities of one or more other elements in the priority queue corresponding to one or more other snapshots of the backup volume.

355. The method of embodiment 346, wherein the snapshot data of the snapshot is serialized into the one or more chunks using protocol buffers.

356. The method of embodiment 346, wherein the source replication component is configured to transfer a specified number of snapshots concurrently in the replication data stream.

357. The method of embodiment 346, wherein a data compression technique is utilized to compress the replication data stream, and wherein a compression dictionary for the data compression technique is generated utilizing data from multiple multiplexed snapshots.

358. The method of embodiment 346, wherein the persistent network connection is a TCP/IP connection established to transfer multiplexed snapshot data from a plurality of snapshots for replication from the source node to the replication target node.

359. The method of embodiment 346, wherein the first chunk's payload includes at least one of: an identifier of the replication volume, an identifier of the backup volume.

360. The method of embodiment 346, further, comprising: executing processor-implemented target replication component instructions to:

deserialize, via at least one processor, a third chunk associated with the snapshot received via the replication data stream;

finalize, via at least one processor, writing to the replication target node named pipe based on the third chunk's payload;

determine, via at least one processor, that the replication data stream has been processed; and terminate, via at least one processor, the persistent network connection between the source node and the replication target node.

In order to address various issues and advance the art, the entirety of this application for Multiclient Backup Replication Apparatuses, Methods and Systems (including the Cover Page, Title, Headings, Field, Background, Summary, Brief Description of the Drawings, Detailed Description, Claims, Abstract, Figures, Appendices, and otherwise) shows, by way of illustration, various embodiments in which the claimed innovations may be practiced. The advantages and features of the application are of a representative sample of embodiments only, and are not exhaustive and/or exclusive. They are presented only to assist in understanding and teach the claimed principles. It should be understood that they are not representative of all claimed innovations. As such, certain aspects of the disclosure have not been discussed herein. That alternate embodiments may not have been presented for a specific portion of the innovations or that further undescribed alternate embodiments may be available for a portion is not to be considered a disclaimer of those alternate embodiments. It will be appreciated that many of those undescribed embodiments incorporate the same principles of the innovations and others are equivalent. Thus, it is to be understood that other embodiments may be utilized and functional, logical, operational, organizational, structural and/or topological modifications may be made without departing from the scope and/or spirit of the disclosure. As such, all examples and/or embodiments are deemed to be non-limiting throughout this disclosure. Further and to the extent any financial and/or investment examples are included, such examples are for illustrative purpose(s) only, and are not, nor should they be interpreted, as investment advice. Also, no inference should be drawn regarding those embodiments discussed herein relative to those not discussed herein other than it is as such for purposes of reducing space and repetition. For instance, it is to be understood that the logical and/or topological structure of any combination of any program components (a component collection), other components, data flow order, logic flow order, and/or any present feature sets as described in the figures and/or throughout are not limited to a fixed operating order and/or arrangement, but rather, any disclosed order is exemplary and all equivalents, regardless of order, are contemplated by the disclosure. Similarly, descriptions of embodiments disclosed throughout this disclosure, any reference to direction or orientation is merely intended for convenience of description and is not intended in any way to limit the scope of described embodiments. Relative terms such as “lower”, “upper”, “horizontal”, “vertical”, “above”, “below”, “up”, “down”, “top” and “bottom” as well as derivative thereof (e.g., “horizontally”, “downwardly”, “upwardly”, etc.) should not be construed to limit embodiments, and instead, again, are offered for convenience of description of orientation. These relative descriptors are for convenience of description only and do not require that any embodiments be constructed or operated in a particular orientation unless explicitly indicated as such. Terms such as “attached”, “affixed”, “connected”, “coupled”, “interconnected”, and similar may refer to a relationship wherein structures are secured or attached to one another either directly or indirectly through intervening structures, as well as both movable or rigid attachments or relationships, unless expressly described otherwise. Furthermore, it is to be understood that such features are not limited to serial execution, but rather, any number of threads, processes, services, servers, and/or the like that may execute asynchronously, concurrently, in parallel, simultaneously, synchronously, and/or the like are contemplated by the disclosure. As such, some of these features may be mutually contradictory, in that they cannot be simultaneously present in a single embodiment. Similarly, some features are applicable to one aspect of the innovations, and inapplicable to others. In addition, the disclosure includes other innovations not presently claimed. Applicant reserves all rights in those presently unclaimed innovations including the right to claim such innovations, file additional applications, continuations, continuations in part, divisions, and/or the like thereof. As such, it should be understood that advantages, embodiments, examples, functional, features, logical, operational, organizational, structural, topological, and/or other aspects of the disclosure are not to be considered limitations on the disclosure as defined by the claims or limitations on equivalents to the claims. It is to be understood that, depending on the particular needs and/or characteristics of a MBR individual and/or enterprise user, database configuration and/or relational model, data type, data transmission and/or network framework, syntax structure, and/or the like, various embodiments of the MBR, may be implemented that allow a great deal of flexibility and customization. For example, aspects of the MBR may be adapted for storage management systems. While various embodiments and discussions of the MBR have included backup systems, however, it is to be understood that the embodiments described herein may be readily configured and/or customized for a wide variety of other applications and/or implementations.

What is claimed is:

1. A multi-client snapshot replicating apparatus, comprising:

a memory;

a component collection in the memory, including:

a source replication component, and a target replication component;

a processor disposed in communication with the memory, and configured to issue a plurality of processing instructions from the component collection stored in the memory, wherein the processor issues instructions from the source replication component, stored in the memory, to:

obtain, via at least one processor, a replication notification associated with a snapshot of a backup volume at a source node;

determine, via at least one processor, a replication target node associated with the replication notification;

create, via at least one processor, a source node named pipe associated with the snapshot, wherein the source node named pipe is configured to facilitate reading snapshot data of the snapshot from the backup volume;

determine, via at least one processor, a snapshot priority for the snapshot, wherein snapshot priority determines how to order snapshot data from a plurality of snapshots for replication from the source node to the replication target node;

determine, via at least one processor, that the snapshot priority of the snapshot indicates that it is time to send the snapshot to the replication target node;

serialize, via at least one processor, snapshot data of the snapshot, read from the source node named pipe, into one or more chunks;

multiplex, via at least one processor, the one or more chunks associated with the snapshot and one or more chunks associated with one or more other snapshots from the plurality of snapshots into a replication data stream; and send, via at least one processor, the replication data stream to the replication target node via a persistent network connection between the source node and the replication target node;

wherein the processor issues instructions from the target replication component, stored in the memory, to:

receive, via at least one processor, the replication data stream;

deserialize, via at least one processor, a first chunk associated with the snapshot received via the replication data stream;

determine, via at least one processor, a replication volume associated with the snapshot at the replication target node based on the first chunk's payload;

create, via at least one processor, a replication target node named pipe associated with the snapshot, wherein the replication target node named pipe is configured to facilitate writing snapshot data of the snapshot to the replication volume;

deserialize, via at least one processor, a second chunk associated with the snapshot received via the replication data stream; and write, via at least one processor, to the replication target node named pipe snapshot data of the snapshot provided in the second chunk's payload.

2. The apparatus of claim 1, wherein the replication notification is obtained upon completion of backup of SaaS data of a paired service of a user associated with the backup volume.

3. The apparatus of claim 1, wherein the backup volume is configured to store backup data for a client, wherein the client is one of: an entity, a user, a service.

4. The apparatus of claim 3, wherein the replication target node associated with the replication notification is determined based on an identifier of the client.

5. The apparatus of claim 1, wherein the replication target node associated with the replication notification is determined based on an identifier of the source node.

6. The apparatus of claim 3, further, comprising:

the processor issues instructions from the source replication component, stored in the memory, to:

determine, via at least one processor, the replication volume associated with the snapshot at the replication target node based on at least one of: an identifier of the client, an identifier of the backup volume.

7. The apparatus of claim 3, wherein the snapshot priority for the snapshot is determined based on at least one of: last backup volume replication timestamp, snapshot size, client identifier.

8. The apparatus of claim 1, further, comprising:

the processor issues instructions from the source replication component, stored in the memory, to:

add, via at least one processor, an element corresponding to the snapshot and having the snapshot priority to a priority queue; and determine, via at least one processor, that the snapshot priority of the snapshot indicates that it is time to send the snapshot to the replication target node when the element corresponding to the snapshot has the highest priority in the priority queue.

9. The apparatus of claim 8, further, comprising:

the processor issues instructions from the source replication component, stored in the memory, to:

adjust, via at least one processor, the snapshot priority of the element corresponding to the snapshot to match snapshot priorities of one or more other elements in the priority queue corresponding to one or more other snapshots of the backup volume.

10. The apparatus of claim 1, wherein the snapshot data of the snapshot is serialized into the one or more chunks using protocol buffers.

11. The apparatus of claim 1, wherein the source replication component is configured to transfer a specified number of snapshots concurrently in the replication data stream.

12. The apparatus of claim 1, wherein a data compression technique is utilized to compress the replication data stream, and wherein a compression dictionary for the data compression technique is generated utilizing data from multiple multiplexed snapshots.

13. The apparatus of claim 1, wherein the persistent network connection is a TCP/IP connection established to transfer multiplexed snapshot data from a plurality of snapshots for replication from the source node to the replication target node.

14. The apparatus of claim 1, wherein the first chunk's payload includes at least one of: an identifier of the replication volume, an identifier of the backup volume.

15. The apparatus of claim 1, further, comprising:
the processor issues instructions from the target replication component, stored in the memory, to:
deserialize, via at least one processor, a third chunk associated with the snapshot received via the replication data stream;
finalize, via at least one processor, writing to the replication target node named pipe based on the third chunk's payload;
determine, via at least one processor, that the replication data stream has been processed; and
terminate, via at least one processor, the persistent network connection between the source node and the replication target node.

16. A processor-readable multi-client snapshot replicating non-transient physical medium storing processor-executable components, the components, comprising:
a component collection stored in the medium, including:
a source replication component, and
a target replication component;
wherein the source replication component, stored in the medium, includes processor-issuable instructions to:
obtain, via at least one processor, a replication notification associated with a snapshot of a backup volume at a source node;
determine, via at least one processor, a replication target node associated with the replication notification;
create, via at least one processor, a source node named pipe associated with the snapshot, wherein the source node named pipe is configured to facilitate reading snapshot data of the snapshot from the backup volume;
determine, via at least one processor, a snapshot priority for the snapshot, wherein snapshot priority determines how to order snapshot data from a plurality of snapshots for replication from the source node to the replication target node;
determine, via at least one processor, that the snapshot priority of the snapshot indicates that it is time to send the snapshot to the replication target node;
serialize, via at least one processor, snapshot data of the snapshot, read from the source node named pipe, into one or more chunks;
multiplex, via at least one processor, the one or more chunks associated with the snapshot and one or more chunks associated with one or more other snapshots from the plurality of snapshots into a replication data stream; and
send, via at least one processor, the replication data stream to the replication target node via a persistent network connection between the source node and the replication target node;
wherein the target replication component, stored in the medium, includes processor-issuable instructions to:
receive, via at least one processor, the replication data stream;
deserialize, via at least one processor, a first chunk associated with the snapshot received via the replication data stream;
determine, via at least one processor, a replication volume associated with the snapshot at the replication target node based on the first chunk's payload;
create, via at least one processor, a replication target node named pipe associated with the snapshot, wherein the replication target node named pipe is configured to facilitate writing snapshot data of the snapshot to the replication volume;
deserialize, via at least one processor, a second chunk associated with the snapshot received via the replication data stream; and
write, via at least one processor, to the replication target node named pipe snapshot data of the snapshot provided in the second chunk's payload.

17. A processor-implemented multi-client snapshot replicating system, comprising:
a source replication component means, to:
obtain, via at least one processor, a replication notification associated with a snapshot of a backup volume at a source node;
determine, via at least one processor, a replication target node associated with the replication notification;
create, via at least one processor, a source node named pipe associated with the snapshot, wherein the source node named pipe is configured to facilitate reading snapshot data of the snapshot from the backup volume;
determine, via at least one processor, a snapshot priority for the snapshot, wherein snapshot priority determines how to order snapshot data from a plurality of snapshots for replication from the source node to the replication target node;
determine, via at least one processor, that the snapshot priority of the snapshot indicates that it is time to send the snapshot to the replication target node;
serialize, via at least one processor, snapshot data of the snapshot, read from the source node named pipe, into one or more chunks;
multiplex, via at least one processor, the one or more chunks associated with the snapshot and one or more chunks associated with one or more other snapshots from the plurality of snapshots into a replication data stream; and
send, via at least one processor, the replication data stream to the replication target node via a persistent network connection between the source node and the replication target node;
a target replication component means, to:
receive, via at least one processor, the replication data stream;

deserialize, via at least one processor, a first chunk associated with the snapshot received via the replication data stream;

determine, via at least one processor, a replication volume associated with the snapshot at the replication target node based on the first chunk's payload;

create, via at least one processor, a replication target node named pipe associated with the snapshot, wherein the replication target node named pipe is configured to facilitate writing snapshot data of the snapshot to the replication volume;

deserialize, via at least one processor, a second chunk associated with the snapshot received via the replication data stream; and write, via at least one processor, to the replication target node named pipe snapshot data of the snapshot provided in the second chunk's payload.

18. A processor-implemented multi-client snapshot replicating method, comprising:

executing processor-implemented source replication component instructions to:

obtain, via at least one processor, a replication notification associated with a snapshot of a backup volume at a source node;

determine, via at least one processor, a replication target node associated with the replication notification;

create, via at least one processor, a source node named pipe associated with the snapshot, wherein the source node named pipe is configured to facilitate reading snapshot data of the snapshot from the backup volume;

determine, via at least one processor, a snapshot priority for the snapshot, wherein snapshot priority determines how to order snapshot data from a plurality of snapshots for replication from the source node to the replication target node;

determine, via at least one processor, that the snapshot priority of the snapshot indicates that it is time to send the snapshot to the replication target node;

serialize, via at least one processor, snapshot data of the snapshot, read from the source node named pipe, into one or more chunks;

multiplex, via at least one processor, the one or more chunks associated with the snapshot and one or more chunks associated with one or more other snapshots from the plurality of snapshots into a replication data stream; and send, via at least one processor, the replication data stream to the replication target node via a persistent network connection between the source node and the replication target node;

executing processor-implemented target replication component instructions to:

receive, via at least one processor, the replication data stream;

deserialize, via at least one processor, a first chunk associated with the snapshot received via the replication data stream;

determine, via at least one processor, a replication volume associated with the snapshot at the replication target node based on the first chunk's payload;

create, via at least one processor, a replication target node named pipe associated with the snapshot, wherein the replication target node named pipe is configured to facilitate writing snapshot data of the snapshot to the replication volume;

deserialize, via at least one processor, a second chunk associated with the snapshot received via the replication data stream; and write, via at least one processor, to the replication target node named pipe snapshot data of the snapshot provided in the second chunk's payload.

* * * * *